United States Patent [19]
Kusaka et al.

[11] Patent Number: 5,418,594
[45] Date of Patent: May 23, 1995

[54] FOCAL POINT DETECTION APPARATUS

[75] Inventors: Yosuke Kusaka, Yokohama; Akira Ogasawara, Kawasaki, both of Japan

[73] Assignee: Nikon Corporation, Tokyo, Japan

[21] Appl. No.: 40,080

[22] Filed: Mar. 30, 1993

Related U.S. Application Data

[63] Continuation of Ser. No. 789,861, Nov. 8, 1991, abandoned.

[30] Foreign Application Priority Data

| Nov. 14, 1990 | [JP] | Japan | 2-308301 |
| Nov. 14, 1990 | [JP] | Japan | 2-308302 |
| Nov. 27, 1990 | [JP] | Japan | 2-323792 |

[51] Int. Cl.$^6$ .............................. G03B 13/36
[52] U.S. Cl. ..................... 354/402; 348/345
[58] Field of Search ............. 354/400, 402, 406, 407, 354/408; 358/227; 348/345

[56] References Cited

U.S. PATENT DOCUMENTS

| 4,647,174 | 3/1987 | Tsunekawa et al. | 354/402 |
| 4,904,854 | 2/1990 | Ishida et al. | 250/201 |
| 4,979,045 | 12/1990 | Taniguchi et al. | 358/227 |
| 5,068,737 | 11/1991 | Taniguchi et al. | 354/400 |
| 5,126,777 | 6/1992 | Akashi et al. | 354/402 |

FOREIGN PATENT DOCUMENTS

| 0217395 | 4/1987 | European Pat. Off. . |
| 0351855 | 1/1990 | European Pat. Off. . |
| 62-169569 | 7/1987 | Japan . |
| 2-64516 | 3/1990 | Japan . |
| 2-134609 | 5/1990 | Japan . |
| 2223140 | 3/1990 | United Kingdom . |

*Primary Examiner*—Russell E. Adams
*Attorney, Agent, or Firm*—Shapiro and Shapiro

[57] ABSTRACT

A focal point detection apparatus comprising: a plurality of charge storage type light sensing portions for sectioning an image photographing surface including a subject into a plurality of focal point detection areas to receive light from each focal point detection area so that charge is stored; a transfer device for converting the charge stored in each of the light sensing portions into an electric signal so as to transfer it to the a focus point detection device; and a control device for controlling commencement and completion of the charge storage in each of the light sensing portions for the purpose of causing the transfer device to transfer a plurality of the charges in a predetermined order in such a manner that the next charge is transferred after the previous order charge has been transferred.

26 Claims, 34 Drawing Sheets

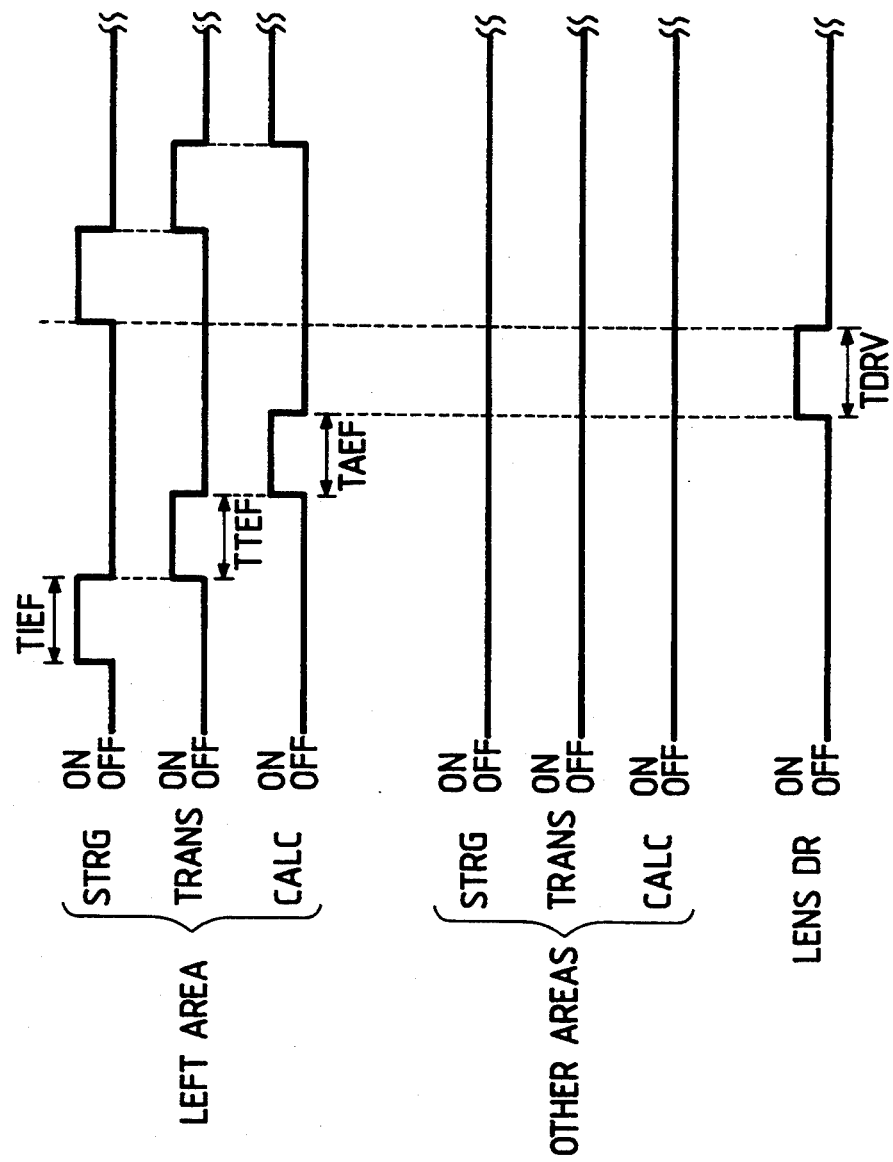

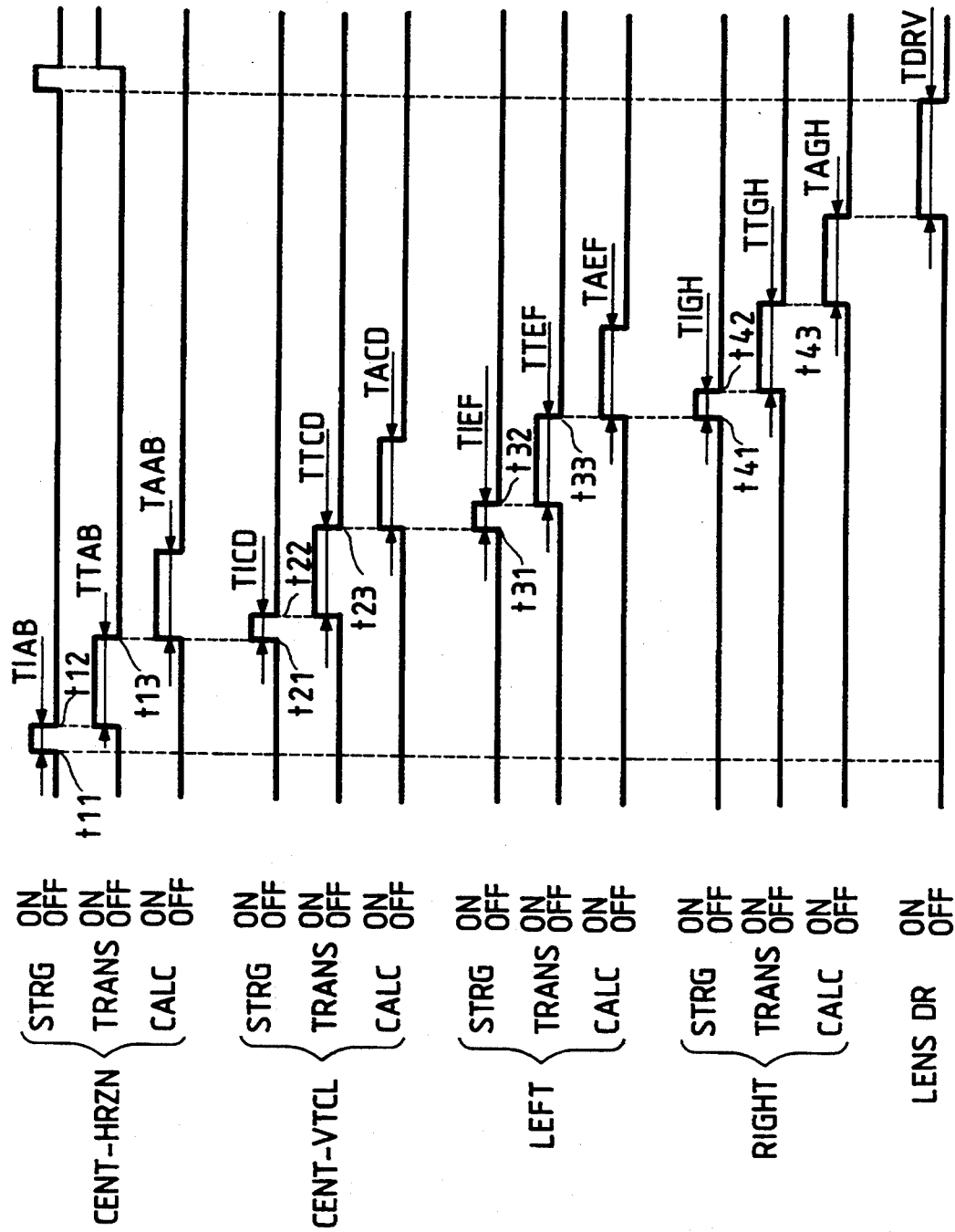

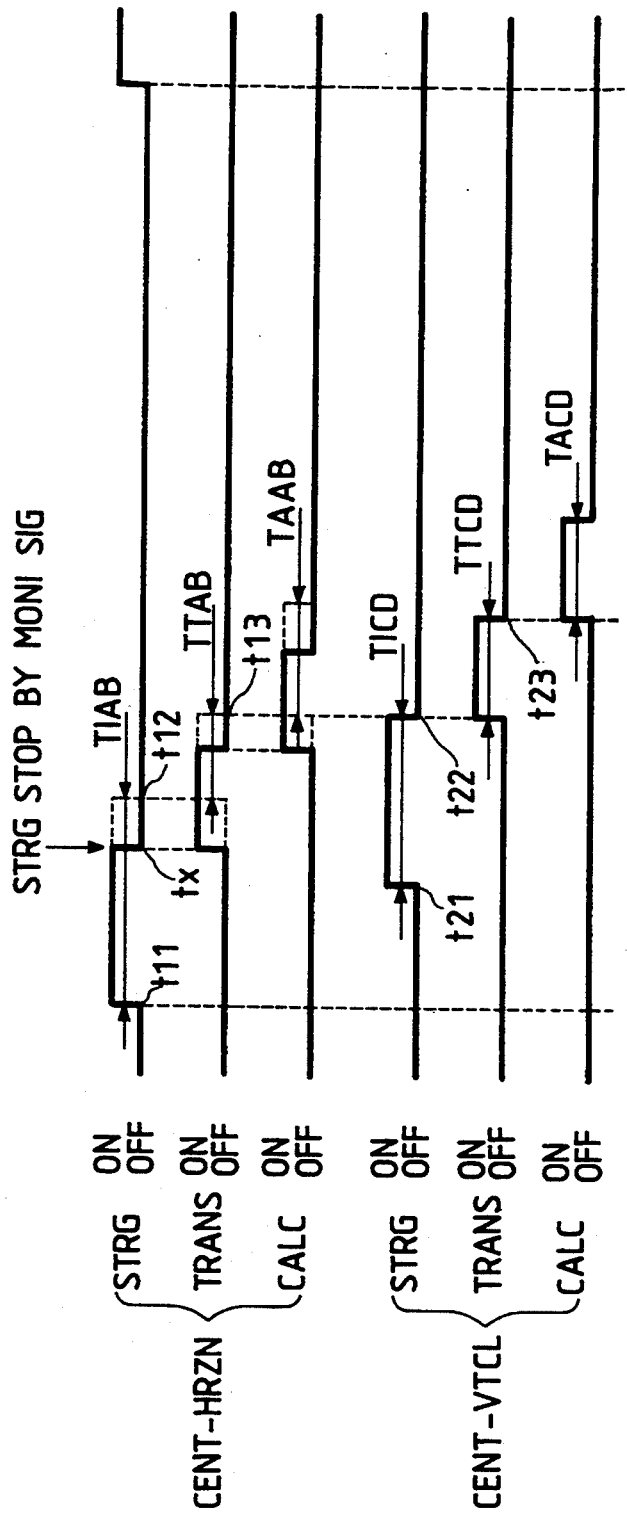

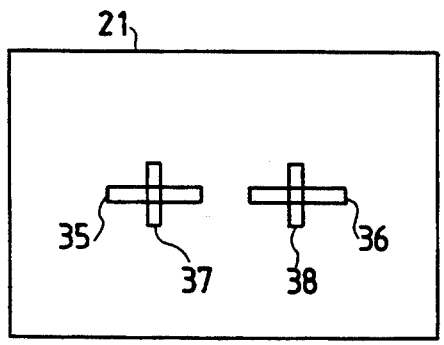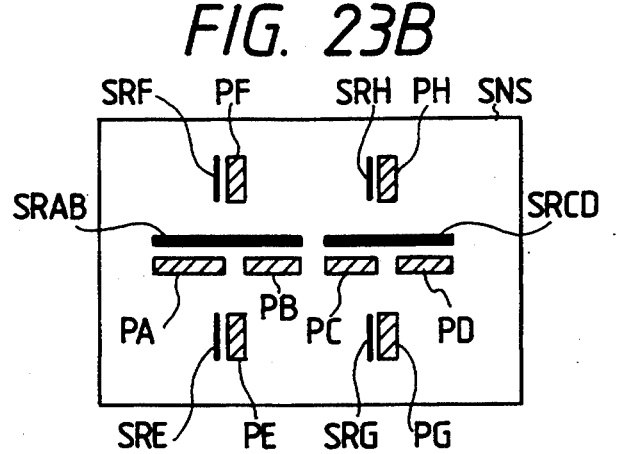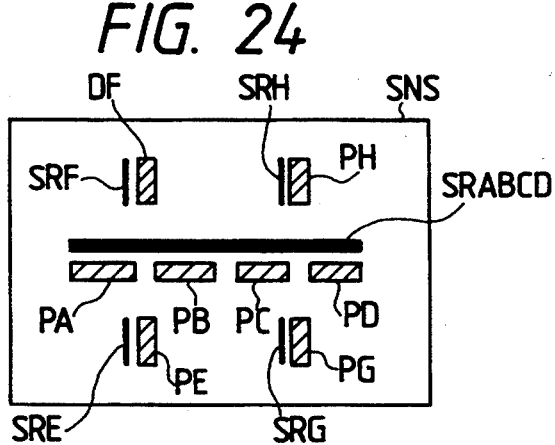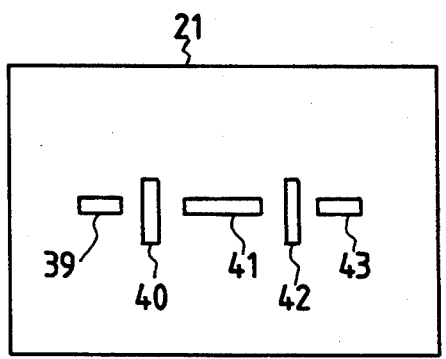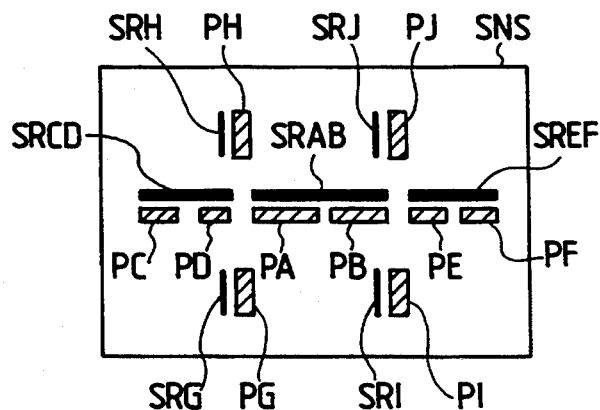

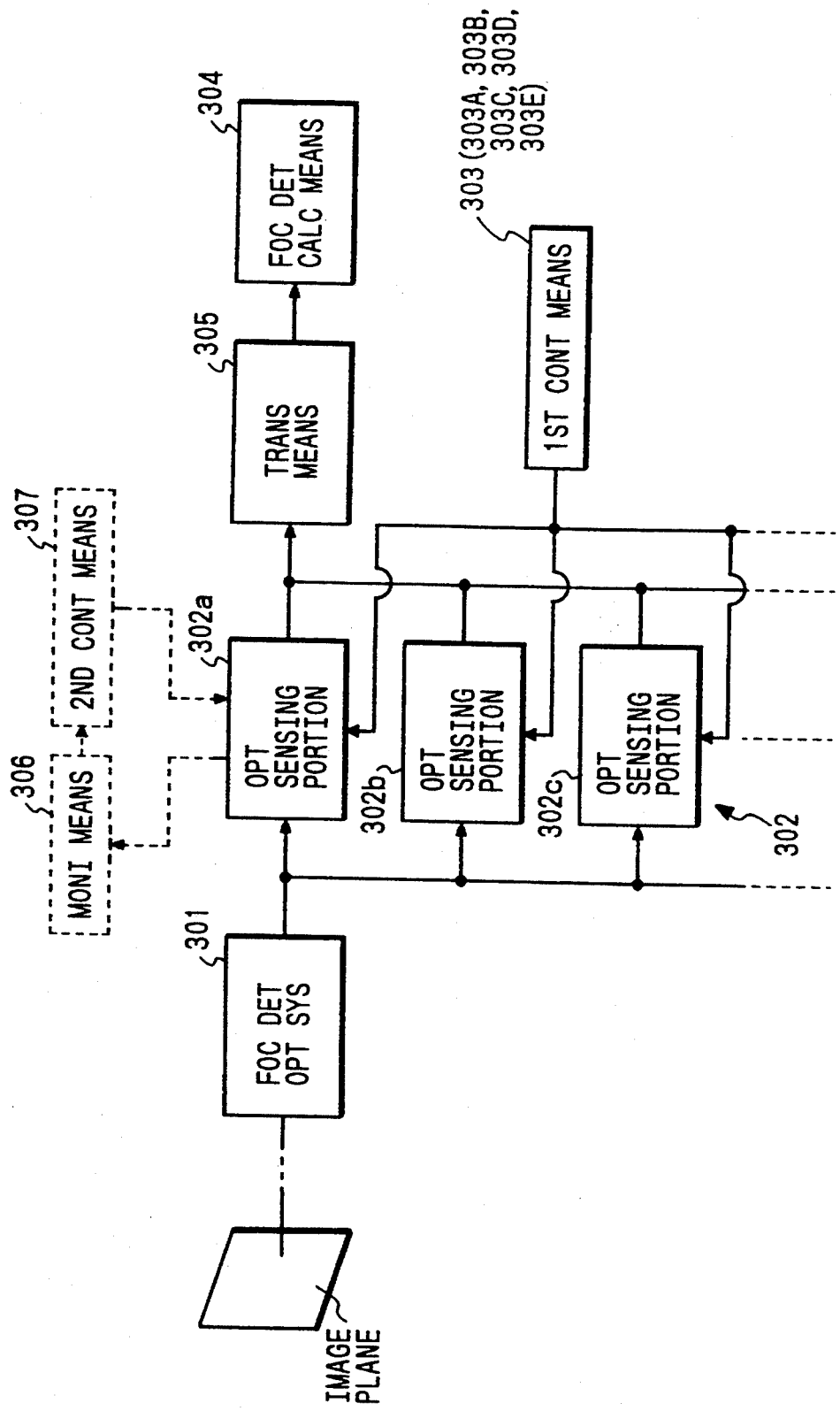

FOCAL POINT DETECTION APPARATUS

This is a continuation of application Ser. No. 789,861, filed Nov. 8, 1991, now abandoned.

BACKGROUND OF THE INVENTION

1. Field of the Invention

The present invention relates to a focal point detection apparatus, and, more particularly to an improvement in a charge storage function and charge transfer control function of a light sensing portion for detecting the focal point, the light sensing portion being a component of a focal point detection apparatus having a plurality of focal point detection areas.

2. Related Background Art

Hitherto, there has been available a focal point detection apparatus having a plurality of focal point detection areas on an image photographing surface and acting to detect a focal point in accordance with output signals transmitted from a plurality of light sensing portions which correspond to a plurality of the focal point detection areas.

An apparatus of the type described above performs the charge storage and transfer to and from its plurality of light sensing portions as follows because its microcomputer for calculating signals transmitted from the light sensing portion cannot simultaneously process the output signals transmitted from a plurality of the light sensing portions:

(1) The charge storages in all of the light sensing portions are simultaneously commenced and the charge of a light sensing portion which has been stored is temporarily stored in a memory until the charges are stored in all of the light sensing portions. When the charges have been stored in all of the light sensing portions, the charges stored in all of the pixels are collectively and in parallel transferred to a CCD shift register before they are transferred from the CCD shift register to an external circuit in a serial manner (refer to Japanese Patent Application Laid-open No. 62-169569).

(2) The charge storages in all of the light sensing portions are simultaneously commenced and the stored charges are sequentially transferred from the light sensing portion in which the charge has been stored (refer to Japanese Patent Application Laid-open No. 2-64516).

(3) In order to prevent overlap of the charge storages and transferences of charges in a plurality of light sensing portions in terms of time, a process is performed in a time sequential manner.

However, the above-described conventional apparatus (1) encounters a problem of a deterioration in the S/N ratio of a signal due to a mixture of noise such as a dark current because the charge stored in a light sensing portion is temporarily stored in a memory until the charges are stored in all of the light sensing portions.

The conventional apparatus (2) encounters a similar problem to that experienced with the conventional apparatus (1) because, if the charge stored in the other light sensing portion is being transferred at the time of the completion of the charge storage, the charge must be temporarily stored in a memory in a period of the above-described transference operation.

In addition, the conventional apparatus (3) suffers from a problem in that the focal point cannot be detected quickly because the charge storage and the transference of the charge stored in each light sensing portion are processed in the time sequential manner even if the subject displays low brightness in which the charge storage time becomes long.

There has been available a focal point detection apparatus which is arranged in such a manner that two focal point detection areas are provided on an image photographing surface to intersect each other and which performs the focal point detection calculations in response to output signals from two pairs of light sensing portions provided to correspond to the above-described focal point detection areas (refer to Japanese Patent Application Laid-open No. 2-134609).

In a focal point detection apparatus of the type described above, light sensing portions for performing the photoelectrical conversion and transfer portions (hereinafter called "shift registers") for transferring the stored charges are formed on one chip. Furthermore, the shift register for a pair of light sensing portion of two pairs of light sensing portions is commonly provided through the other pair of the light sensing portions. Therefore, no common shift register can be provided from another pair of the light sensing portions. Therefore, individual shift registers are provided for the light sensing portions.

The charge storages in the two pairs of the light sensing portions are controlled to be completed simultaneously. Furthermore, the transference of the charges stored in the pair of the light sensing portions provided with the common shift register is commenced and the charges stored in the other pair of light sensing portions are transferred to the memories individually provided for the light sensing portions so as to be temporarily stored. After the charges stored in the pair of the light sensing portions provided with the common shift register have been transferred, the charge of either one of the other pair of the light sensing portions stored in the memory is transferred. Then, the charge of the other light sensing portion is transferred after the above-described charge transference has been completed.

However, the above-described conventional apparatus encounters the following problems:

(1) The charge storages in a plurality of pairs of light storage portions are simultaneously completed and the charges of the other pair of the light sensing portions are temporarily stored in the memory during the transference of the charges stored in a pair of the light sensing portions provided with the common shift register. Therefore, the S/N ratio of the signal will be deteriorated due to a mixture of noise such as a dark current with a signal of the latter light sensing portion.

(2) In order to overcome the above-described problem, it might be considered feasible to employ a structure in which a common shift register is provided for the latter pair of the light sensing portions while detouring the former pair of the light sensing portions. However, the length of the shift register cannot be reduced due to detouring, causing noise to be mixed during the transference. As a result, the S/N ratio of the signal will be deteriorated and the charge transfer time cannot be shortened.

SUMMARY OF THE INVENTION

An object of the present invention is to provide a focal point detection apparatus capable of controlling the charge storage in each light sensing portion for the purpose of sequentially transferring the charge stored in each light sensing portion in a short time, accurately performing a focal point detection in response to a high S/N ratio detection signal and performing the focal point detection in a short time even if the brightness level is unsatisfactory.

Another object of the present invention is to provide a focal point detection apparatus for transferring the charge while controlling the charge storage time for each light sensing portion for the purpose of continuously transferring the charges stored in a plurality of light sensing portions and accurately performing a focal point detection in response to a high S/N ratio detection signal in a short time.

Other and further objects, features and advantages of the invention will be appear more fully from the following description.

BRIEF DESCRIPTION OF THE DRAWINGS

FIG. 3A illustrates all of the focal point detection areas;

FIG. 3B illustrates a state where the central areas is selected;

FIG. 3C illustrates a state where the left area is selected;

FIG. 3D illustrates a state where the right area is selected;

FIG. 12 is a time chart which illustrates the charge storage, the charge transfer, the focal point detection calculation and the lens drive operations when the focal point detection at the left area is selected;

FIG. 14 is a time chart which illustrates an operation of controlling an image sensor in a high brightness mode;

FIG. 15 is a time chart which illustrates an operation of controlling the image sensor at the time of the charge storage monitor interruption;

FIG. 23A illustrates another example of the configuration of the focal point detection areas;

FIG. 23B illustrates an example of the configuration of the light sensing portions and the shift registers on the image sensors which correspond to the focal point detection areas shown in FIG. 23A;

FIG. 24 illustrates another example of the configuration of the light sensing portions and the shift registers on the image sensors which correspond to the focal point detection areas shown in FIG. 22A;

FIG. 25A illustrates another example of the configuration of the focal point detection areas;

FIG. 25B illustrates an example of the configuration of the light sensing portions and the shift registers on the image sensors which correspond to the focal point detection areas shown in FIG. 25A;

FIG. 27 illustrates another embodiment of the present invention;

DESCRIPTION OF THE PREFERRED EMBODIMENTS

Figure 1:
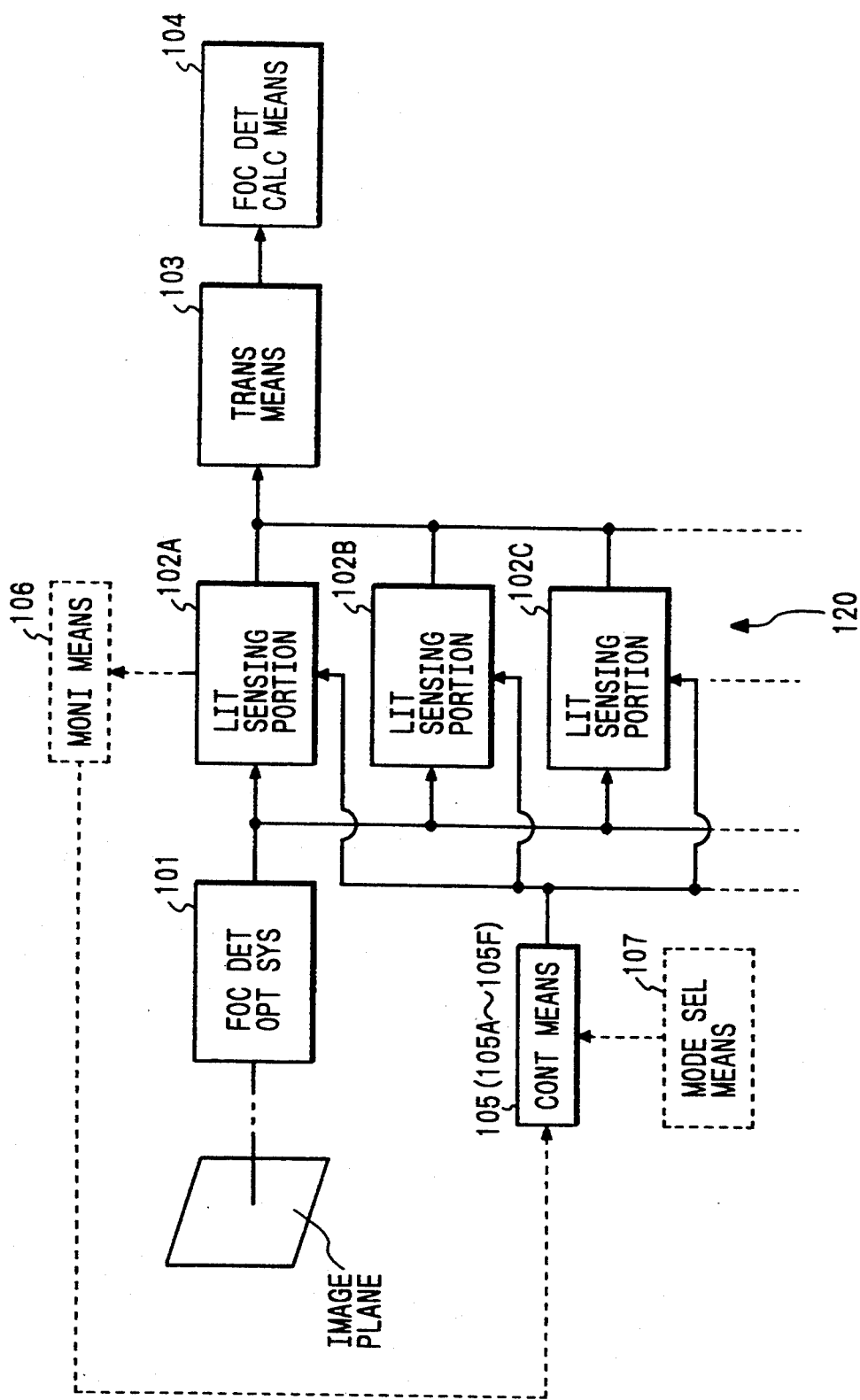
FIG. 1 illustrates a first embodiment of the present invention.

Preferred embodiments of the present invention will now be described. With reference to FIG. 1, a focal point detection apparatus comprises a plurality of charge storage type light sensing portions 102 (102A, 102B, 102C, ...) disposed to correspond to a plurality of focal point detection areas disposed on an image photographing surface. The charge storage type light sensing portions 102 receive beams introduced from a plurality of the focal point detection areas by a focal point detection optical system 101. The focal point detection apparatus further comprises a transfer means 103 for converting charges stored in the above-described light sensing portions 102 at the time of completion of the storage of the charge into electric signals so as to be transferred to a focal point detection calculating means 104.

The focal point detection apparatus transfers the charge stored in the light sensing portions 102 in a predetermined sequential order of the light sensing portions 102. In order to transfer the change stored in the next light sensing portion 102 after the charges stored in the light sensing portions 102 have been transferred in a predetermined transfer order, the focal point detection apparatus includes control means 105 for controlling the start/completion of the charge storage in each light sensing portion 102.

A control means 105A of the focal point detection apparatus controls the start/completion of the charge storage in each light sensing portion 102 in order to perform transference of the charges stored in the light sensing portions 102 in accordance with a predetermined sequential order of the light sensing portions 102, and also in order to continuously transfer the charges stored in the ensuing light sensing portions 102 after the charge stored in the previous light sensing portion 102 has been transferred.

The focal point detection apparatus is arranged in such a manner that at least one of a plurality of the focal point detection areas includes the center of the image photographing surface. A control means 105B controls the start/completion of the charge storage in each light sensing portion 102 in such a manner that the transference of the charge stored in the light sensing portion 102A which corresponds to the focal point detection area including the center of the image photographing surface is performed prior to the other light sensing portions 102.

The focal point detection apparatus comprises a monitor means 106 for detecting the amount of the charge stored in the light sensing portion 102A which corresponds to the focal point detection area including the center of the image photographing surface. A control means 105C completes the charge storage in the light sensing portion 102A when the monitor means 106 detects a fact that the amount of the charge stored in the light sensing portion 102A which corresponds to the focal point detection area including the center of the image photographing surface has reached a predetermined level.

A control means 105D of the focal point detection apparatus controls the start/completion of the charge storage in each light sensing portion 102 in such a manner that the charge storage in the other light sensing portions 102 is started after the time at which the charge storage in the light receiving portion 102A which corresponds to the focal point detection area including the center of the image photographing surface has been started.

A control means 105E of the focal point detection apparatus causes the charge storage in the next light sensing portion 102 to be started after the charge stored in the light sensing portion 102 arranged to have a faster transference sequence order has been transferred in a case where the time in which the light sensing portion 102 stores the charge is shorter than a predetermined time.

The focal point detection apparatus has a mode selection means 107 for selecting the operational mode between a manual mode in which an arbitrary focal detection area is selected from a plurality of focal point detection areas to manually detect a focal point and an automatic mode in which an optimum focal detection area is selected in accordance with an automatic selection algorithm. A control means 105F causes a charge to be stored in only the light sensing portion 102 which corresponds to a selected focal detection area when the manual mode is selected by the mode selection means 107.

The control means 105 of the focal point detection apparatus controls the start/completion of the charge storage in each light sensing portion 102 in such a manner that the transference of the charges stored in the light sensing portions 102 is made in accordance with a predetermined transfer order of the light receiving portions 102, and that the charge stored in the next light sensing portion 102 is transferred after the charge stored in the previous light sensing portions 102 has been transferred.

The control means 105A of the focal point detection apparatus controls the start/completion of the charge storage in each light sensing portion 102 in order to perform transference of the charges stored in the light sensing portions 102 in accordance with a predetermined sequential order of the light sensing portion 102 and also in order to continuously transfer the charges stored in the ensuing light sensing portions 102 after the charge stored in the previous light sensing portion 102 has been transferred.

The control means 105B controls the start/completion of the charge storage in each light sensing portion 102 in such a manner that the transference of the charge stored in the light sensing portion 102A which corresponds to the focal point detection area including the center of the image photographing surface is performed prior to the other light sensing portions 102.

The control means 105C completes the charge storage in the light sensing portion 102A when the monitor means 106 detects a fact that the amount of the charge stored in the light sensing portion 102A which corresponds to the focal point detection area including the center of the image photographing surface has reached a predetermined level.

The control means 105D of the focal point detection apparatus controls the start/completion of the charge storage in each light sensing portion 102 in such a manner that the charge storage in the other light sensing portions 102 is started after the time at which the charge storage in the light receiving portion 102A which corresponds to the focal point detection area including the center of the image photographing surface has been started.

The control means 105E of the focal point detection apparatus causes the charge storage in the next light sensing portion 102 to be started after the charge stored in the light sensing portion 102 arranged to have a faster transference sequence order has been transferred in a case where the time in which the light sensing portion 102 stores the charge is shorter than a predetermined time.

A control means 105F causes a charge to be stored in only the light sensing portion 102 which corresponds to a selected focal detection area when the manual mode is selected by the mode selection means 107.

Figure 2:
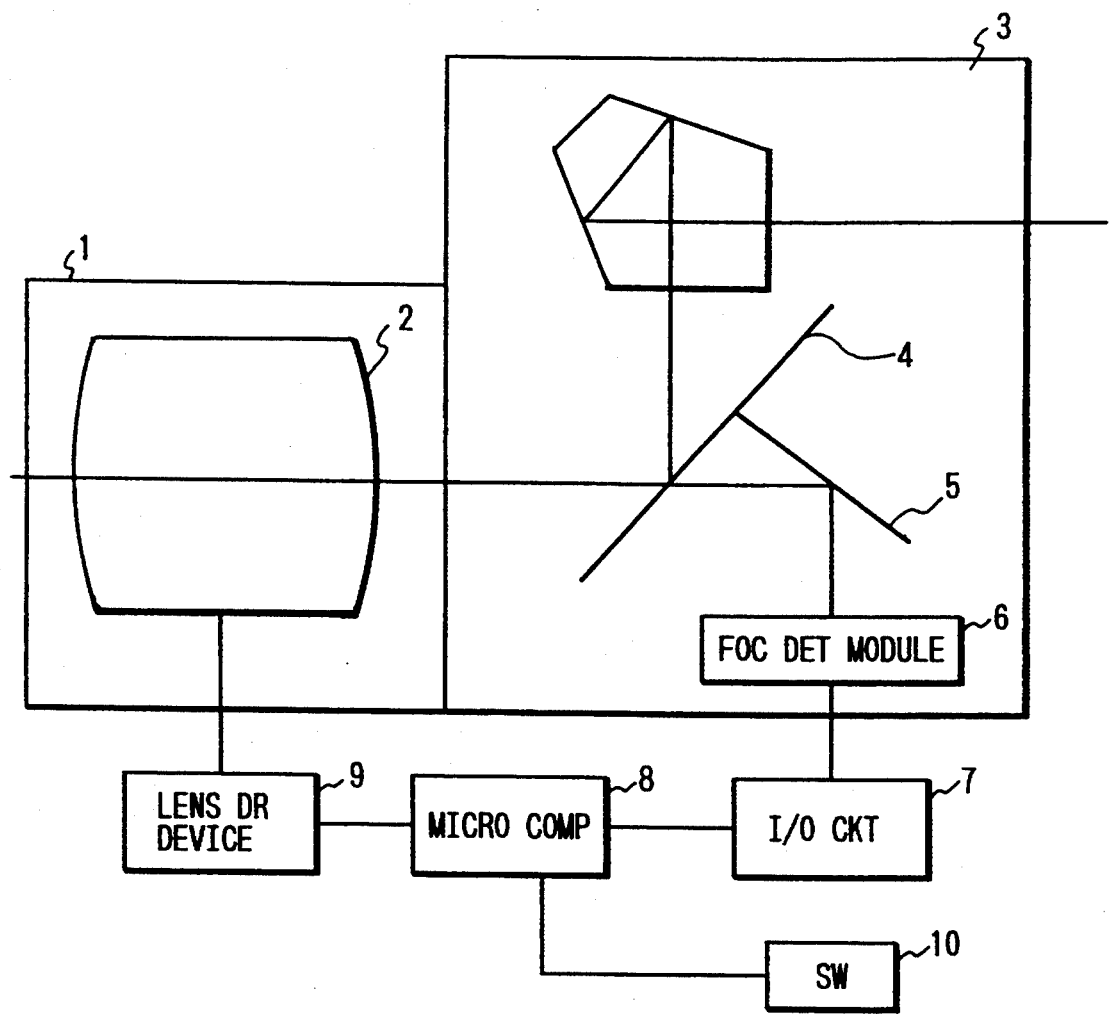
FIG. 2 is a block diagram which illustrates the overall structure of a camera having a focal point detection apparatus according to the first embodiment of the present invention.

FIG. 2 is an overall structural view which illustrates a camera having the focal point detection apparatus according to the first embodiment of the present invention. Referring to FIG. 2, the schematic structure of the focal point detection apparatus will now be described.

Reference numeral 1 represents a lens barrel which is mounted on a camera body 3. Reference numeral 4 represents a main mirror and 5 represents a sub-mirror. Reference numeral 6 represents a focal point detection module which is composed of a focal point detection optical system to be described later and an image sensor. Reference numeral 7 represents an interface circuit disposed between the focal point detection module 6 and a microcomputer 8 to be described later. The microcomputer 8 is composed of a central processing unit (CPU) and peripheral elements so as to control the focal point detection module 6 and drive a photographing optical system 2 to perform a focusing operation in accordance with a focal detection calculation. Reference numeral 9 represents a lens drive device composed of a motor, a gear, a drive quantity detecting pulse generator and the like. Reference numeral 10 represents a selection switch for selecting an operational mode from a manual mode in which an arbitrary area is selected from a plurality of the focal point detection areas established on the image photographing surface to detect a focal point and an automatic mode in which an optimum focal detection area is selected in accordance with an automatic selection algorithm. When the manual mode is selected, an arbitrary focal detection area can be selected by using the selection switch 10.

The beams from the subject pass through the photographing optical system 2 and the main mirror 4 before the beams are reflected by the sub-mirror 5 to reach the focal point detection module 6 disposed in the bottom of the camera body 3. The focal point detection module 6 introduces the beams from a plurality of the focal point detection areas established on the image photographing surface onto the surface of the image sensor by the focal point detection optical system so that an image of the subject is formed on each of a plurality of pairs of light sensing portions formed on the image sensor. Furthermore, focal point detection module 6 performs photoelectrical conversion in the light receiving portions which correspond to the focal point detection areas selected by the switch 10 so as to generate a subject image signal which corresponds to the light quantity distribution of the subject image in each of the light receiving portions.

The microcomputer 8 calculates the relative image deviation quantity between a pair of subject image signals to obtain the defocus quantity of the photographing optical system 2 in accordance with the image deviation quantity thus-calculated. The microcomputer 8 further calculates the amount of drive of the photographing optical system 2 in accordance with the above-described defocus quantity to control the lens drive device 9. As a result, the photographing lens performs the focusing operation.

Figure 3A:
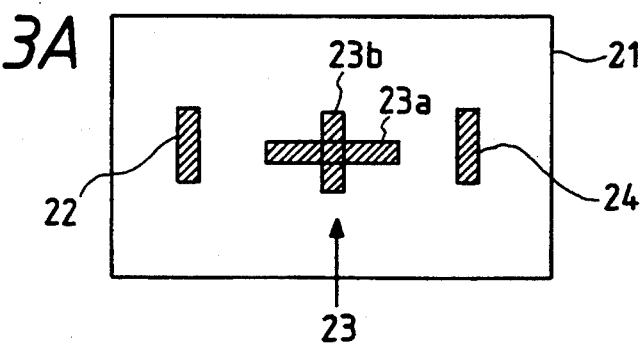
FIGS. 3A to 3D illustrate a plurality of focal point detection areas established on an image photographing surface, where
Figure 3B:
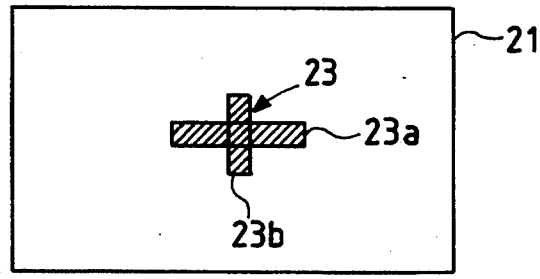
Figure 3C:
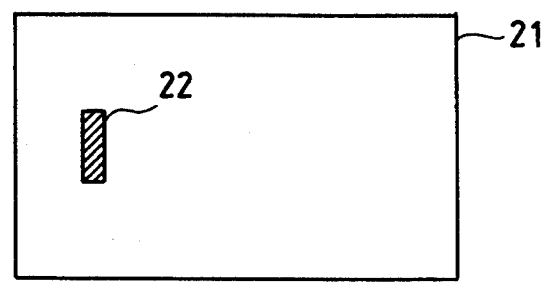
Figure 3D:
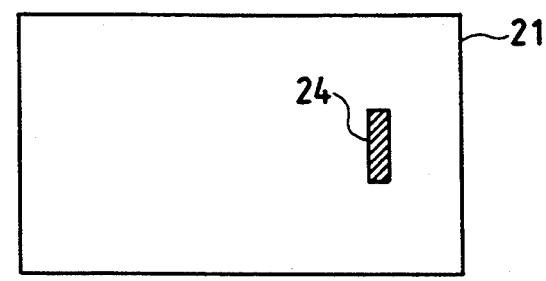

FIG. 3A illustrates the focal point detection area established on an image photographing surface 21, that is, a left area 22, a central area 23 and a right area 24. The central area 23 is arranged in such a manner that a horizontal area 23a and a vertical area 23b intersect crosswise. FIG. 3B illustrates a case in which the central area 23 is selected by means of the switch 10, FIG. 3C illustrates a case in which the left area 22 is selected and FIG. 3D illustrates a case in which the right area 24 is selected.

Figure 4:
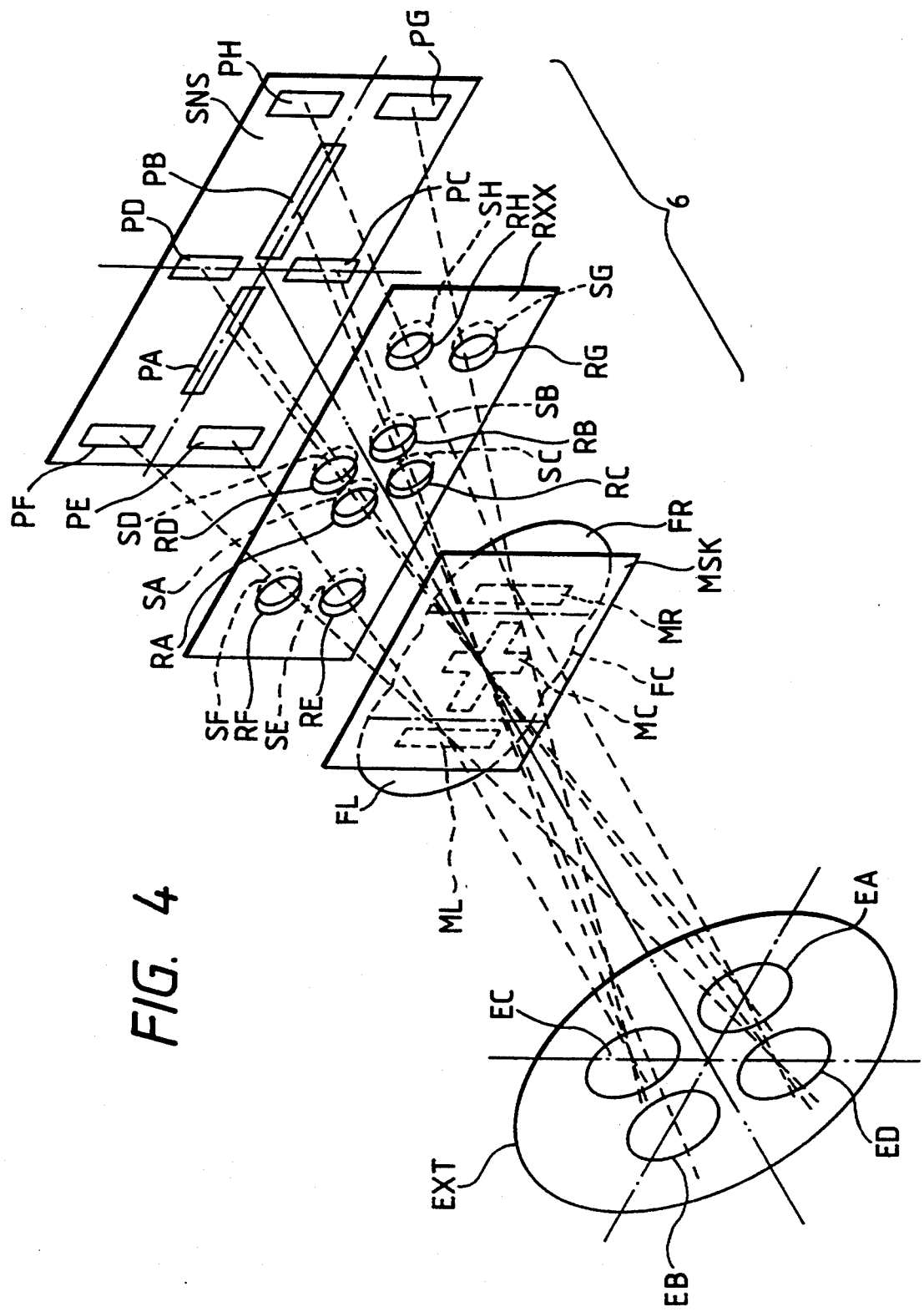
FIG. 4 illustrates the detailed structure of a focal point detection module.

FIG. 4 illustrates the detailed structure of the focal point detection module 6.

Referring to FIG. 4, a visual field mask MSK is disposed in the vicinity of an estimated imaging surface of the photographing optical system 2, the visual field mask MSK having openings ML, MC and MR. The openings ML, MC and MR correspond to the focal point detection areas, that is, the left area 22, the central area 23 and the left area 24 shown in FIG. 3A. Symbols FL, FC and FR represent condenser lenses disposed behind the openings ML, MC and MR of the visual field mask MSK. Symbol RXX represents a diaphragm mask having diaphragm openings RA, RB, RC, RD, RE, RF, RG and RH. The above-described openings are arranged in such a manner that diaphragm openings RA and RB, RC and RD, RE and RF and RG and RH respectively form pairs to correspond to the focal point detections areas 23a, 23b, 22 and 24. The openings RG and RH are projected to pupil regions EC and ED of a set pupil surface EXT by the condenser lens FR. The openings RC and RD are projected to the pupil regions EC and ED of the set pupil surface EXT by the condenser lens FC. The openings RE and RF are projected to the pupil regions EC and ED of the set pupil surface EXT by the condenser lens FL. The openings RA and RB are projected to pupil regions EA and EB of the set pupil surface EXT by the condenser lens FC.

Symbols SA to SH represent separator lenses disposed behind the corresponding diaphragm openings RA to RH in such a manner that separator lenses SA and SB, SC and SD, SE and SF and SG and SH respectively form pairs to correspond to the focal point detection areas 23a, 23b, 22 and 24. Symbol SNS represents an image sensor for performing the photoelectric conversion and having light sensing portions PA, PB, PC, PD, PE, PF, PG and PH each having a plurality of pixels and composed of a charge storage type one-dimensional pixel array. The light sensing portions PA and PB, PC and PD PE and PF and PG and PH respectively form pairs to correspond to the focal detection areas 23a, 23b, 22 and 24.

A primary image of a subject formed on an estimated imaging surface by the photographing optical system 2 after it has passed through the pupil region EC passes through the openings ML, MC and MR formed in the visual field mask MSK and openings RE, RC and RG of the diaphragm mask RXX. Then, it is, as a secondary image of the subject, again-imaged on the light sensing portions PE, PC and PG of the image sensor SNS by the separator lenses SE, SC and SG.

A primary image of the subject formed on an estimated imaging surface by the photographing optical system 2 after it has passed through the pupil region ED passes through the openings ML, MC and MR formed in the visual field mask MSK and openings RF, RD and RH of the diaphragm mask RXX. Then, it is, as a secondary image of the subject, again-imaged on the light sensing portions PF, PD and PH of the image sensor SNS by the separator lenses SF, SD and SH.

A primary image of the subject formed on an estimated imaging surface by the photographing optical system 2 after it has passed through the pupil region EA passes through the opening MC formed in the visual field mask MSK and the opening RA of the diaphragm mask RXX. Then, it is, as a secondary image of the subject, again-imaged on the light sensing portion PA of the image sensor SNS by the separator lense SA.

A primary image of the subject formed on an estimated imaging surface by the photographing optical system 2 after it has passed through the pupil region EB passes through the opening MC formed in the visual field mask MSK and the opening RB of the diaphragm mask RXX. Then, it is, as a secondary image of the subject, again-imaged on the light sensing portion PB of the image sensor SNS by the separator lense SB.

The relative image deviation quantities of a plurality of pairs of the subject images formed in the light sensing portions PA and PB, PC and PD, PE and PF and PG and PH are in proportion to the defocus quantity of the photographing optical system for the focal point detection areas 23a, 23b, 24 and 22 shown in FIG. 3A.

Figure 5:
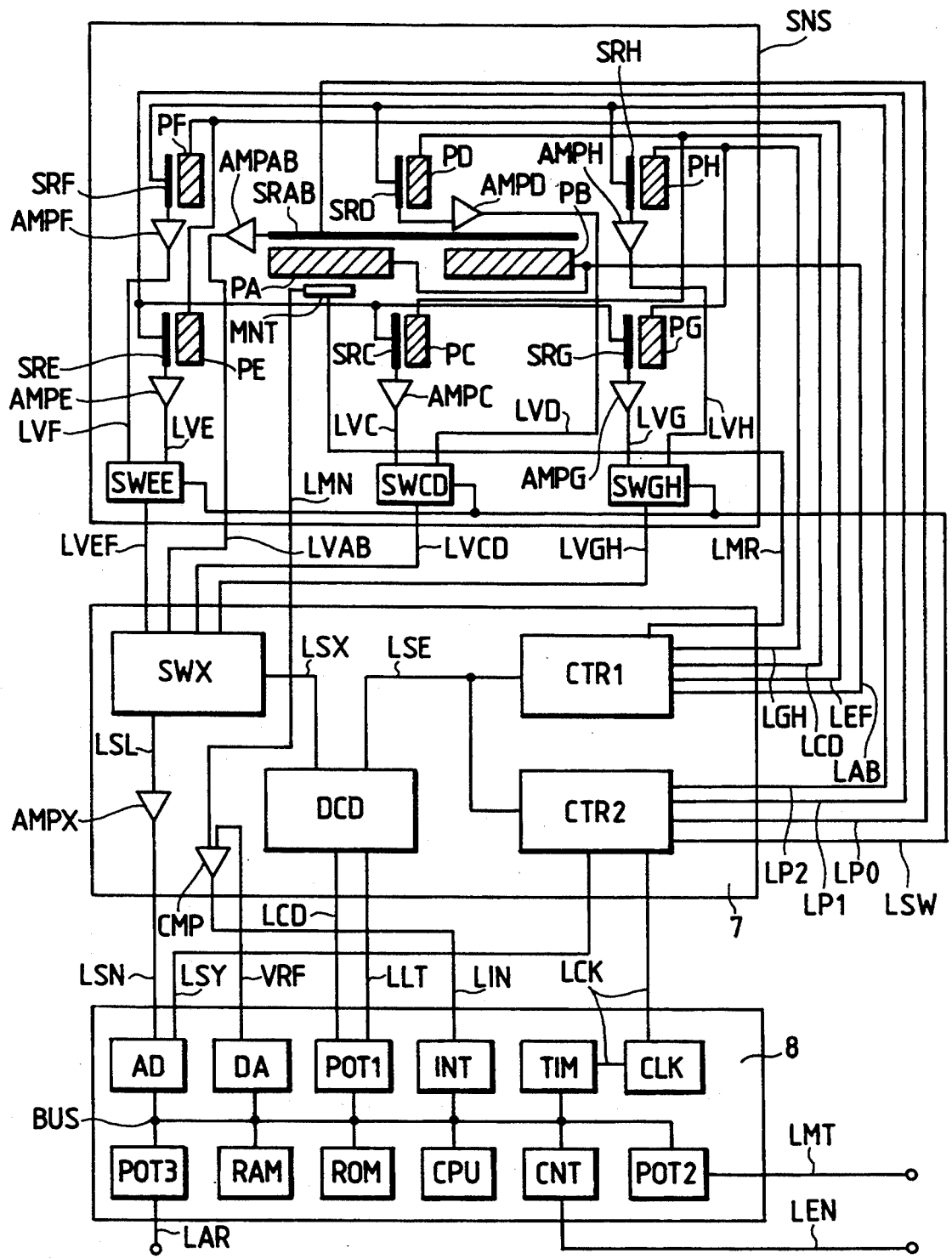
FIG. 5 illustrates the detailed structures of an image sensor, an interface circuit and a microcomputer.

FIG. 5 illustrates the detailed structures of the image sensor SNS, the interface circuit 7 and the microcomputer 8.

The light sensing portions PA to PH are disposed on the image sensor SNS as shown in FIG. 4. Each of the light sensing portions PA and PB is composed of n pixels, while each of the light sensing portions PC to PH is composed of m pixels. The charge storages of the light sensing portions PA, PB, PC, PD, PE, PF, PG and PH forming the above-described pairs are respectively controlled by control signals LAB, LCD, LEF and LGH for the corresponding pairs. Symbols SRAB, SRC, SRD, SRE, SRF, SRG and SRH represent CCD shift registers for transferring charges stored in each pixel of the light sensing portions PA, PB, PC, PD, PE, PF, PG and PH. The charges respectively stored in the pixels of the light sensing portions PA to Ph are, in parallel, transferred to the corresponding shift registers SRAB to SRH at the time of the completion of the charge storage operation. Then, the stored charges which have been transferred to the shift registers SRAB to SRH are, in serial, transmitted in response to each operational clock in the predetermined transfer order of the light sensing portions when operational clock signals LP0, LP1 and LP2 are supplied.

The common shift register SRAB is used to transfer the charges in the light sensing portions PA and PB. However, since the shift register SRAB is placed between the light sensing portions PC and PD, a common shift register cannot be used for those portions. Therefore, the light sensing portions PC and PD respectively are adapted to the individual shift registers SRC and SRD. Furthermore, since the light sensing portions PE and PF are disposed away from each other, thereby requiring excessive time to transfer the charge if a common shift register is used, the individual shift registers SRE and SRF are used for the light sensing portions PE and PF. Similarly, the light sensing portions PG and PH are arranged to be adapted to the individual shift registers SRG and SRH.

Symbols AMPAB, AMPC, AMPD, AMPE, AMPF, AMPG and AMPH are primary amplifiers for converting charges transferred from the shift registers SRAB, SRC, SRD, SRE, SRF, SRG and SRH into voltage signals LVAB, LVC, LVD, LVE, LVF, LVG and LVH.

Figure 6:
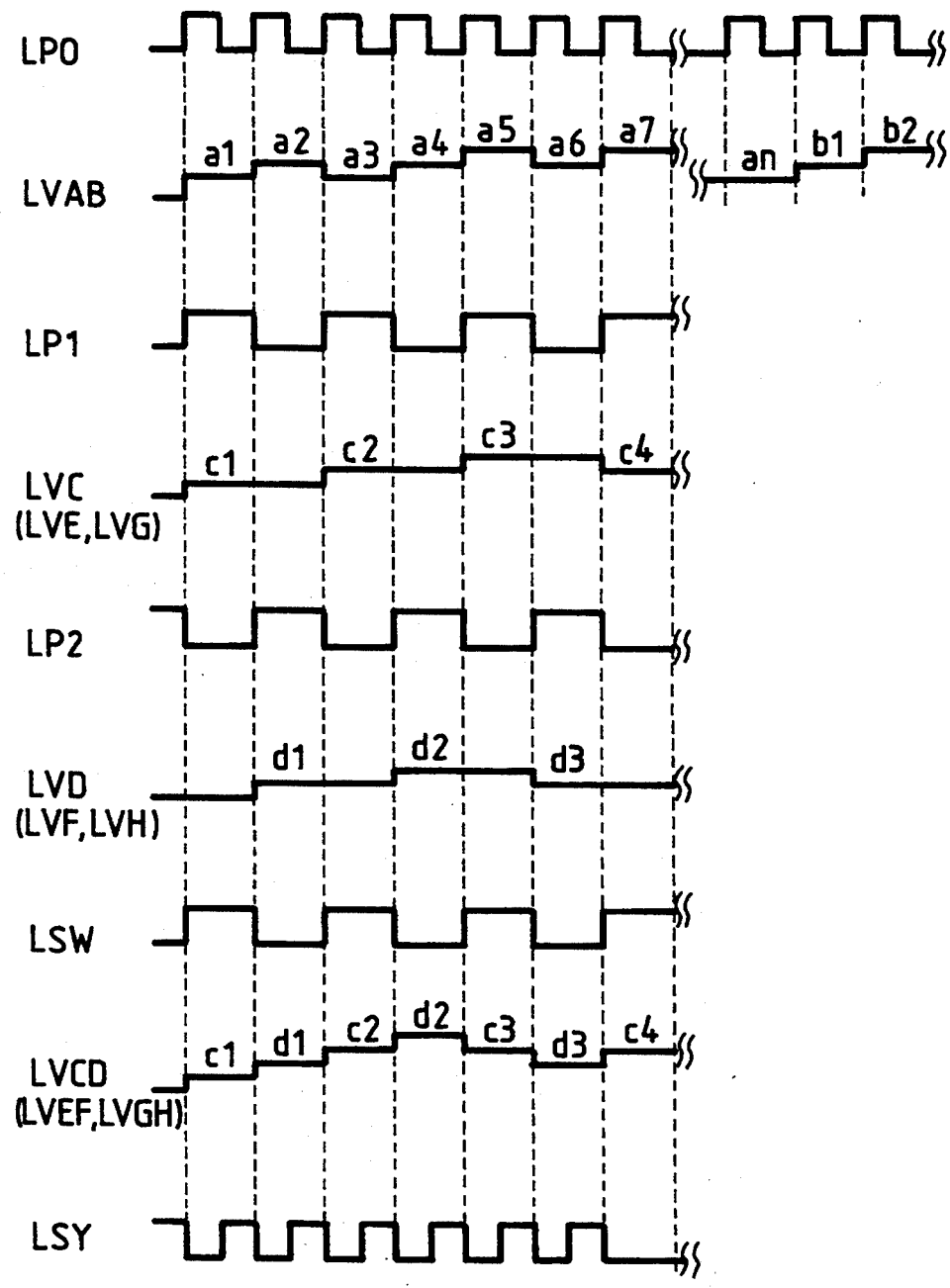
FIG. 6 is a time chart which illustrates the transfer of a storage charge in each shift register disposed to confront the light sensing portions.

The shift register SRAB is driven in response to the operational clock LP0 in such a manner that it transfers the stored charge for each pixel of the light sensing portions PA and PB to the amplifier AMPAB in response to each clock. That is, the charge of the light sensing portion PB is transferred after the charge in the light sensing portion PA has been transferred. The amplifier AMPAB generates the voltage signal (a1, a2, ... , an, b1, b2, ... , bn) corresponding to the transferred charge in synchronization with the operational clock LP0 for the shift register SRAB. The time taken to transfer a1 to bn of the voltage signal LVAB is the charge transfer time TTAB for the light receiving portions PA and PB. Similarly, the shift registers SRC, SRE and SRG are driven in response to the operational clock LP1 the period of which is two times that of the operational clock LP0 to transfer the charge stored in each pixel of the light sensing portions PC, PE and PG to the amplifiers AMPC, AMPE and AMPG at each clock. The amplifiers AMPC, AMPE and AMPG, as shown in FIG. 6, generate voltage signals LVC (c1, c2, ..., cm), LVE (e1, e2, ..., em) and LVG (g1, g2, ..., gm). The shift registers SRD, SRF and SRH are driven in response to the operational clock LP1 and operational clock LP2 the phase of which is delayed from the operational clock LP1 by one period to transfer the charges in the pixels of the light receiving portions PD, PF and PH in response to each clock to the amplifiers AMPD, AMPF and AMPH. The amplifiers AMPD, AMPF and AMPH, as shown in FIG. 6, generates voltage signals LVD (d1, d2, ..., dm), LVF (f1, f2, ..., fm) and LVH (h1, h2, ..., hm).

Symbols SWCD, SWEF and SWGH represent switches for switching over the voltage signals from the amplifiers AMPC and AMPD, AMPE and AMPF and AMPG and AMPH. That is, the switch SWCD switches over the voltage signal LVC from the amplifier AMPC and the voltage signal LVD from the amplifier AMPD to generate signal LVCD. The switch SWEF switches over the voltage signal LVE from the amplifier AMPE and the voltage signal LVF from the amplifier AMPF to generate signal LVEF. The switch SWGH switches over the voltage signal LVG from the amplifier AMPG and the voltage signal LVH from the amplifier AMPH to generate signal LVGH.

Operational clock LSW is in synchronization with the operational clocks LP1 and LP2 for the shift register so that, when it is, as shown in FIG. 6, in a high level, the switches SWCD, SWEF and SWGH select the voltage signals LVC, LVE and LVG. On the other hand, when the same is in a low level, the switches SWCD, SWEF and SWGH select the voltage signals LVD, LVF and LVH. That is, the switch SWCD alternately selects the signals c1 to cm transmitted from the amplifier AMPC and the signals d1 to dm transmitted from the amplifier AMPD to transmit signals c1, d1, c2, d2, ..., cm and dm (LVCD). The time taken to transfer the signal c1 to the signal dm is time TTCD taken to transfer the charge in the light sensing portion PC to PD. Although omitted from illustration, the transference of the charge from the light sensing portion PE to PF and that from the light sensing portion PG to PH are performed similarly, taking charge transfer times TTEF and TTGH.

Figure 7:
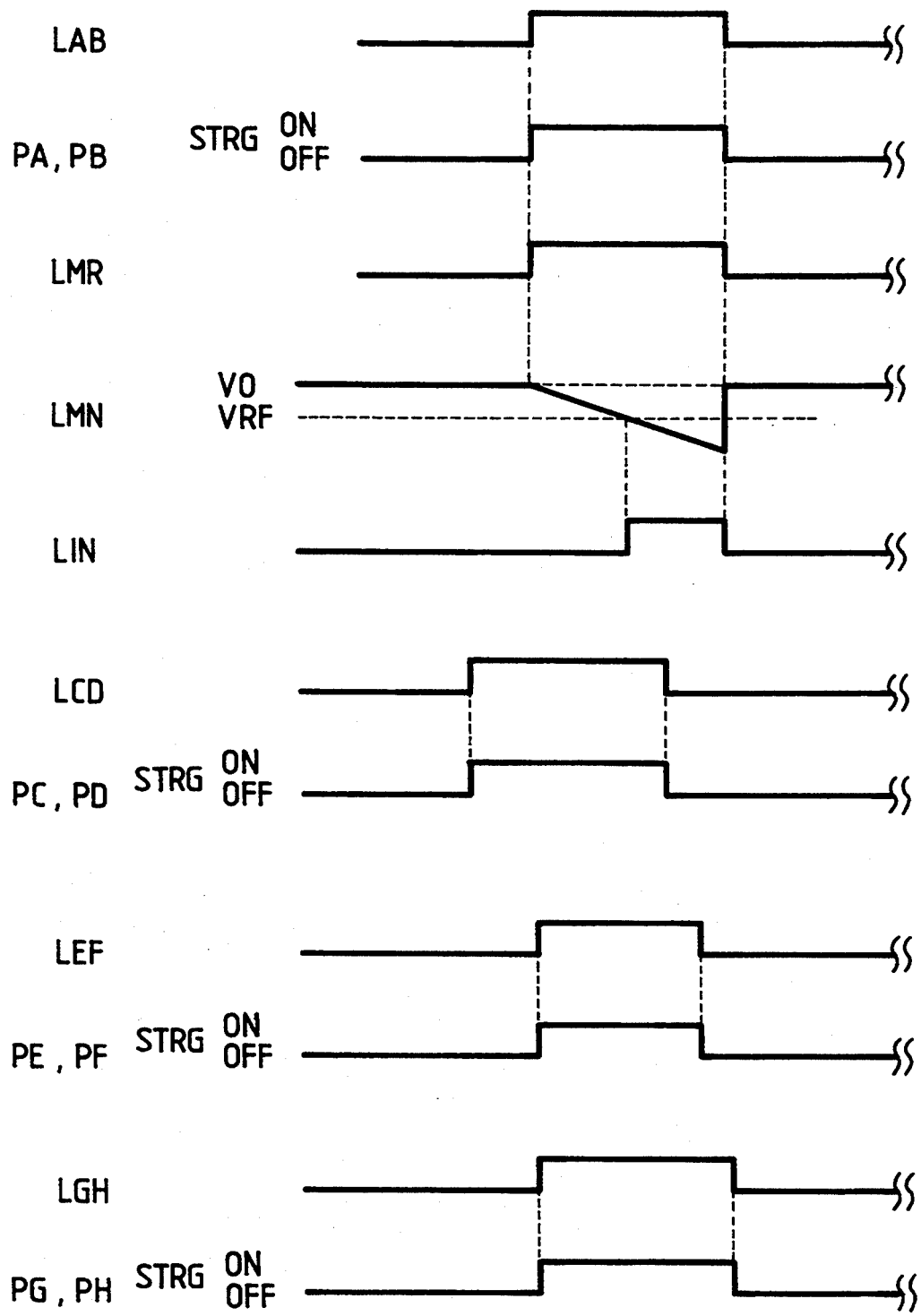
FIG. 7 is a time chart which illustrates the operation of each light sensing portion for starting/completing the charge storage in response to a charge storage control signal.

Symbol MNT represents a monitor light sensing portion disposed in the central portion of the light sensing portion PA, the monitor light sensing portion MNT acting to monitor the quantity of the charge stored in the light sensing portion PA to generate voltage signal LMN which is in proportion to the average value of the quantities of charges stored in the pixels of the central portion of the light sensing portion PA. The monitor light sensing portion MNT is supplied with control signal LMR so that the start/completion of the monitor is controlled in response to the control signal LMR. As shown in FIG. 7, the voltage signal LMN is set to reference voltage V0 when the control signal LMR is in the low level and the light sensing portion PA is storing the charge. When the monitoring operation is commenced, the voltage is lowered from the reference voltage V0 in accordance with the quantity of the charge stored in the monitor light sensing portion MNT.

Next, the interface circuit 7 will be described.

Figure 8:
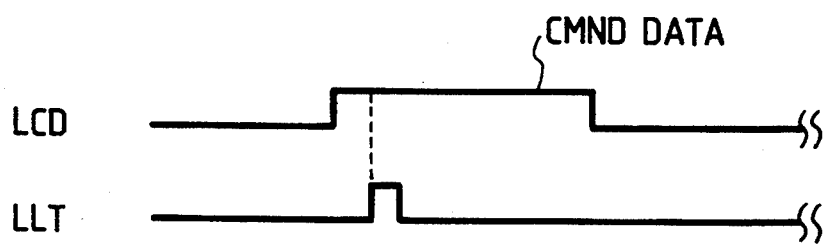
FIG. 8 is a time chart which illustrates command data to be transmitted from a microcomputer to the interface circuit and a latch signal for command data.

Symbol DCD represents a decoder for, as shown in FIG. 8, decoding command data LCD of plural bits transmitted from a port POT1 of the microcomputer 8 in response to latch signal LLT. The decoder DCD supplies command signals LSX and LSE to control circuits CTR1, CTR2A and a switch SWX in accordance with the result of the decoding operation. The control circuit CTR1 supplies signals LAB, LCD, LEF and LGF for controlling the start/completion of the storage of charge to the light sensing portions PA to PH and the transference of the stored charges to the shift registers SRAB to SRH. Furthermore, the control circuit CTR1 supplies control signal LMR for controlling the start/completion of the monitoring operation to the monitor light sensing portion MNT.

The control circuit CTR2 is operated in response to reference clock signal LCK supplied from the microcomputer 8 to supply the operational clocks LP0, LP1 and LP2 to the shift registers SRAB to SRH. Furthermore, the control circuit CTR2 supplies switching signal LSW to the switches SWCD, SWEF and SWGH. In addition, the control circuit CTR2 supplies synchronizing signal LSY to an A/D converter AD of the microcomputer 8 in synchronization with a charge completion signal for each of the light sensing portion PA to PH supplied from the decoder DCD so that output signal LSN transmitted from a secondary amplifier AMPX is A/D converted.

Figure 9:
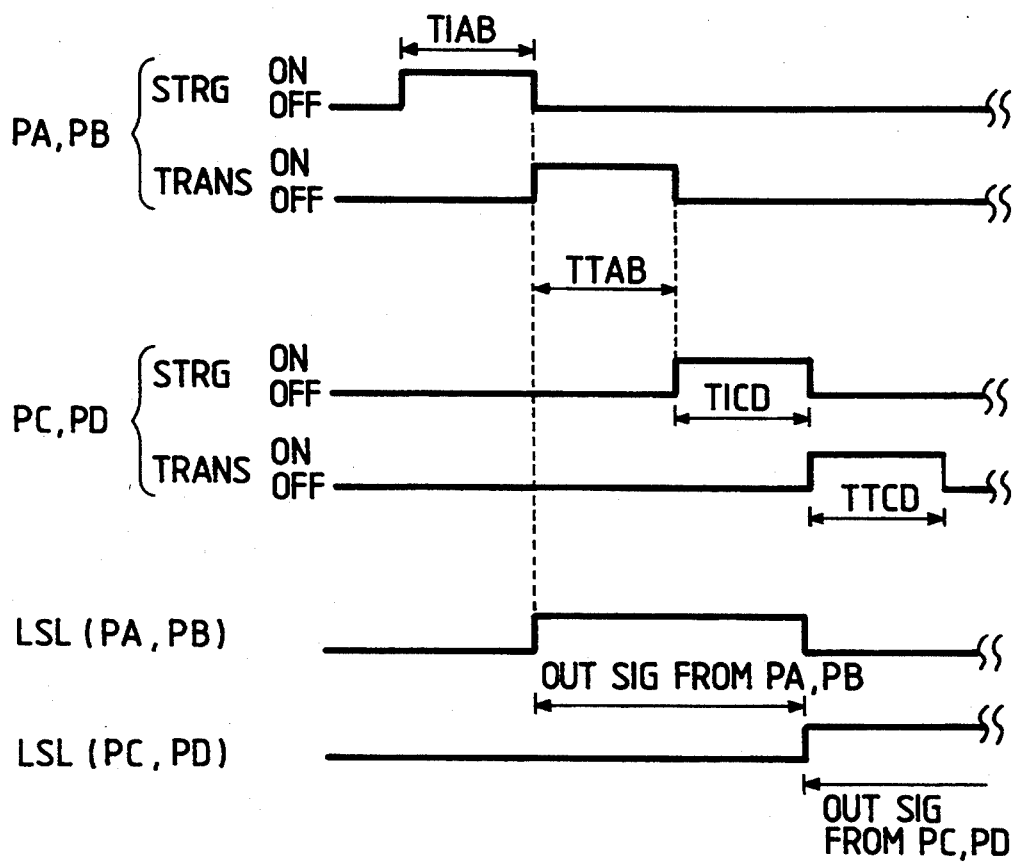
FIG. 9 is a time chart which illustrates subject image signal LSL which is switched over by switch SWX.

A switch SWX switches over output signals LVAB, LVCD, LVEF and LVGH from the primary amplifier AMPAB, switches SWCD, SWEF and SWGH to generate output signal LSL. The above-described switching operation is performed in synchronization with storage completion signals for the light sensing portions PA to PH generated by the decoder DCD. Therefore, outputs corresponding to the above-described light sensing portions are generated in a period from the moment at which the storage in the light sensing portion is completed to the moment at which the storage in the next light sensing portion is completed. For example, as shown in FIG. 9, the output signals transmitted from the light sensing portions PA and PB are transmitted as the signal LSL in a period from the moment at which the storage in the above-described light sensing portion is completed to the moment at which the storages in the next light sensing portions PC and PD are completed. The output signal is switched over at the time when the storage of the charge in the light sensing portions PC and PD is completed so that output signal from the light sensing portions PC and PD are, as the signal LSL, transmitted.

Symbol AMPX represents a secondary amplifier for, by amplifying the output signal LSL transmitted from the switch SWX, generating the output signal LSN of the voltage level which is suitable to perform the A/D conversion. Symbol CMP represents a comparator for comparing the output voltage signal LMN transmitted from the monitor light sensing portion MNT with the reference voltage signal VRF, the comparator CMP acting to raise the level of the signal LIN to the high level when the voltage signal LMN is, as shown in FIG. 7, lowered below the level of the reference voltage signal VRF.

The microcomputer 8 will now be described.

Symbol CLK represents a clock generator for generating reference clock LCK. Symbol TIM represents a timer for controlling the time of the start/completion of the charge storage in each of the light receiving portions PA to PH by counting the clock signals LCK generated in the clock generator CLK. Symbol INT represents an interruption circuit for generating a variety of interruptions to be described later during the execution of a control program. Symbol POT1 represents an output port for supplying command data LCD of plural bits and the latch signal LLT to the interface circuit 7, POT2 represents an output port for supplying the drive signal LMT to the lens drive device 9 and POT3 represents an input port for receiving a mode selection signal and a focal point detection area selection signal from the switch 10.

Symbol AD represents an A/D converter for A/D-converting the output signal LSN transmitted from the second amplifier AMPX in synchronization with synchronization signal LSY and transmitting subject image data which corresponds to the light intensity distribution of the subject image on each of the light sensing portions PA to PH. Symbol DA represents a D/A converter for generating the reference voltage signal VRF to be supplied to the comparator CMP. The reference voltage VRF is determined in such a manner that the average quantity of the stored charge in the central portion of the light receiving portion PA is made to be a suitable level. Symbol CNT represents a counter for counting the pulse signals LEN generated by a pulse generator of the lens drive device 9, the counter CNT monitoring the lens operation quantity of the photographing optical system 2. A RAM is a data memory for storing data about the subject image converted by the A/D converter, a ROM is a program memory for storing a program for controlling the microcomputer 8, a CPU is a central processing unit for executing the program and perform calculations and a BUS is a data bus for transferring various data items in the microcomputer 8.

Figure 10:
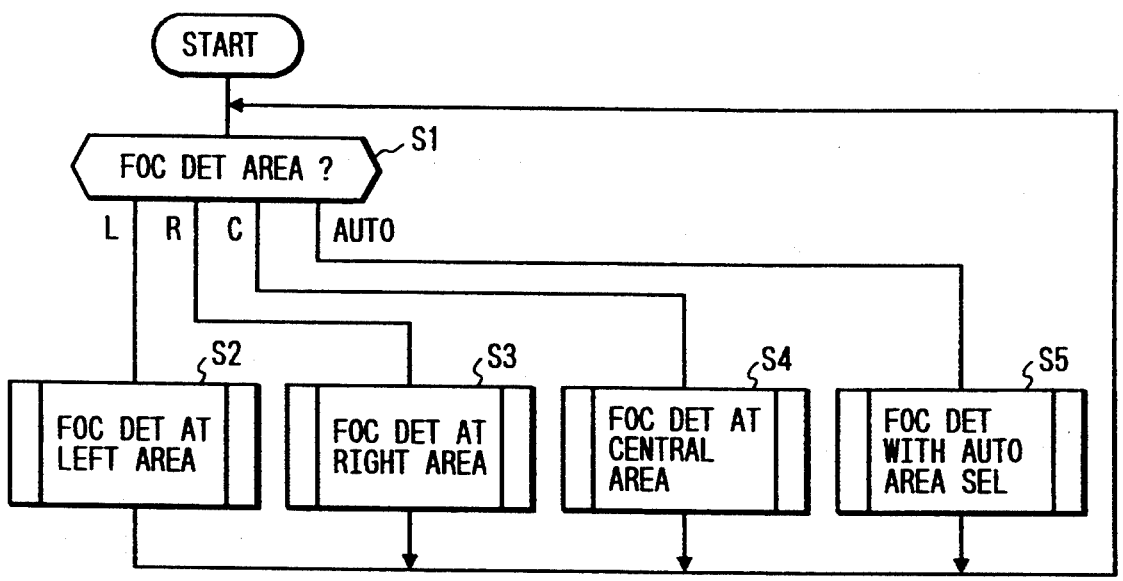
FIG. 10 is a flow chart which illustrates a main program for detecting the focal point.

FIG. 10 illustrates a focal point detection program to be executed in the microcomputer 8. The focal point detection program is started when a shutter release button (omitted from illustration) is depressed by half and arranged in such a manner that it discriminates the focal point detection area selection signal selected by the switch 10 in step S1 after the operation has been started. If the left area 22 is selected as a result of the discrimination, the flow proceeds to step S2. If the right area 24 is selected, the flow proceeds to step S3. If the central area 23 is selected, the flow proceeds to step S4. If the automatic area selection mode is selected, the flow proceeds to step S5. In each of the selected steps, the corresponding sub-routine is execute.

Figure 11A:
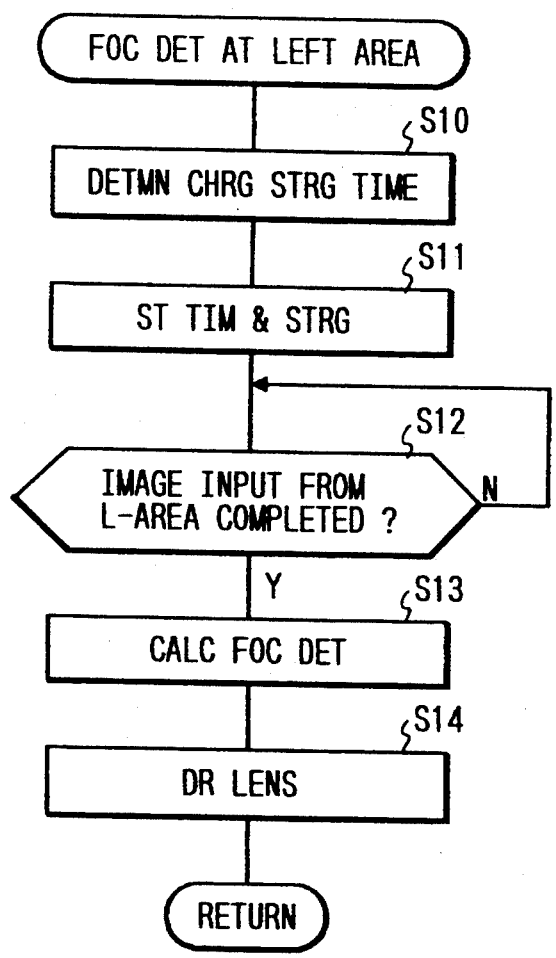
FIG. 11A is a flow chart which illustrates a sub-routine for detecting a left-area focal point.

FIG. 11A illustrates the focal point detection sub-routine at the left area 22. An operation in a case where the left area 22 shown in FIG. 3C is selected as the focal detection area in accordance with the above-described sub-routine will now be described.

Focal point detection area selection signal LAR selected by the switch 10 is received through the port POT3 of the microcomputer 8 so that the charge storage operation in the light sensing portions PE and PF which corresponds to the selected focal point detection left area 22 is permitted, while the charge storage operations in the other portions are inhibited.

Then, in step S10, the charge storage time TIEF for each of the light sensing portions PE and PF is determined. For example, in a case where subject image data at the previous charge storage in each of the light sensing portions PE and PF and storage time data are present in the data memory RAM, the time taken for the average value or the peak value of the subject image data reaches a predetermined value is made to be the present charge storage time TIEF.

Then, in step S11, determined charge storage time TIEF is set to the timer TIM to start the operation. Simultaneously, command data LCD for instructing the commencement of the charge storage in the light sensing portions PE and PF is transmitted to the decoder DCD through the port POT1. Furthermore, the data latch signal LLT is transmitted. The decoder DCD latches command data LCD in synchronization with the first transition edge of the data latch signal LLT to decode command data LCD. The decoder DCD further transmits the control signal LSE for instructing the charge commencement in the light sensing portions PE and PF to the control circuit CTR1. The control circuit CTR1 switches over the control signal LEF for the light sensing portions PE and PF while maintaining the control signals LAB, LCD and LGH for controlling the light sensing portions PA, PB, PC, PD, PG and PH at the non-storage state. As a result, the charge storage into the light sensing portions PE and PF is started.

Figure 11B:
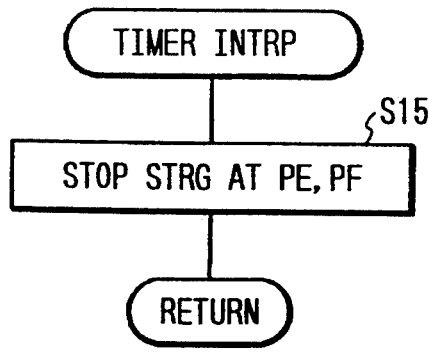
FIG. 11B is a flow chart which illustrates a timer interruption routine at the time of detecting the left-area focal point.

The timer TIM starts the operation of the interruption circuit INT when the established charge storage time TIEF has come so as to execute the timer interruption routine shown in FIG. 11. In step S15 shown in FIG. 11B, command data LCD for instructing the completion of the charge storage in the light sensing portions PE and PF to the decoder DCD through the port POT1 and as well as transmits the data latch signal LLT. The decoder DCD decodes command data LCD to transmit the control signal LSE and LSX for instructing the completion of the charge storage in the light sensing portions PE and PF to the control circuit CTR1 and the switch SWX. The control circuit CTR1, which has received the control signal LSE, switches over the storage control signal LEF for the light sensing portions PE and PF into the non-storage state. As a result, the light sensing portions PE and PF complete the charge storage and, in parallel, transfer the storage charge for each pixel to the shift registers SRE and SRF. The switch SWX, which has received the control signal LSX for instructing the storage completion, switches over the output to the output signal LVEF from the switch SWEF.

Figure 11C:
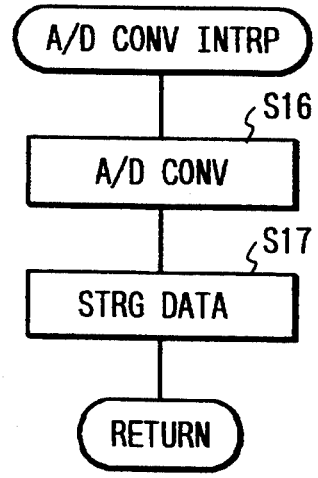
FIG. 11C is a flow chart which illustrates an A/D conversion interruption routine at the time of detecting the focal point at the left area.

The charge transferred to each of the shift registers SRE and SRF is, as the subject image signal LSN (e1, f1, e2, f2, ..., em, fm), transferred in serial to the A/D converter AD via the primary amplifiers AMPE and AMPF, the switches SWEF and SWX and the secondary amplifier AMPX. At this time, the control circuit CTR2, as described above, transmits the synchronizing signal LSY for the A/D conversion to the microcomputer 8 in synchronization with the storage completion signal for the light sensing portions PE and PF supplied from the decoder circuit DCD. As a result, the A/D conversion interruption routine shown in FIG. 11C is started so that the A/D converter AD performs the A/D conversion of the subject image signal LSN in step S16. In the next step S17, the A/D converter AD stores converted subject image data e1, e2, ..., em, f1, f2, ..., fm into the data memory RAM before the flow returns.

In step S12 shown in FIG. 11A after the process has returned, the completion of the receipt of the subject image signal is confirmed before the flow proceeds to step S13. In step S13, a conventional correlation calculation is performed in accordance with subject image data stored in the data memory RAM so that the quantity of deviation between a pair of subject images formed in the light sensing portions PE and PF to detect the quantity of defocus of the photographing optical system 2. The time taken to detect the focal point at the left area 22 is set to TAEF.

In step S14, the instruction value of the lens drive quantity and the driving direction are calculated in accordance with the detected quantity of defocus so as to transmit the results to the lens drive device 9 via the port POT2. The lens drive device 9 drives the photographing optical system 2 to perform the focusing operation in response to the drive signal LMT. At this time, the pulse signal LEN generated by the pulse generator of the lens drive device 9 is fed back to the counter CNT. When the result of counting performed by the counter CNT reaches the instructed value of the quantity of the lens operation, the drive stop signal LMT is transmitted through the port POT2 as a result of the internal interruption process so that the operation of the lens is stopped. As shown in FIG. 12, the time taken from the commencement of the lens operation to the completion after the focal point detection calculating time TAEF has passed is set to lens drive time TDRV.

By sequentially performing the charge storage, the charge transfer, the focal point detection calculation and the lens drive operations as described above, the focal point of the photographing optical system 2 for photographing the subject image in the focal point detection at left area 22 in the image photographing surface 2 is adjusted.

Since the focal point detection operation at the right area 24 is similarly performed to that at the left area 22, its description is omitted here.

The focal point detection operation to be performed in a case where the automatic area selection mode is set by the switch 10 will now be described.

In this case, in step S5 shown in FIG. 10, the focal point detection sub-routine of the automatic area selection mode is executed in such a manner that, in accordance with the results of the focal point detections obtained in the four focal point detection areas 22, 23a, 23b and 24 shown in FIG. 3A, the area which has generated the quantity of defocus which shows the nearest subject of the four areas 22, 23a, 23b and 24 is automatically selected. Then, in accordance with the quantity of defocus of the selected area, the photographing optical system 2 is caused to perform the focusing operation.

In a case where the focal point detection is performed in the automatic area selection mode thus-arranged, the microcomputer 8 cannot simultaneously process output signals which correspond to the quantity of charge stored in the light sensing portions PE and PF, PA and PB, PC and PD and PG and PH corresponding to the four areas 22, 23a, 23b and 24. Therefore, it is necessary to control the commencement and the completion of the charge storage in the light sensing portions for the purpose of preventing the overlap of the transfer time of the output signals transmitted from the light sensing portions PA to PH. Therefore, the output signals are transferred in such a manner that the sequential order of transferring the output signals transmitted from the light sensing portions is determined and the output signals from the ensuing light sensing portions are sequentially transferred after the output signal transmitted from the previous light sensing portion has been transferred. As a result, the time taken to complete the focal detection can be shortened and the structure of the control circuit can be simplified. The transfer order is determined in such a manner that a central horizontal area 23a is given first priority because the main subject is usually positioned in the central area 23 and the ensuing order is determined as the central vertical area 23b, the left area 22 and the right area 24. The transfer times of each of the light sensing portions PA to PH are constant and they are not changed due to the various conditions.

Figure 13A:
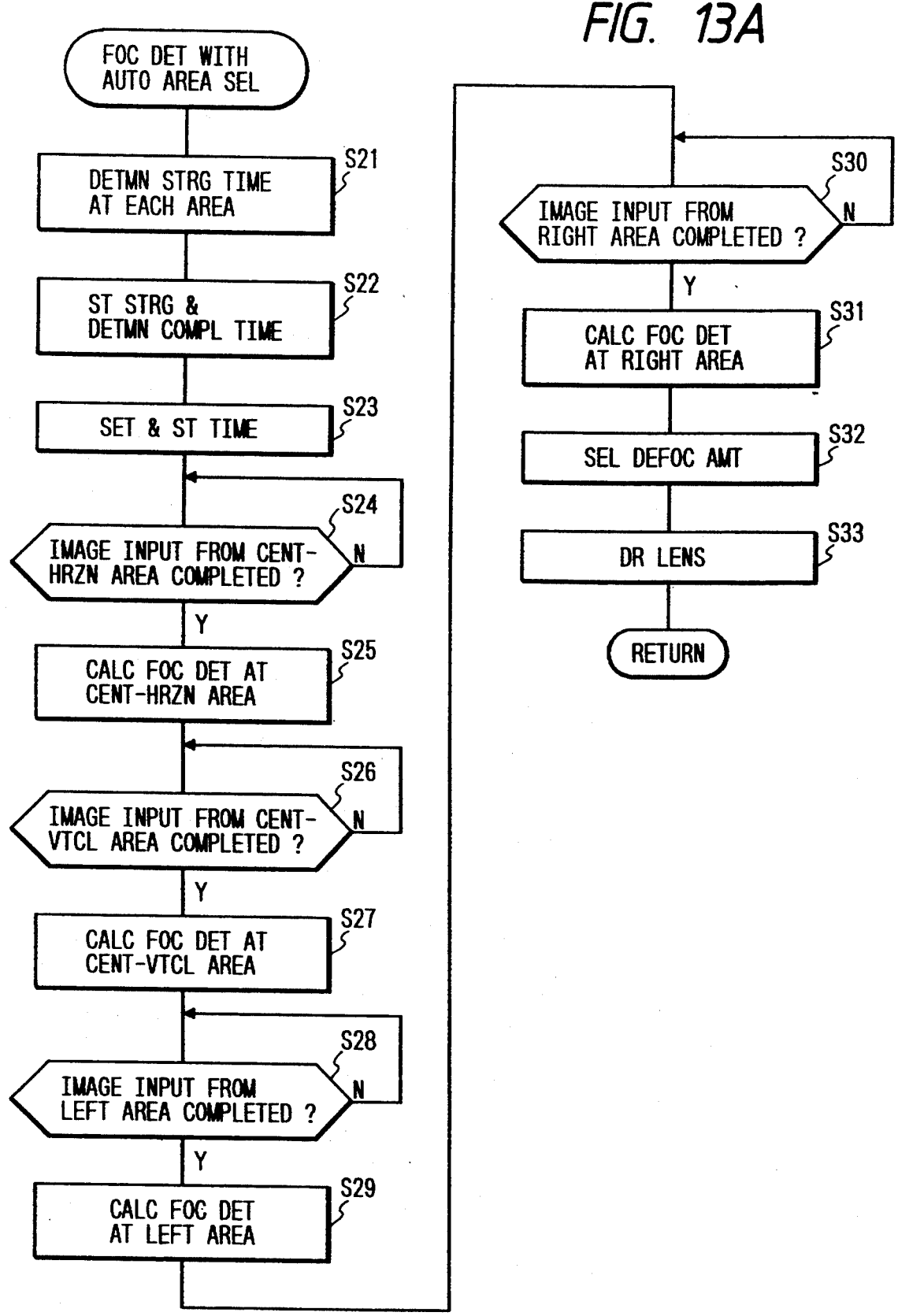
FIG. 13A is a flow chart which illustrates a sub-routine for detecting the focal point in an automatic area selected mode.
Figure 13B:
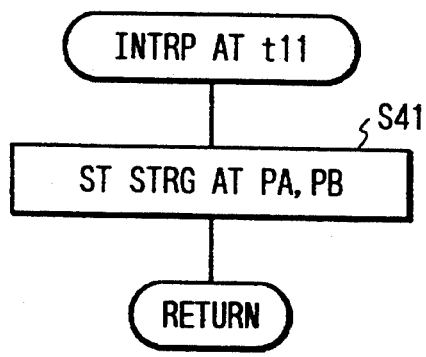
FIGS. 13B to 13I are flow charts which illustrate a timer interruption routine for starting/completing the charge storage performed by each light sensing portion.
Figure 13C:
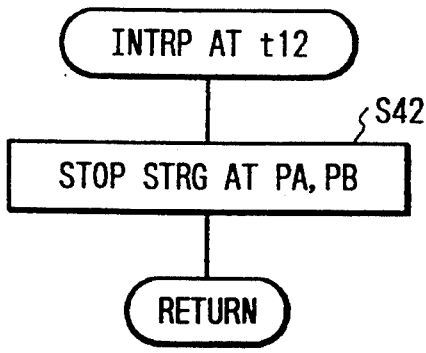
Figure 13D:
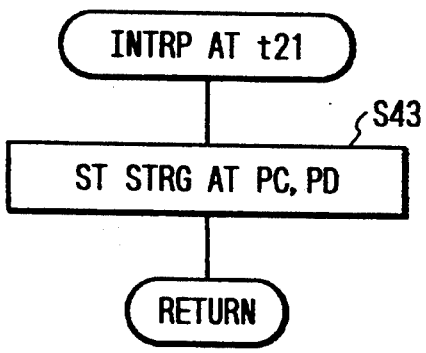
Figure 13E:
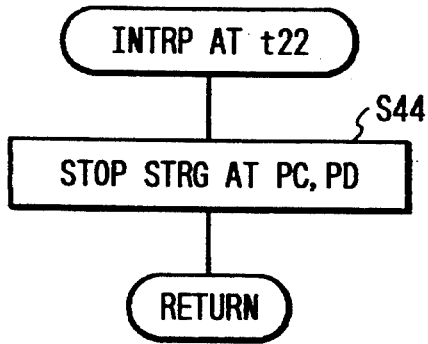
Figure 13F:
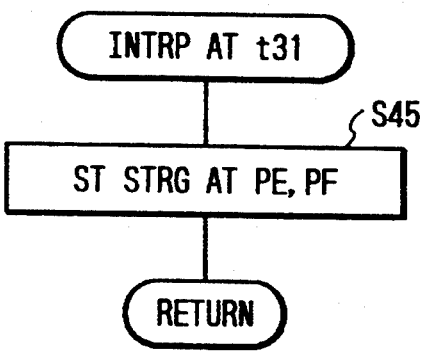
Figure 13G:
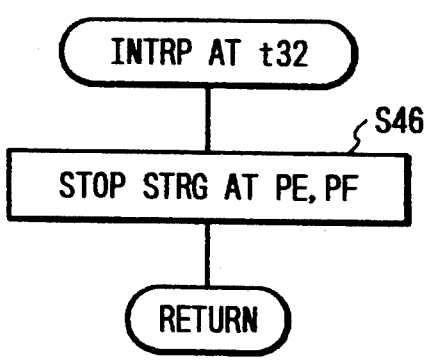
Figure 13H:
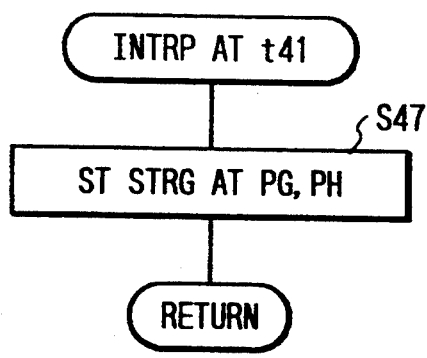
Figure 13I:
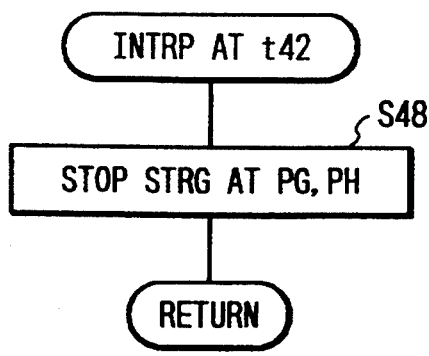

FIG. 13A is a flow chart which illustrates the focal point detection sub-routine in the automatic area selection mode. FIGS. 14 to 18 are time charts for controlling the image sensor SNS. With reference to the drawings, the focal point detection operation in the automatic area selection mode will now be described., For easy understanding it will be assumed that charge storage commencement time t11 for the light sensing portions PA and PB is set to be reference time t11=0.

In step S21, charge storage time TIAB for the light sensing portions PA and PB, charge storage time TICD for the light sensing portions PC and PD, charge storage time TIEF for the light sensing portions PE and PF and charge storage time TIGH for the light sensing portions PG and PH are determined in accordance with previous data for the corresponding light sensing portions.

In next step S22, the charge storage commencement time and the completion time for each of the light sensing portions PA to PH are determined in accordance with the following sequence while making the charge transfer time for the light sensing portion pairs PA and PB, PC and PD, PE and PF and PG and PH to be TTAB, TTCD, TTEF and TTGH.

Charge storage time TIAB for the light sensing portions PA and PB is determined in accordance with the storage time in the previous charge storage operation. Therefore, the following determinations are made such that storage commencement time t11=0 for the light sensing portions PA and PB, the storage completion time t12=TIAB and charge transfer completion time t13=TIAB+TTAB.

In a case where charge storage time TICD for the light sensing portions PC and PD is longer than the storage time and the transfer time TIAB+TTAB for the light sensing portions PA and PB, the storage commencement time t21 for the light sensing portions PC and PD is made to hold a relationship t21=0 and the storage completion time t22 is made to hold a relationship t22=TICD. Since the transfer is performed immediately after the charge has been stored, transfer completion time t23 is made to hold a relationship t23=TICD+TTCD.

On the contrary, in a case where charge storage time TICD for the light sensing portions PC and PD is shorter than the storage time and the transfer time TIAB+TTAB for the light sensing portions PA and PB, storage time TICD is compared with a predetermined time, for example, transfer time TTAB for the light sensing portions PA and PB. If storage time TICD is longer than transfer time TTAB, it is determined that storage commencement time t21 is made to hold a relationship t21=t13−TICD for the light sensing portions PC and PD and as well as storage completion time t22 is made to hold a relationship t22=t13 so that the charge storage in the light, sensing portions PC and PD is completed at transfer completion time t13 for the light sensing portions PA and PB. Therefore, transfer completion time t23 for the light sensing portions PC and PD is made to hold a relationship t23=t13+TTCD. In a case where storage time TICD is shorter than transfer time TTAB, it is determined that the storage commencement time t21 holds a relationship t21=t13 and as well that storage completion time t22 holds a relationship t22=t13+TICD so that charge commencement time t21 for the light sensing portions PC and PD is made to be the transfer completion time for the light sensing portions PA and PB. Therefore, transfer completion time t23 holds a relationship t23=t13+TICD+TTCD.

In a case where storage time TIEF for the light sensing portions PE and PF is longer than the time from storage commencement time t11 for the light sensing portions PA and PB to transfer completion time t23 for the light sensing portions PC and PD, storage commencement time t31 for the light sensing portions PE and PF is made to hold a relationship t31=0. Therefore, it is determined that storage completion time t32 for the light sensing portions PE and PF is made to hold a relationship t32=TIEF and transfer completion time t33=TIEF+TTEF.

In a case where storage time TIEF for the light sensing portions PE and PF is shorter than the time from storage commencement time t11 for the light sensing portions PA and PB to transfer completion time t23 for the light sensing portions PC and PD, storage time TIEF for the light sensing portions PE and PF is compared with a predetermined time, for example, transfer time TTCD for the light sensing portions PC and PD. If it is longer than transfer time TTCD, it is determined that storage commencement time t31 is made to hold a relationship t31=t23−TIEF and storage completion time t32 is made to hold a relationship t32=t23 so that the storage into the light sensing portions PE and PF is completed at a transfer completion time t23 for the light sensing portions PC and PD. Therefore, transfer completion time t33 for the light sensing portions PE and PF is made to hold a relationship t33=t23+TTEF. If storage time TIEF is shorter than transfer time TTCD, it is determined that t31=t23 so that storage commencement time t31 is made to be the transfer completion time for the light sensing portions PC and PD. Therefore, storage completion time t32 is made to hold a relationship t32=t23+TIEF and transfer completion time t33 is made to hold a relationship t33=t23+TIEF+TTEF.

In a case where storage time TIGH for the light sensing portions PG and PH is longer than the time from storage commencement time t11 for the light sensing portions PA and PB to transfer completion time t33 for the light sensing portions PE and PF, storage commencement time t41 for the light sensing portions PG and PH is made to hold a relationship t41=0. Therefore, it is determined that the storage completion time t42 for the light sensing portion PE and PF is made to hold a relationship t42=TIGH and transfer completion time t43=TIGH+TTGH.

In a case where storage time TIGH for the light sensing portions PG and PH is shorter than the time from storage commencement time t11 for the light sensing portions PA and PB to transfer completion time t33 for the light sensing portions PE and PF, storage time TIGH is compared with a predetermined time, for example, transfer time TTEF for the light sensing portions PE and PF. If it is longer than transfer time TTEF, it is determined that storage commencement time t41 is made to hold a relationship t41=t33−TIGH and storage completion time t42 is made to hold a relationship t42=t33 so that the storage into the light sensing portions PG and PH is completed at a transfer completion time t33 for the light sensing portions PE and PF. Therefore, transfer completion time t43 for the light sensing portions PG and PH is made to hold a relationship t43=t33+TTGH. If storage time TIGH is shorter than transfer time TTEF, it is determined that t41=t33 so that storage commencement time t41 is made to be the transfer completion time for the light sensing portions PE and PF. Therefore, storage completion time t42 is made to hold a relationship t42=t33+TIGH and transfer completion time t43 is made to hold a relationship t43=t33+TIGH+TTGH.

Then, in step S23, storage commencement time t11, t21, t31 and t41 and storage completion time t12, t22, t32 and t42 for the pairs of the light sensing portions PA and PB, PC and PD, PE and PF and PG and PH thus-determined are set to the timer TIM to start the operation.

FIGS. 13B to 13I illustrate interruption routine for the timer TIM for starting/completing the storage into the pairs of the light sensing portions PA to PH. The microcomputer 8 transmits command data LCD for instructing the storage commencement/completion for each pair of light sensing portions PA to PH to the decoder DCD through the port POT1 in accordance with the interruption at each set time for the timer TIM and as well as transmits the data latch signal LLT. The decoder DCD receives the data latch signal LLT to latch and decode command data LCD.

If command data LCD is the commencement command for the charge storage in the light sensing portions PA to PH, the decoder DCD transmits the control signal LSE for instructing the commencement of the charge storage to the control circuit CTR1 as described above. The control circuit CTR1 transmits the corresponding control signals (LAB to LGH) for instructing the commencement of the storage to the light sensing portion which is instructed to commence the charge storage so that the charge storage is commenced. When the light sensing portions PA and PB are caused to commence the charge storage, the control signal LAB is transmitted and as well as the control signal LMR for instructing the commencement of monitoring is transmitted to the monitor MNT so that the monitoring of the charge storage status of each of the light sensing portions PA and PB is commenced.

If command data LCD is an instruction of the completion of the charge storage for the light sensing portions PA to PH, the control signals LSE and LSX for instructing the completion of the charge storage to the control circuits CTR1, CTR2 and the switch SWX. The control circuit CTR1 transmits the corresponding control signals (LAB to LGH) for instructing the completion of the storage to the light sensing portion which is instructed to complete the charge storage so that the charge storage is completed. The light sensing portion, which has received the storage completion command, completes the storage and as well as, in parallel, transfers the charges stored in the shift register (SRAB to SRH). In response to the storage completion command LSX, the switch SWX, as its output, selects the output signal from the light sensing portion which has completed the charge storage. Furthermore, the control circuit CTR2 transmits the synchronizing signal LSY to the A/D converter AD in synchronization with the storage completion command LSE so as to A/D convert the subject image signal LSN for the light sensing portion which has completed the charge storage.

In each of the interruption routines shown in FIGS. 13B to 13I, the flow returns to the sub-routine after the charge storage of the instructed light sensing portion has been started/completed.

Figure 13J:
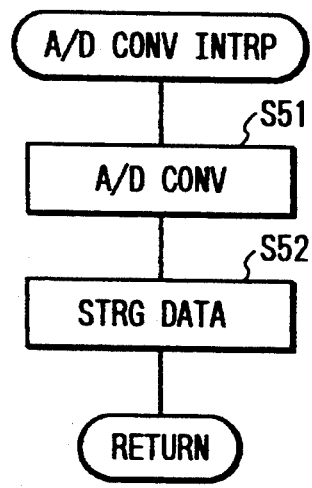
FIG. 13J is a flow chart which illustrates the A/D conversion interruption routine.

FIG. 13J illustrates an A/D conversion interruption routine to be started in synchronization with the synchronizing signal LSY. After the storage has been completed, the charges, which have been transferred to the shift registers corresponding to the light sensing portions, are, as described, transferred to the A/D converter AD as the subject image signal LSN via the primary amplifiers AMPAB, AMPC to AMPH, switches SWCD, SWEF, SWGH, SWX and the secondary amplifier AMPX in response to the clock signals LP0 to LP2 and LSW for the control circuit CTR2. In step S51 shown in FIG. 13J, the above-described subject image signal LSN is A/D converted, and in next step S52, the A/D converted subject image data is stored in the data memory RAM before the flow returns to the sub-routine shown in FIG. 13A.

In steps S24 to S31 shown in FIG. 13A, the supply of subject image data for each light sensing portion is confirmed in the central horizontal area 23a (light sensing portions PA and PB), the central vertical area 23b (light sensing portions PC and PD), the left area 22 (light sensing portions PE and PF) and the right area 24 (light sensing portions PG and PH) in the above-described sequential order. Then, the subject image data is processed in accordance with the correlation calculation algorithm so that the quantity of the image deviation of the subject image formed in each pair of the light sensing portions PA, PB, PC, PD, PE, PF, PG and PH. Furthermore, the quantity of defocus is detected in accordance with the thus-obtained quantity of image deviation. In this state, the focal point detection calculating time for the pairs of the light sensing portions PA, PB, PC, PD, PE, PF, PG and PH are, as shown in FIG. 14, made to be TAAB, TACD, TAEF and TAGH.

In next step S32, the optimum quantity of defocus is selected from the quantity of defocus detected for each area in accordance with a predetermined algorithm. The above-described quantity of defocus is a quantity which shows the nearest position. In step S33, the instructed value of the photographing lens operation quantity and the operational direction are calculated in accordance with the selected quantity of defocus so that the lens drive signal LMT is transmitted to the lens drive device 9 through the port POT2. The lens drive device 9 causes the photographing optical system 2 to perform the focusing operation in response to the drive signal LMT and as well causes the pulse signal LEN from the pulse generator for monitoring the quantity of the lens operation to the counter CNT. When the count made by the counter CNT reaches the instructed value of the quantity of the lens operation, the internal interruption is generated so that the control signal LMT for instructing the operation stop is transmitted through the port POT2. As a result, the operation of the photographing lens is stopped.

After the above-described processes have been completed, the flow returns to the program shown in FIG. 10 and the ensuing charge storage operation is commenced.

Figure 13K:
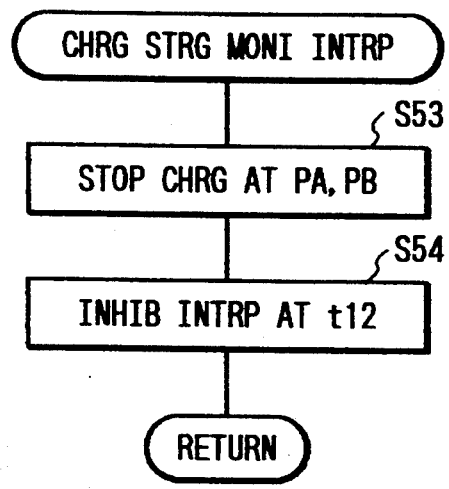
FIG. 13K is a flow chart which illustrates a chart storage monitor interruption routine.

FIG. 13K illustrates a charge storage monitor interruption routine. FIG. 15 is a control time chart for the image sensor SNS in the above-described case.

When the voltage signal LMN for the monitor light sensing portion MNT is lowered below the reference voltage signal VRF of the D/A converter DA before the generation of the storage completion command from the microcomputer 8 to the central horizontal area 23a of the light sensing portions PA and PB, the comparator CMP raises comparison signal LIN. The first transition of the comparison signal LIN is detected by the interruption circuit INT of the microcomputer 8 so that the charge storage interruption routine shown in FIG. 13K is started. As described above, the storage into the light sensing portions PA and PB is completed in step S53 shown in FIG. 13K. In next step S54, the generation of the interruption at storage completion time t12 for the light sensing portions PA and PB set for the time TIM is inhibited. That is, the storage completion time for the light sensing portions PA and PB by means of the charge storage monitor interruption is not the predetermined time t12 determined by the microcomputer 8 but it is time tx shown in FIG. 15 at which a fact that the stored charge in the pixel in the central portion of the light sensing portion PA has reached a predetermined level is detected by the monitor light sensing portion MNT. Since the transference of the charge stored in the light sensing portions PA and PB is arranged to be performed prior to the transference of the same of the light sensing portions PC to PH, the transference operation of the light sensing portions PA and PB does not overlap the transference operation of the other light sensing portions even if the charge storage into the light sensing portions PA and PB is completed faster than the predetermined time set in response to the monitor signal LMN. Since the operations are the same as the above-described operations except for the storage completion action of the light sensing portions PA and PB, their descriptions are omitted here.

In the photoelectrically converting apparatus having a plurality of light sensing portions and a common output signal terminal, the transference operation does not, in terms of time, overlap the transference operation of the other light sensing portions by arranging the structure in such a manner that the transference operation of the light sensing portion the charge storage of which is controlled by means of the monitor light sensing portion is performed faster than the transference operations of the other light sensing portions.

FIG. 14 is a time chart for controlling the image sensor in a case where the subject image in the focal point detection area displays high brightness. When the subject displays high brightness, the charge storage time for each of the light sensing portions PA to PH is short. Therefore, the charge storage and the charge transference operations for each of the light sensing portions do not overlap in terms of the time and, therefore, the charge storage and the transference are performed in accordance with the predetermined sequential order of the light sensing portions. Furthermore, the storage and the transference of the charge of the ensuing light sensing portion are performed immediately after the storage and the transference of the charge of the previous light sensing portion have been completed.

However, when the subject displays low brightness, the charge storage time for each of the light sensing portion becomes long. Therefore, if the charge storage control for the light sensing portion is performed similarly to the above-described high brightness case, the focal point detection time becomes too long, causing the reliability to be deteriorated. Therefore, the storage control is performed while making overlap the charge storage time for each light sensing portion in a case where the subject display low brightness. Also in this case, the focal point detection operation for the central horizontal area 23a, at which there is a large possibility of the presence of the subject, is given priority to the other light sensing portions.

Figure 16:
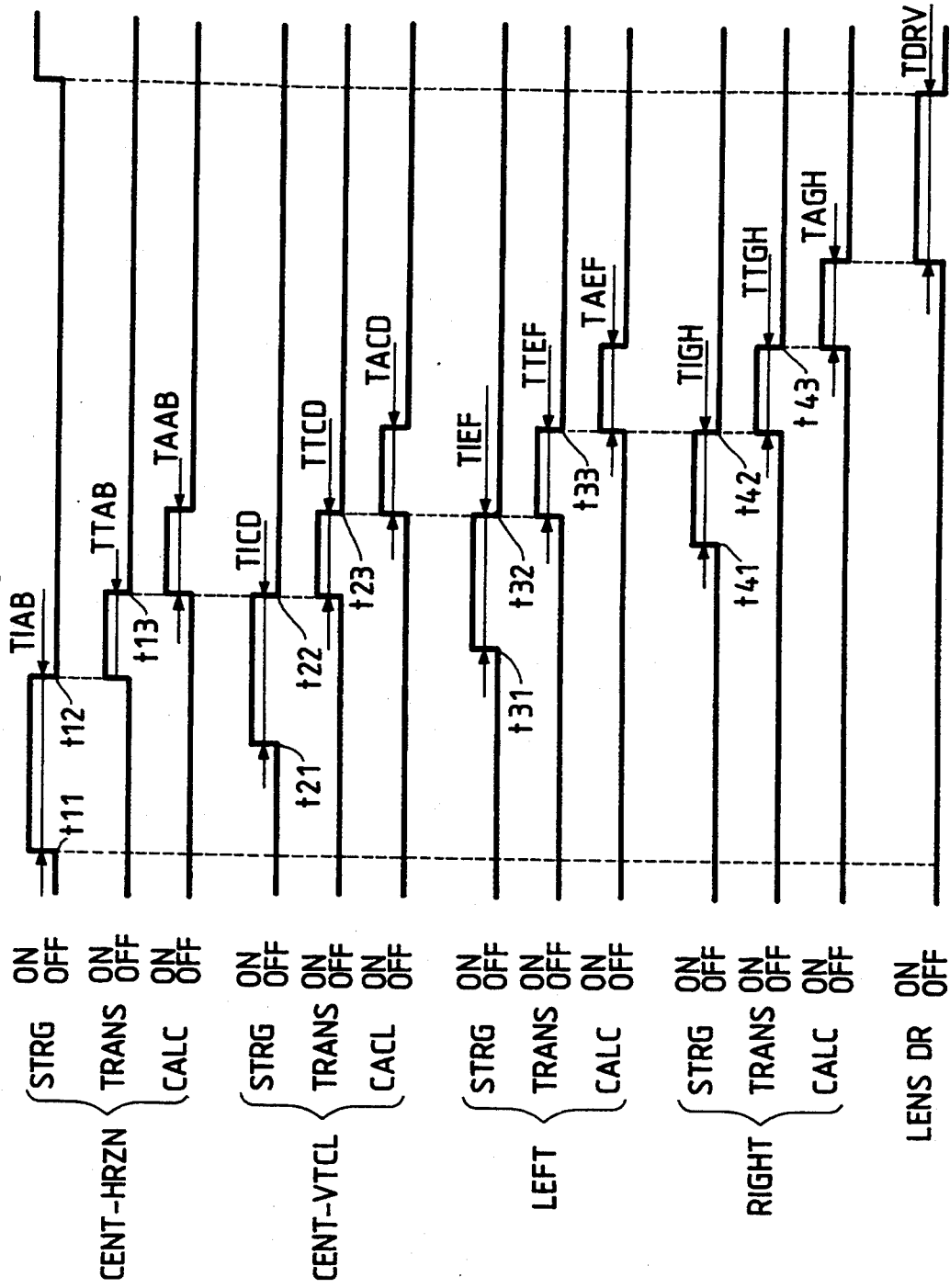
FIG. 16 is a time chart which illustrates an operation of controlling the image sensor in a low brightness mode.
Figure 17:
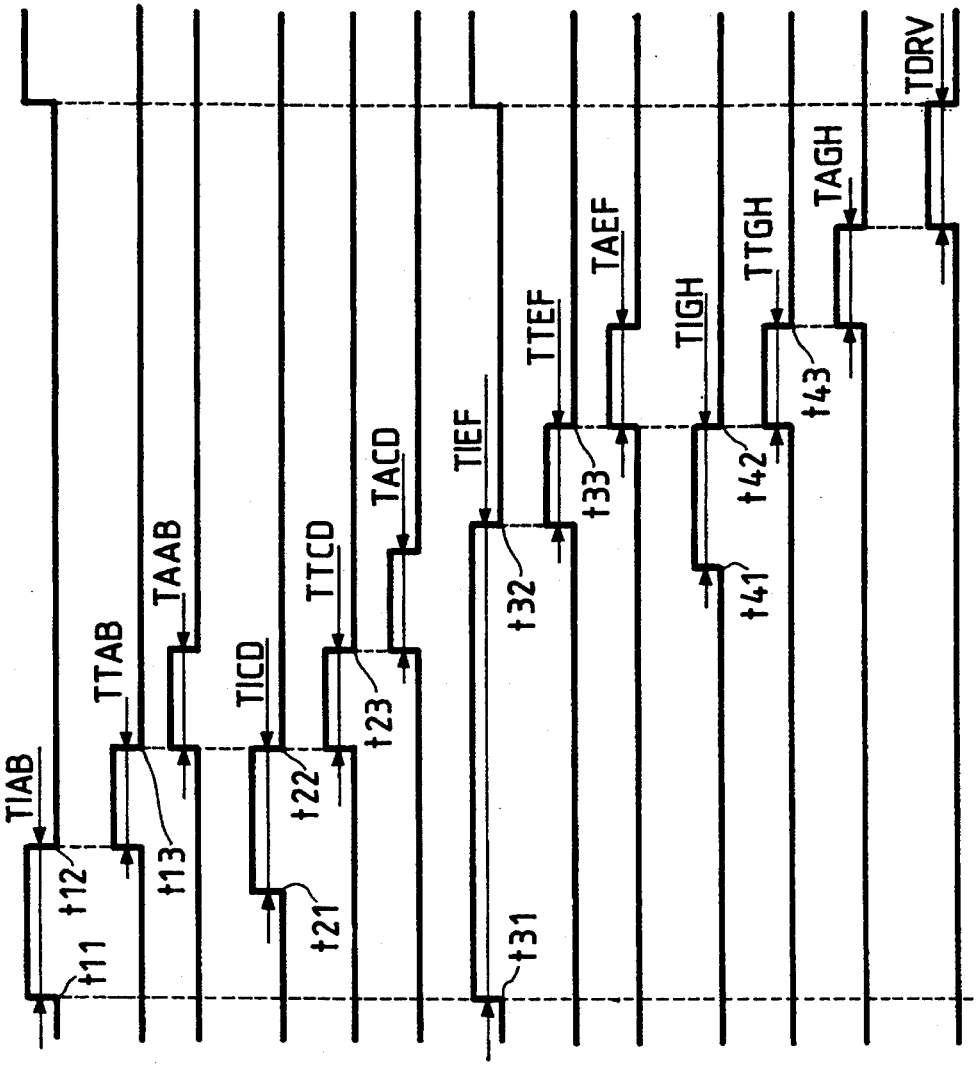
FIG. 17 is a time chart which illustrates an operation of controlling the image sensor in the low brightness mode and in a case where the time in which the charge is stored at the left area is considerably long.

FIGS. 16 and 17 are time charts for controlling the image sensor SNS in a case where the subject image in the focal point detection area displays low brightness.

Referring to FIG. 16, the charge storage time for each of the light sensing portions is made to be longer than the light sensing portions of the faster transfer order and as well the same is made to be shorter than the time from storage commencement time t11 for the central horizontal area 23a to the transference completion time (t13, t23 and t33) for the light sensing portions of the faster transfer order. In this case, the storage control is performed in such a manner that the charge storage times for the light sensing portions are made overlap because the subject image displays low brightness. Furthermore, the transfer completion time for the light sensing portion of the faster transfer order and the storage completion time for the next light sensing portion are made to be the same time.

Referring to FIG. 17, similarly to FIG. 16, the charge storage time for each of the light sensing portions is made to be longer than the light sensing portions of the faster transfer order and as well the same is made to be shorter than the time from storage commencement time t11 for the central horizontal area 23a to the transference completion time (t13, t23 and t33) for the light sensing portions of the faster transfer order. However, only storage time TIEF for the light sensing portions PE and PF at the left area 22 is longer than the time from storage commencement time t11 for the light sensing portions PA and PB at the central horizontal area 23a to transference completion time t23 for the light sensing portions PC and PD at the central vertical area 23b. In this case, the control is performed similarly to that shown in FIG. 16 except for the structure arranged in such a manner that storage commencement time t31 for the light sensing portions PE and PF at the left area 22 is made to be the same as storage commencement time t11 for the light sensing portions PA and PB at the central horizontal area 23a.

Figure 18:
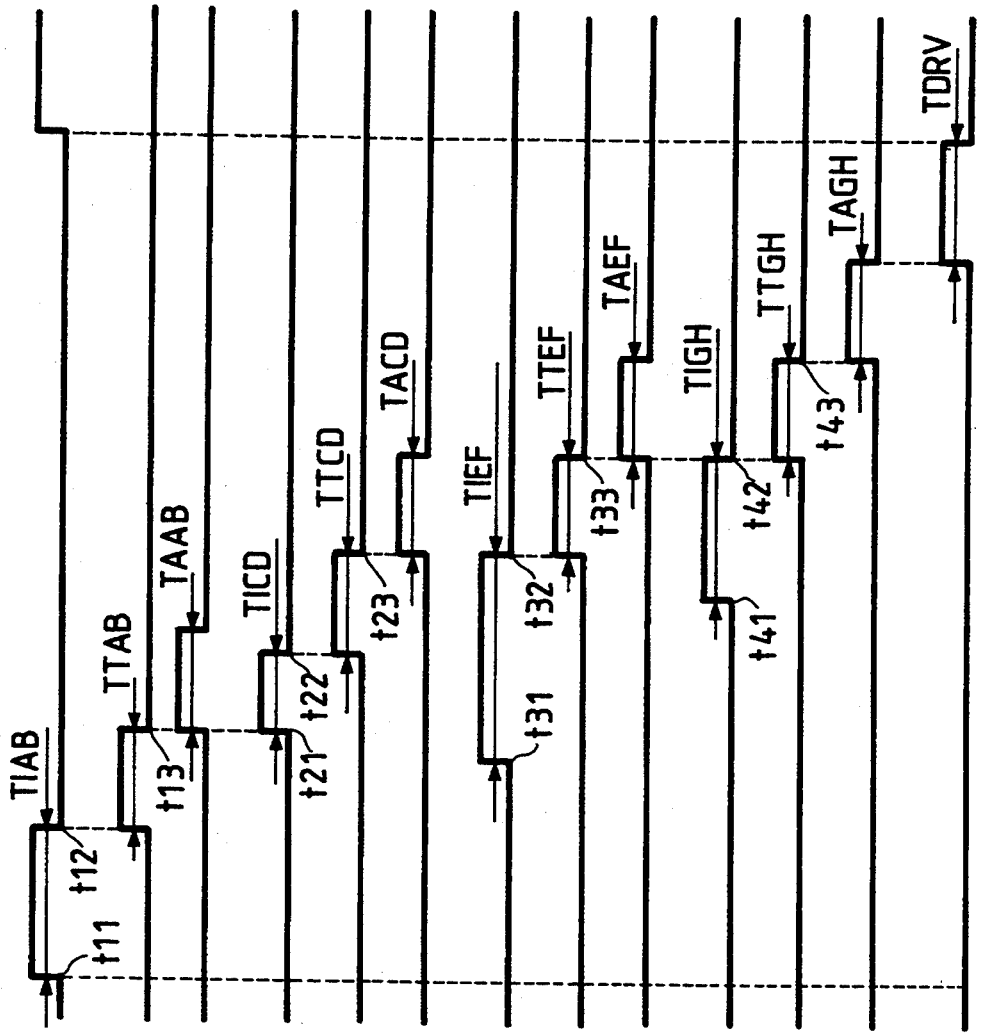
FIG. 18 is a time chart which illustrates an operation of controlling the image sensor in a case where the subject image at the left area is low brightness and the subject images at the other areas are high brightness.

FIG. 18 is a time chart for controlling the image sensor in a case where only the central vertical area 23b of the image photographing surface displays high brightness and the other areas display low brightness. As shown in FIG. 18, storage time TICD for the light sensing portions PC and PD at the central vertical area 23b is shorter than transfer time TTAB for the light sensing portions PA and PB at the central horizontal area 23a of the faster transfer order. Furthermore, storage times TIEF and TIGH for the other light sensing portions are longer than transfer times TTCD and TTEF for the other light sensing portions of the faster transfer order. In addition, the above-described storage times TIEF and TIGH are shorter than the time from storage commencement time t11 for the light sensing portions PA and PB at the central horizontal area 23a to transfer completion time (t23 and t33) for the light sensing portion of the faster transfer order. In this case, since the central vertical area 23b displays high brightness, the charge storage is commenced after the transference of the charge in the central horizontal area 23a of the faster transfer order has been completed. On the other hand, since the other areas display low brightness, the storage is controlled in such a manner that the storage completion time is made to be the transfer completion time for the light sensing portion of the faster transfer order.

The focal point detection operation to be performed when the central area 23 is selected is arranged to be similar to the focal detection operation to be performed when the automatic area selection mode is set except for the omission of the focal detection operation at the left area 22 and the right area 24. Therefore, the description about it is omitted here.

As described above, the transfer order of the charges stored in the light sensing portions which correspond to a plurality of focal point detection areas is made in such a manner that the central horizontal area 23a, in which there is the largest possibility of positioning of the main subject, is given the first priority and the ensuing order is made as the central vertical area 23b, the left area 22 and the right area 24. Furthermore, the commencement/completion of the charge storage for each of the light sensing portion is controlled in such a manner that the charge storage into the next light sensing portion can be immediately performed after the charge stored in the previous light sensing portion has been transferred. Therefore, the conventional necessity of temporarily storing subject image data in the data memory for the purpose of preventing overlap of the transference time for each light sensing portion can be eliminated. Therefore, the focal point detection time can be shortened because the stored charge can be transferred in a short time. Furthermore, the focal point detection accuracy can be improved because calculations can be performed in response to the subject image signal displaying a high S/N ratio.

Furthermore, the transference of the charge of the central horizontal area 23a including the center of the image photographing surface is arranged to be performed prior to those for the other light sensing portions. Therefore, the result of the detection of the focal point in the central portion of the frame in which there is a large possibility of positioning of the main subject image can quickly be obtained. In this case, a discrimination may be made whether or not the charge storage and the charge transference are continuously performed in accordance with the result of the detection of the focal point in the central portion of the frame. For example, if the quantity of defocus is smaller than a predetermined value as a result of the detection of the focal point in the central portion of the frame, a discrimination is made that the main subject is positioned at the central portion of the frame and thereby the charge storage and the charge transference operations for the other light sensing portions are stopped. Thus, the focal point detection time can further be shortened.

In a case where the subject displays high brightness and the charge storage time for each of the light sensing portions is shorter than a predetermined time, the transference of the charge of the next light sensing portion is commenced after the charge of the light sensing portion of the fast transfer order has been transferred. In a case where the subject displays low brightness and the charge storage time for each of the light sensing portion is longer than a predetermined time, the charge storage times of the light sensing portions are made overlap while maintaining the above-described charge transference method. Therefore, the necessity of performing a complicated timing storage control operation in a short time can be eliminated at the time of high brightness in which the storage time is short. As a result, the structure of the control circuit can be simplified. On the other hand, the focal point can be detected in a short time at the time of low brightness in which the storage time is long.

Furthermore, the storage is completed when the monitor light sensing portion detects a fact that the quantity of the charge stored in the light sensing portion PA which corresponds to the focal point detection area disposed at the center of the frame reaches a predetermined time. Therefore, the storage time can be shortened and the focal point detection time can further be shortened. Furthermore, the charge storage into the other light sensing portion is commenced after the charge storage commencement time for the above-described light sensing portion PA. Therefore, the charge transfer times for the light sensing portions do not overlap even if the charge storage into the light sensing portion PA is completed faster than a predetermined time in response to a signal supplied from the monitor light sensing portion.

In addition, in the manual mode, only the light sensing portion, which corresponds to the selected focal point detection area is subjected to the charge storage. Therefore, the focal detection time can be shortened by a degree corresponding to the charge storage time required for the unnecessary light sensing portion.

In the structure of the above-described embodiment, the focal point detection module 6 constitutes the focal point detection optical system 101, the charge storage type light sensing portion 102 and the transfer means 103, the microcomputer 8 constitutes the focal point detection calculating means 104, the microcomputer 8 and the interface circuit 7 constitute the control means 105, the monitor light sensing portion MNT constitutes the monitor means 106 and the switch 10 constitutes the selection switch 107.

As described above, according to the present invention, the transference of the charge stored in each of a plurality of light sensing portions which correspond to a plurality of focal point detection areas on the photographing image is performed in accordance with a predetermined transference order for the light sensing portion. Furthermore, the commencement and the completion of the storage of charge into the light sensing portions are controlled in such a manner that the charge stored in the next light sensing portion is transferred after the charge stored in the light sensing portion of the faster order has been transferred. Therefore, the stored charge can be transferred in a short time and the focal point detection time can be shortened. Furthermore, the focal point detection calculation can be performed in response to a high S/N ratio subject image signal so that the focal detection accuracy can be improved. In addition, the conventional necessity of providing a memory for temporarily storing the charge can be eliminated so that the structure of the light sensing portion and that of the transfer means can be simplified. In addition, the manufacturing cost can be reduced.

The focal point detection apparatus according to this embodiment is arranged in such a manner that the transference of the charge stored in the light sensing portion, which corresponds to the focal point detection area including the center of the image photographing surface is performed prior to that for the other light sensing portions. Therefore, the result of the detection of the focal point at the center of the frame in which there is a large possibility of positioning of the main subject can quickly be obtained. If the result thus-obtained is satisfactory, the charge storage and the transference of the same of the other light sensing portion are stopped so that the focal detection time can further be shortened.

The focal point detection apparatus according to this embodiment is arranged in such a manner that the charge storage into the light sensing portion is completed when the monitor means detects the fact that the charge stored in the light sensing portion which corresponds to the focal point detection area including the center of the image photographing surface reaches a predetermined quantity. Therefore, the focal point detection time can be shortened.

The focal point detection apparatus according to this embodiment is arranged in such a manner that the charge storage into the other light sensing portions is commenced after the charge storage time for the light sensing portion which corresponds to the focal point detection area including the center of the image photographing surface. Therefore, the result of detecting the focal point in the area including the center of the frame can always quickly be obtained in comparison to the result of detection of the focal point for the other areas.

The focal point detection apparatus according to this embodiment is arranged in such a manner that the transference of the charge in the next light sensing portion is commenced after the charge of the previous light sensing portion of the faster transference order has been transferred in a case where the charge storage time for the light sensing portion is shorter than a predetermined time. Therefore, the necessity of performing the charge storage and the transference control at complicated timing in a short time can be eliminated, and the structure of the control circuit can be simplified.

The focal point detection apparatus according to this embodiment is arranged in such a manner that only the light sensing portion, which corresponds to the selected focal point detection area, is subjected to the charge storage when the manual mode is selected by the mode selection means. Therefore, the focal point detection time can be shortened by a degree corresponding to the charge storage time and the charge transference time required for the light sensing portion of the unnecessary area.

Figure 19:
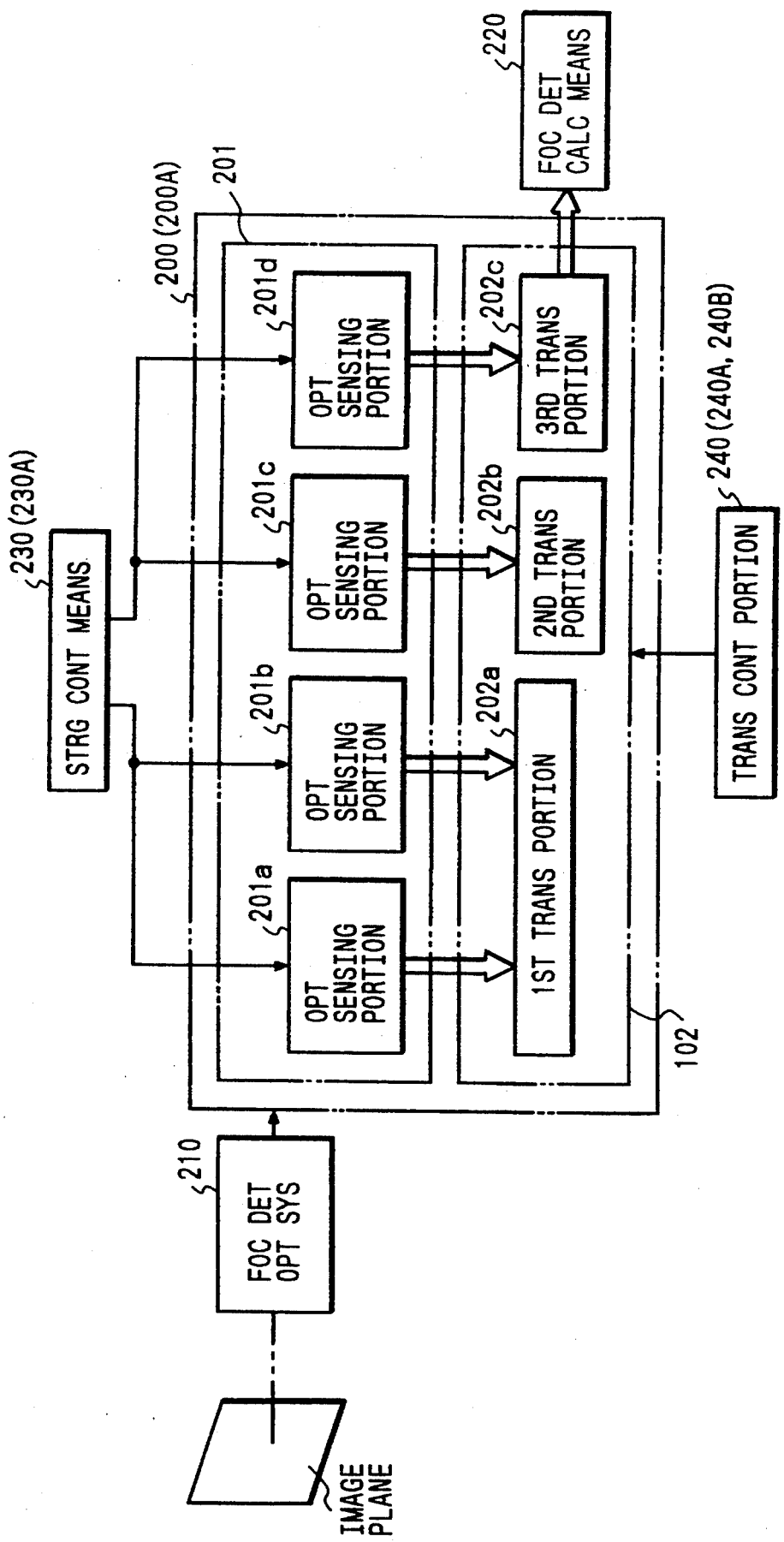
FIG. 19 illustrates another embodiment of the present invention.

Referring to FIG. 19, another embodiment of the present invention will now be described. The focal point detection apparatus according to this embodiment comprises a photoelectrical conversion means 200 including a plurality of pairs of charge storage type light sensing portions 201 which are disposed to correspond to a plurality of focal point detection areas established on the image photographing surface and each pair of which receives a pair of beams introduced from each of the focal point detection areas by a focal point detection optical system 210. The photoelectrical conversion means 200 further includes a transfer means 202 for converting the charge stored at the time of the completion of storage of charge into the light sensing portion 201 into an electric signal to transfer it to a focal point detection calculating means 220. The transfer means 202 has a first transfer portion 202a commonly provided for at least a pair of light sensing portions 201a and 201b, a second transfer portion 202b and a third transfer portion 202c individually provided for the other pair of light sensing portions 201c and 201d. The focal detection apparatus further comprises a charge control means 230 for controlling the charge storage time for the light sensing portion 201 and a transfer control means 240 for controlling the transfer time of the transfer means 202.

A storage control means 230A of the focal point detection apparatus controls the storage commencement and the completion of each of a plurality of pairs of the light sensing portion 201 in order to prevent overlap in terms of the time of the charge transfer of a plurality of the light sensing portions 201 performed by the transfer means 202 after the charge storage has been completed. A transfer control means 240A controls the first transfer portion 202a in such a manner that the charge of the light sensing portion 201b of a pair of the light sensing portions 201a and 201b is transferred after the charge of the other light sensing portion 201a has been transferred. The transfer control means 240A further controls the second transfer portion 202b and the third transfer portion 202c in such a manner that the charges are alternately transferred from the pixels of the light sensing portions 201c and 201d of a pair of the light sensing portions 201c and 201d in which the second and the third transfer portions 202b and 202c are provided.

The focal point detection apparatus according to this embodiment is arranged in such a manner that at least two focal point detection areas of a plurality of the focal point detection areas are disposed to intersect each other. Furthermore, the focal point detection apparatus comprises the first transfer portion 202a commonly provided for either pair composed of the light sensing portions 201a and 201b of the two pairs of the light sensing portions 201 which correspond to the above-described focal point detection areas in such a manner that the first transfer portion 202a is disposed between the other pair composed of the light sensing portions 201c and 201d. In addition, it further comprises the second and third transfer portions 202b and 202c provided for the other pair of the light sensing portions 201c and 201d for each of the light sensing portions 201c and 201d. By the action of the transfer control means 240B, the first transfer portion 202a transfers the charge of the light sensing portion 201b after the charge of the light sensing portion 201a has been transferred. The second and the third transfer portions 202b and 202c control the transfer means 202 in such a manner that the charges are alternately transferred from the pixels of the light sensing portions 201c and 201d.

The storage control means 230 of the focal point detection apparatus performs the transfer of the charge stored in the light sensing portion 201 in accordance with a predetermined order for a pair of the sensing portions 201. The storage control means 230 further controls the commencement and the completion of each charge storage into a pair of the light sensing portions 201 in such a manner that the charges in the pair of the light sensing portions 201c and 201d are continuously transferred after the charges in the pair of the light sensing portions 201a and 201b of the faster transfer order have been transferred. The transfer control means 240A controls the first transfer portion 202a so that the charge in the light sensing portion 201b is transferred after the charge in the other light sensing portion 201a of the pair of the light sensing portions 201a and 201b in which the first transfer portion 202a is provided has been transferred. It further controls the second and the third transfer portions 202b and 202c in such a manner that the charges are alternately transferred from the pixels of the pair of the light sensing portions 201c and 201d in which the second and the third transfer portions 202b and 202c are provided.

The transfer control means 240B of the focal point detection apparatus controls the transfer means 202 in such a manner that the first transfer portion 202a transfers the charge in the light sensing portion 201b after the charge in the other light sensing portion 201a has been transferred. In addition, the transfer control means 240B controls the same in such a manner that the second and the third transfer portions 202b and 202c alternately transfer the charges from the pixels of the corresponding light sensing portions 201c and 201d.

Therefore, even if the focal point detection area is established in any place in the image photographing surface, the charge stored in each of the light sensing portions 201 can be transferred to the focal point detection calculating means 220 in the shortest time while eliminating noise during the transference.

Now, with reference to FIGS. 20A and 20B, the description will be made about the relationship between the above-described focal point detection areas established on the image photographing surface 21 and the light sensing portion and the shift register on the image sensor SNS which corresponds to the focal point detection area.

On the image sensor SNS, four pairs of light sensing portions PE, PF, PA, PB, PC, PD PG and PH are disposed to correspond to the left area 22 of the focal detection, the central horizontal area 23a, the central vertical area 23b and the right area 24. A common register SRAB is provided for a pair of the light sensing portions PA and PB of the above-described light sensing portions so as to transfer the charges in the sequential order as the light sensing portion PA and the light sensing portion PB. Since the shift register SRAB is disposed between the light sensing portions PC and PD forming the other pair, a common shift register cannot be provided. Therefore, the shift registers SRC and SRD are individually provided to transfer the charges of the pixels of the light sensing portions PC and PD. Since the distance between a pair of light sensing portions PE and PF and another pair of light sensing portions PG and PH is too long to provide a common shift register, shift registers SRE, SRF, SRG and SRH are individually provided to alternately transfer charges of the pixels of the light sensing portions forming the pairs similarly to the above-described shift registers SRC and SRD.

As described above, the transference of the charges of the four pairs of the light sensing portions disposed to correspond to the four focal point detection areas in the image photographing surface is performed in a predetermined sequential order as the pairs of the light sensing portions PA, PB, PC, PD, PE, PF, PG and PH after the charge has been stored. In order to continuously transfer charges in the next pair of the light sensing portions after the charges in the pair of the light sensing portions of the faster order have been transferred, the commencement and the completion of the charge storage into each pair of the light sensing portions are controlled. Furthermore, the charges in the pair of the light sensing portion PA and PB in which the common shift register SRAB is provided are transferred in such a manner that the charge of the light sensing portion PB is transferred after the charge in the other light sensing portion PA has been transferred. The charges in the pair of the light sensing portions PC, PD, PE, PF, PG and PH in which the shift registers SRC, SRD, SRE, SRF, SRG and SRH are individually provided are transferred in such a manner that the charges are alternately transferred from the pixels in the corresponding light sensing portions. As a result, the conventional necessity of temporarily storing the signal into the memory in order to prevent the overlap of the charge transfer time can be eliminated. Therefore, the S/N ratio can be improved, causing the focal detection accuracy to be improved. In addition, the stored charge can be transferred in a short time so that the focal point detection time can be shortened.

In addition, since the memory on the image sensor can be omitted from the structure, the structure of the circuit of the image sensor chip can be simplified and the reliability can be improved. In addition, the manufacturing cost can be reduced.

FIGS. 21 to 26 illustrate a modification to the configuration of the focal point detection areas, the light sensing portions on the image sensor and the shift registers provided on the image photographing surface 21.

Figure 20A:
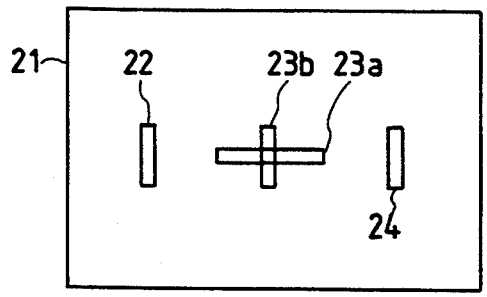
FIG. 20A illustrates another example of the configuration of the focal point detection areas.
Figure 20B:
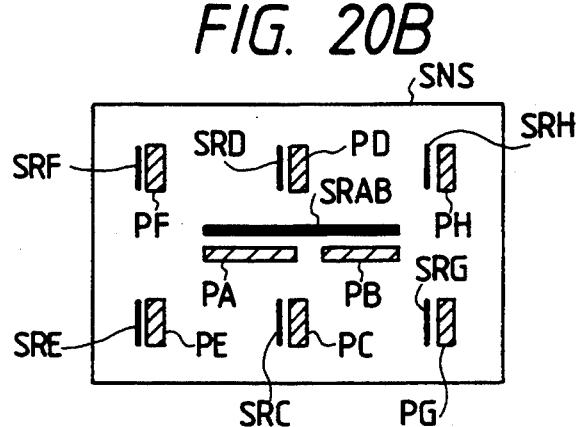
FIG. 20B illustrates an example of the configuration of the light sensing portions and the shift registers on the image sensors which correspond to the focal point detection areas.
Figure 21:
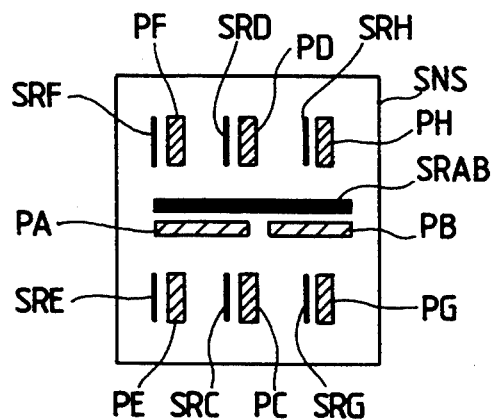
FIG. 21 illustrates another example of the configuration of the light sensing portions and the shift registers on the image sensors which correspond to the focal point detection areas shown in FIG. 20A.

Referring to FIG. 21, the focal point detection areas on the image photographing surface 21 are established at the same positions as that shown in FIG. 20A. A pair of light sensing portions PE and PF and a pair of light sensing portions PG and PH of the light sensing portions on the image sensor are respectively disposed adjacent to the center. As a result, the shift registers SRE, SRF, SRG and SRH are disposed above and below the shift register SRAB. The above-described structure can be realized by providing an eccentricity between the condenser lenses FC and FL of the focal point detection optical system shown in FIG. 4 and the eccentricity between openings RE, RF, RG and RH of the diaphragm mask RXX and the separator lenses SE, SF, SG and SH or by disposing an optical member such as a prism having a deflection effect in the optical system. Since the operation performed by the focal point detection apparatus is the same as that according to the above-described embodiment, its description is omitted here.

By disposing the light sensing portions and the shift registers on the image sensor SNS as described above, the area of the chip of the image sensor can be reduced and thereby the cost can be reduced.

Figure 22A:
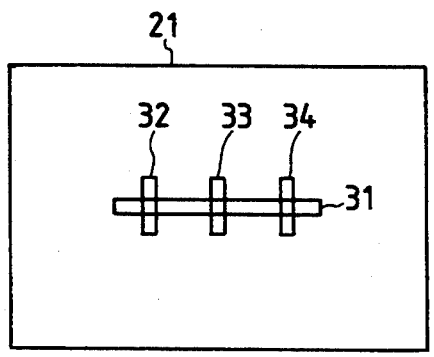
FIG. 22A illustrates another example of the configuration of the focal point detection areas.
Figure 22B:
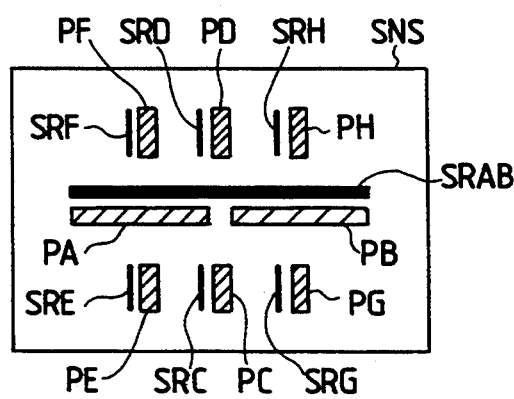
FIG. 22B illustrates an example of the configuration of the light sensing portions and the shift registers on the image sensors which correspond to the focal point detection areas shown in FIG. 22A.

Referring to FIGS. 22A and 22B, the focal point detection area 31 is disposed at the horizontal center of the image photographing surface 21 and a left vertical area 32 is disposed at the left of the surface 21 to intersect the central horizontal area 31, a central vertical area 33 is disposed at the center and a right vertical area 34 is disposed at the right of the same. On the image sensor SNS, a pair of light sensing portions PA, PB, PE, PF, PC, PD, PG and PH are disposed to correspond to the above-described focal point detection areas 31, 32, 33 and 34. Furthermore, the common shift register SRAB is provided for the light sensing portions PA and PB. Since the common shift register cannot be provided for the light sensing portions PC, PD, PE, PF, PG and PH, individual shift registers SRC, SRD, SRE, SRF, SRG and SRH are provided. Since the operation of the above-described focal point detection apparatus is the same as that of the above-described apparatus shown in FIGS. 20A and 20B, its description is omitted here.

Referring to FIGS. 23A and 23B, an area 35 is disposed in the left horizontal direction of the image photographing surface 21 and an area 36 is disposed in the right horizontal direction of the same. Furthermore, an area 37 is disposed in the left vertical direction to intersect the above-described areas 35 and 36, respectively. An area 38 is disposed in the right vertical direction of the same. On the image sensor SNS, pairs of light sensing portions PA, PB, PC, PD, PE, PF, PG and PH are disposed to correspond to the above-described focal point detection areas 35, 36, 37 and 38. Furthermore, common shift registers SRAB and SRCD are provided for the light sensing portions PA, PB, PC and PD. In addition, since a common shift register cannot be provided for each of the light sensing portions PE, PF, PG and PH, individual shift registers SRE, SRF, SRG and SRH are provided.

In the focal point detection apparatus thus constituted, in order to continuously transfer the charge for each of the pairs of the light sensing portions after the charge has been complete, the commencement and the completion of the charge storage for each of the pairs of the light sensing portions PA, PB, PC, PD, PE, PF, PG and PH are controlled. In the pair of the light sensing portions PA and PB, the common shift register SRAB is used to transfer the charge of the light sensing portion PA before the charge of the light sensing portion PB is transferred. Similarly, in the pair of the light sensing portions PC and PD, the common shift register SRCD is used to transfer the charge of the light sensing portion PC before the charge of the light sensing portion PD is transferred. On the other hand, in the light sensing portions PE and PF each having individual shift register, the shift registers SRE and SRF are used to alternately transfer the stored charge for the pixels of the corresponding light sensing portions PE and PF. Similarly, in the light sensing portions PG and PH, the shift registers SRG and SRH are used to alternately transfer the stored charge for the pixels of the corresponding light sensing portions PG and PH.

FIG. 24 illustrates a structure arranged such that the focal point detection areas are disposed similarly to that shown in FIG. 23A and as well as the configuration of the light sensing portions PA to PH corresponding to the areas on the shift register SNS are arranged similarly. However, the two pairs of the light sensing portions PA, PB, PC and PD have four light sensing portions which correspond to a common shift register SRABCD. On the other hand, the other pairs of the light sensing portions PE, PF, PG and PH are arranged to correspond to individual shift registers SRE, SRF, SRG and SRH.

In the focal point detection apparatus thus constituted, the commencement and completion of the charge storage for each pairs of the light sensing portions PA, PB, PC, PD, PE, PF, PG and PH are controlled. The light sensing portions PA to PD with which the common shift register is provided are processed such that the charge of the light sensing portion PA is transferred before the charge of the light sensing portions PB, PC and PD are sequentially transferred in this sequential order. On the other hand, the pairs light sensing portions PE, PF, PG and PH with which individual shift registers are provided are processed in such a manner that charge of the pixels of the pairs of the light sensing portions are respectively transferred similarly to the apparatus shown in FIGS. 23A and 23B.

In the structure shown in FIGS. 25A and 25B, an area 39 is disposed in the left horizontal direction of the image photographing image 21 and an area 40 is disposed in the vertical direction of the same. Furthermore, an area 41 is disposed in the central horizontal direction of the image photographing surface 21, an area 42 is disposed in the right vertical direction of the image photographing surface 21 and an area 43 is disposed in the horizontal direction of the same in such a manner that the above-described areas do not intersect each other. On the image sensor SNS, pairs of light sensing portions PC, PD, PG, PH, PA, PB, PI, PJ, PE and PF are disposed to correspond to the above-described focal point detection areas 39, 40, 41, 42 and 43. Furthermore, common shift registers SRAB, SRCD and SREF are provided for the light sensing portions PA, PB, PC, PD, PE and PF. In addition, since no common shift register can be provided for the light sensing portions PG, PH, PI and PJ, individual shift registers SRG, SRH, SRI and SRJ are provided for the corresponding light sensing portions.

In the focal point detection apparatus thus constituted, in order to continuously transfer charges which have been stored, the commencement and the completion of the of the charge storage for each of the pairs of the light sensing portions PA, PB, PC, PD, PE, PF, PG, PH, PI and PJ are controlled. The charges of the light sensing portions PA and PB are transferred in such a manner that the common shift register SRAB is used to transfer the charge of the light sensing portion PB after the charge of the light sensing portion PA has been transferred. The charges of the light sensing portions PC and PD are transferred in such a manner that the common shift register SRCD is used to transfer the charge of the light sensing portion PD after the charge of the light sensing portion PC has been transferred. Furthermore, the charges of the light sensing portions PE and PF are transferred in such a manner that the common shift register SREF is used to transfer the charge of the light sensing portion PF after the charge of the light sensing portion PE has been transferred. On the other hand, the charges of the light sensing portions PG and PH provided with the individual shift registers are transferred in such a manner that the shift registers SRG and SRG are used to alternately transfer the charges of the pixels of the light sensing portions PG and PH. Similarly, the charges of the light sensing portions PI and PJ are transferred in such a manner that the shift registers SRI and SRJ are used to alternately transfer the charges of the pixels of the light sensing portions PI and PJ.

Figure 26A:
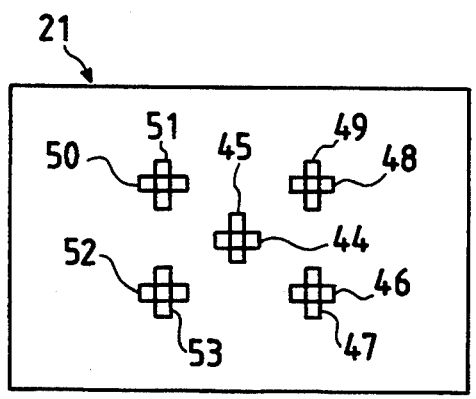
FIG. 26A illustrates another example of the configuration of the focal point detection areas.
Figure 26B:
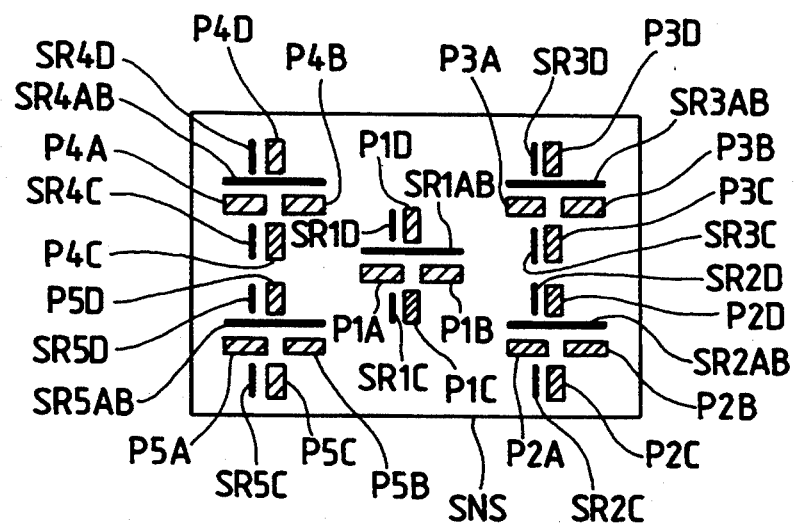
FIG. 26B illustrates an example of the configuration of the light sensing portions and the shift registers on the image sensors which correspond to the focal point detection areas shown in FIG. 26A.

In the structure shown in FIGS. 26A and 26B, an area 44 is disposed in the central horizontal direction of the image photographing surface 21, an area 45 is disposed in the vertical direction to intersect the area 44, an area 46 is disposed in the right below horizontal direction of the image photographing surface 21, an area 47 is disposed in the vertical direction to intersect the area 46, an area 48 is disposed in the upper right horizontal direction of the image photographing surface 21, an area 49 is disposed in the vertical direction to intersect the area 48, an area 50 is disposed in the upper left horizontal direction of the image photographing surface 21, an area 51 is disposed in the vertical direction to intersect the area 50, an area 52 is disposed in the lower left horizontal direction of the image photographing surface 21 and an area 53 is disposed in the vertical direction to intersect the area 52. On the image sensor SNS, light sensing portions P1A, P1B, P1C, P1D, P2A, P2B, P2C, P2D, P3A, P3B, P3C, P3D, P4A, P4B, P4C, P4D, P5A, P5B, P5C and P5D are disposed to correspond to the above-described focal point detections areas 44 to 53. Furthermore, the horizontal pairs of the light sensing portions P1A, P1B, P2A, P2B, P3A, P3B, P4A, P4B, P5A and P5B are provided with common shift registers SR1AB, SR2AB, SR3AB, SR4AB and SR5AB. Since no common shift registers can be provided for the residual vertical directional pairs of the light sensing portions P1C, P1D, P2C, P2D, P3C, P3D, P4C, P4D, P5C and P5D, individual shift registers SR1C, SR1D, SR2C, SR2D, SR3C, SR3D, SR4C, SR4D, SR5C and SR5D are provided.

In the focal point detection apparatus thus constituted, in order to continuously transfer the chargers, the commencement and the completions of the charges are controlled for each of the pairs of the light sensing portions P1A, P1B, P1C, P1D, P2A, P2B, P2C, P2D, P3A, P3B, P3C, P3D, P4A, P4B, P4C, P4D, P5A, P5B, P5C and P5D. The charges of the light sensing portions P1A and P1B are transferred by using the common shift register SR1AB in such a manner that the charge of the light sensing portion P1A is transferred before the charge of the light sensing portion P1B is transferred. Similarly, the charges of the light sensing portions P2A and P2B are transferred by using the common shift register SR2AB in such a manner that the charge of the light sensing portion P2A is transferred before the charge of the light sensing portion P2B is transferred. The charges of the light sensing portions P3A and P3B are transferred by using the common shift register SR3AB in such a manner that the charge of the light sensing portion P3A is transferred before the charge of the light sensing portion P3B is transferred. The charges of the light sensing portions P4A and P4B are transferred by using the common shift register SR4AB in such a manner that the charge of the light sensing portion P4A is transferred before the charge of the light sensing portion P4B is transferred. The charges of the light sensing portions P5A and P5B are transferred by using the common shift register SR5AB in such a manner that the charge of the light sensing portion P5A is transferred before the charge of the light sensing portion P5B is transferred. On the other hand, the charges of the light sensing portions P1C and P1D provided with the individual shift registers are transferred in such a manner that the shift registers SR1C and SR1D are used to alternately transfer the charges of the pixels of the light sensing portions P1C and P1D. Similarly, the charges of the light sensing portions P2C and P2D are transferred in such a manner that the shift registers SR2C and SR2D are used to alternately transfer the charges of the pixels of the light sensing portions P2C and P2D. The charges of the light sensing portions P3C and P3D are transferred in such a manner that the shift registers SR3C and SR3D are used to alternately transfer the charges of the pixels of the light sensing portions P3C and P3D. The charges of the light sensing portions P4C and P4D are transferred in such a manner that the shift registers SR4C and SR4D are used to alternately transfer the charges of the pixels of the light sensing portions P4C and P4D. Furthermore, the charges of the light sensing portions P5C and P5D are transferred in such a manner that the shift registers SR5C and SR5D are used to alternately transfer the charges of the pixels of the light sensing portions P5C and P5D.

As described above, according to the charge storage control and the charge transfer control realized according to the present invention, a great freedom can be obtained in disposing the light sensing portions and the shift registers on the image sensor SNS. Therefore, even if the focal point detection areas are disposed on any portion of the image photographing surface, the light sensing portions can be disposed to correspond to the employed configuration.

According to the above-described embodiment, the focal point detection module 6 constitutes the photoelectrical conversion means 100 and the focal point detection optical system 210, the image sensor SNS constitutes the photoelectrical conversion means 200, the light sensing portions PA to PJ, P1A to P5A, P1B to P5B, P1C to P5C and P1D to P5D constitute the light sensing portion 201, the shift registers SRAB, SRCD, SREF, SRC to SRJ, SRABCD, SR1AB to SR5AB, SR1C to SR5C and SR1D to SR5D constitute the transfer means 202, the microcomputer 8 constitutes the focal point detection calculating means 220, the microcomputer 8 and the interface circuit 7 constitute the storage control means 230 and the transfer control means 240.

As described above, according to the present invention, the commencement and completion of the storage in a plurality of light sensing portions are controlled in order to prevent overlap of the timing of the transference of the stored charge in a plurality of pairs of charge storage type light sensing portions provided to correspond to a plurality of focal point detection areas on the image photographing surface. Furthermore, a pair of light sensing portions provided with the common transfer means are processed such that the charge stored in either of the light sensing portions is transferred before that stored in the other light sensing portion is transferred. On the other hand, the pair of the light sensing portions provided with the individual transference means are processed in such a manner that the charges are alternately transferred from the pixels of the respective light sensing portions. Therefore, mixture of noise into the output signal can be prevented, thereby the S/N ratio can be improved and thereby the focal point detection accuracy can be improved. As a result, the stored charge can be transferred in a short time so that the focal point detection time can be shortened. Furthermore, a great freedom can be obtained in disposing the light sensing portions and the transfer portions on the photoelectrical conversion means. Therefore, the space in which the light sensing portions and the transfer portions can be reduced and the size of the photoelectrical conversion means can be reduced. Therefore, even if the focal point detection areas are disposed on any portion of the image photographing surface, the light sensing portions can be disposed to correspond to the employed configuration.

Furthermore, the memory on the photoelectrically conversion means can be omitted from the structure. Therefore, the structure of the circuit of the chip of the photoelectrically conversion means can be simplified, causing reliability to be improved. Additionally, the manufacturing cost can be reduced.

Referring to FIG. 27, another embodiment of the present invention will now be described. The focal point detection apparatus comprises a plurality of charge storage type light sensing portions 302 disposed to correspond to a plurality of focal point detection areas disposed on an image photographing surface. The charge storage type light sensing portions 302 receive beams introduced from a plurality of the focal point detection areas by a focal point detection optical system 301. The focal point detection apparatus further comprises a first control means 303 for calculating the estimated storage time for each light sensing portion 302 at the next charge storage operation in accordance with the storage time and the quantity of the charge stored at the previous charge storage operation to control the charge storage in each light sensing portion 302 in accordance with the calculated estimated storage time. The focal point detection apparatus further comprises a transfer means 305 for converting the stored charge into an electric signal at the time of the completion of the charge storage in each light sensing portion 302 to transfer it to a focal point detection calculating means 304.

In the focal point detection apparatus according to the present invention, a first control means 303A controls the commencement and the completion of the charge storage in each light sensing portion 302 in order to transfer the charge stored in the next light sensing portion 302 after the charge stored in the light sensing portion 302 of the faster transfer order starting from the fastest transfer order light sensing portion 302 so that the above-described object can be achieved.

In the focal point detection apparatus according to the present invention, the first control means 303B controls the commencement and the completion of the charge storage in each light sensing portion 302 in order to continuously transfer the charge stored in the next light sensing portion 302 after the charge stored in the light sensing portion 302 of the faster transfer order starting from the fastest transfer order light sensing portion 302.

The focal point detection apparatus according to the present invention comprises a monitor means 306 for detecting the quantity of the charge stored in at least one light sensing portion 302a of a plurality of the light sensing portions 302. The focal point detection apparatus further comprises a second control means 307 for completing the charge storage in the light sensing portion 302a when the quantity of the stored charge detected by the monitor means 306 prior to the completion of the charge storage in the light sensing portion 302a, the quantity of the stored charge of which is detected by the monitor means 306 by the first control means 303A. A first control means 303C gives priority the transference of the charge stored in the light sensing portion 302a, the quantity of the stored charge of which is detected by the monitor means 306, to the transference of the charge stored in the light sensing portion 302 which is determined in accordance with the estimated storage time.

A first control means 303D of the focal point detection apparatus according to the present invention controls the commencement and the completion of the charge storage in each light sensing portion 302 in order to start the charge storage in the other light sensing portion 302 after the charge stored in the light sensing portion 302 of the first transfer order has been transferred.

A first control means 303E of the focal point detection apparatus according to the present invention causes the charge storage in the next light sensing portion 302 to be commenced after the charge stored in the light sensing portion 302 of the faster transfer order has been transferred in a case where the estimated storage time for each light sensing portion 302 is shorter than a predetermined time period.

The first control means 303A of the focal point detection apparatus according to the present invention controls the commencement and the completion of the charge storage in each light sensing portion 302 in order to transfer the charge stored in the next light sensing portion 302 after the charge stored in the light sensing portion 302 of the faster transfer order starting from the fastest transfer order light sensing portion 302.

The first control means 303B of the focal point detection apparatus according to the present invention controls the commencement and the completion of the charge storage in each light sensing portion 302 in order to continuously transfer the charge stored in the next light sensing portion 302 after the charge stored in the light sensing portion 302 of the faster transfer order starting from the fastest transfer order light sensing portion 302.

According to the focal point detection apparatus according to the present invention, the second control means 307 stops the charge storage in the light sensing portion 302a when the quantity of the stored charge detected by the monitor means 306 has reached a predetermined value prior to the completion of the charge storage in the light sensing portion 302a, the quantity of the stored charge of which is detected by the monitor means 306. The first control means 303c gives priority the order of transference of the charge stored in the light sensing portion 302, the quantity of the stored charge is detected by the monitor means 306 is detected, to the transference order of the charge stored in the light sensing portion 302 determined in accordance with the estimated storage time.

In the focal point detection apparatus according to the present invention, the first control means 303D controls the commencement and the completion of the charge storage in each light sensing portion 302 in order to start the charge storage in the other light sensing portion 302 after the charge stored in the light sensing portion 302 of the first transfer order has been transferred.

In the focal point detection apparatus according to the present invention, the first control means 303E causes the charge storage in the next light sensing portion 302 to be commenced after the charge stored in the light sensing portion 302 of the faster transfer order has been transferred in a case where the estimated storage time for each light sensing portion 302 is shorter than a predetermined time period.

Referring to FIG. 10, the focal point detection operation to be performed in a case of the automatic area selection mode is selected by means of the switch 10 will now be described. In this case, in step S5 shown in FIG. 10, the focal point detection sub-routine of the automatic area selection mode is executed. As a result, in accordance with the results of the focal point detections obtained in the four focal point detection areas 22, 23a, 23b and 24 shown in FIG. 3A, the area, which has generated the quantity of defocus showing the nearest subject of the quantities of defocus of the four areas 22, 23a, 23b and 24, is automatically selected. Then, in accordance with the quantity of defocus of the selected area, the photographing optical system 2 is caused to perform the focusing operation.

In a case where the focal point detection is performed in the automatic area selection mode thus-arranged, the microcomputer 8 cannot simultaneously process output signals which correspond to the four areas. Therefore, it is necessary to control the commencement and the completion of the charge storage in the light sensing portions for the purpose of preventing the overlap of the transfer time for each light sensing portion.

Therefore, the transference of the stored charge must be performed in such a manner that the transfer order is determined in proportion to the storage time in accordance with data at the previous charge storage operation in each light sensing portion. In accordance with the determined transfer order, the charge of the next light sensing portion is continuously transferred after the charge stored in the light sensing portion of the faster transfer order has been transferred. Since the charge transfer time for each light sensing portion is constant and it cannot be changed in accordance with various conditions, the commencement and completion of the charge storage in each light sensing portion is controlled by the microcomputer 8 and the stored charge is transferred by the interface circuit 7 immediately after the charges have been stored in the light sensing portions.

In a case of low brightness, the charge storage time for each light sensing portion becomes long. Therefore, the charge storage time is overlapped for each light sensing portion for the purpose of shortening the focal point detect ion time.

In a case of high brightness, the charge storage time becomes short. Therefore, it is difficult to arrange timing of the charge storage commencement/completion operation for each light sensing portion if the storage time is made to overlap as in the case of the low brightness. Furthermore, the effect of shortening the storage time obtainable by the overlap will be deteriorated. Therefore, the storage time is not made to overlap in the high brightness case and the storage of the charge in the next light sensing portion is commenced after the charge stored in the faster order light sensing portion has been transferred.

Figure 28A:
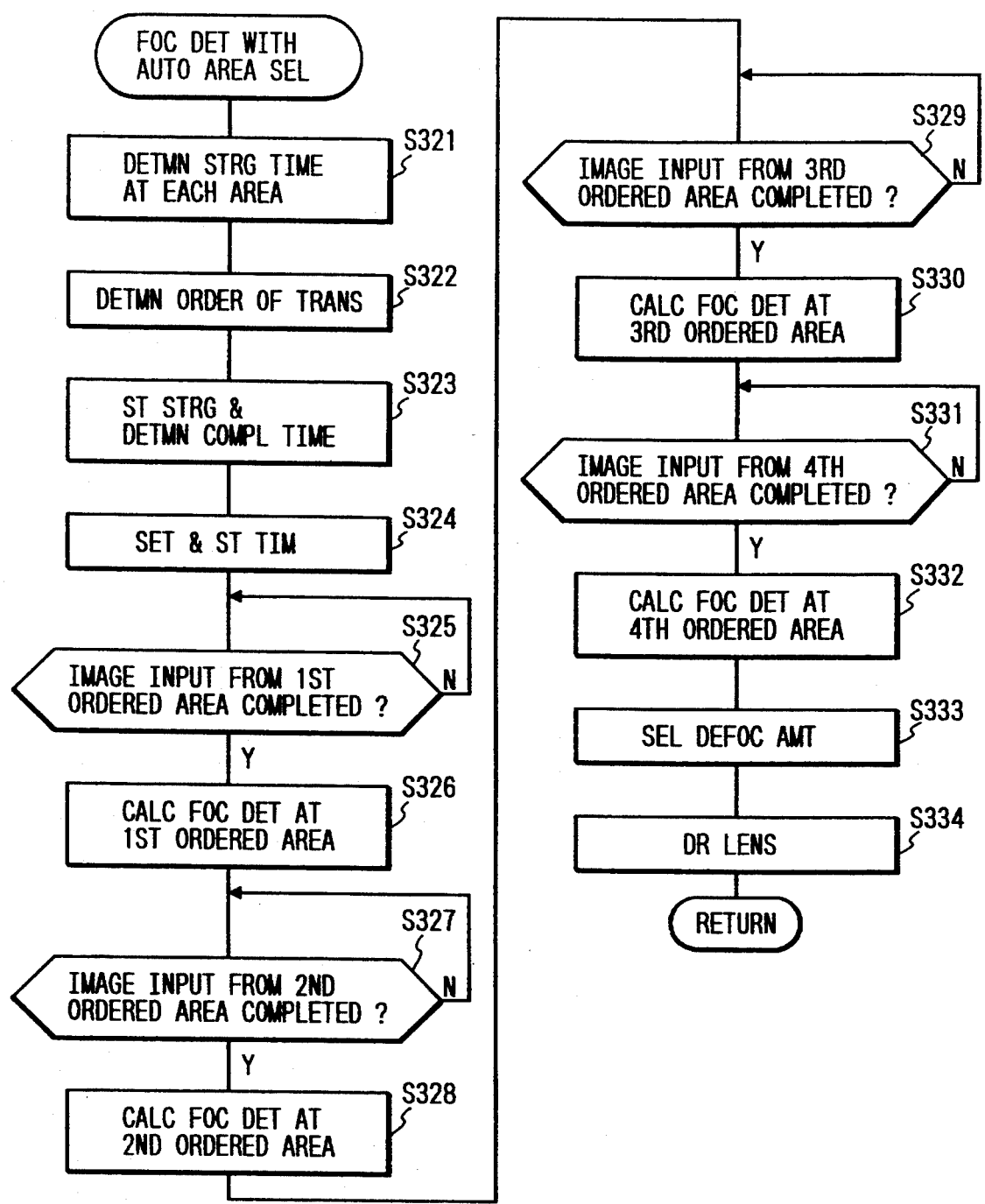
FIG. 28A is a flow chart which illustrates the subroutine for detecting the focal point in the automatic area selected mode.
Figure 28B:
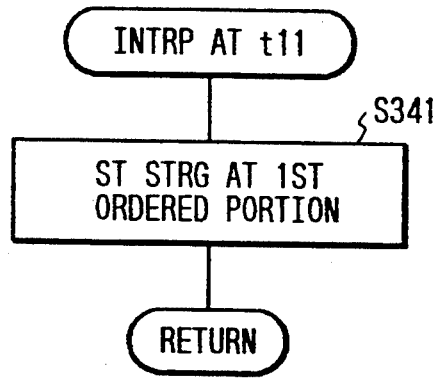
FIGS. 28B to 28I are flow charts which illustrate the timer interruption routine for starting/completing the charge storage performed by each light sensing portion.
Figure 28C:
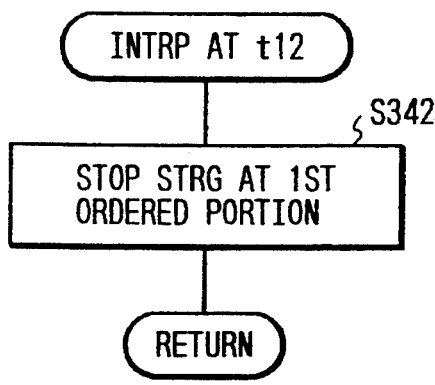
Figure 28D:
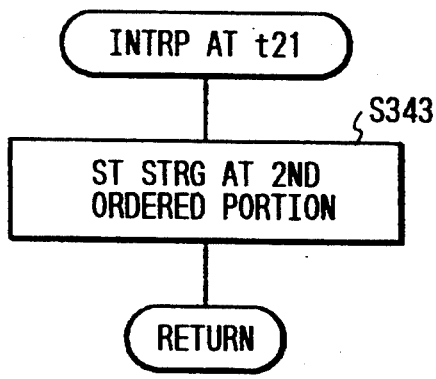
Figure 28E:
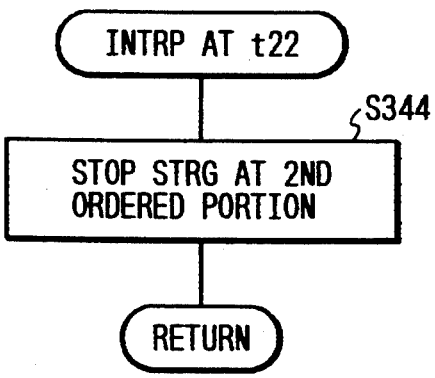
Figure 28F:
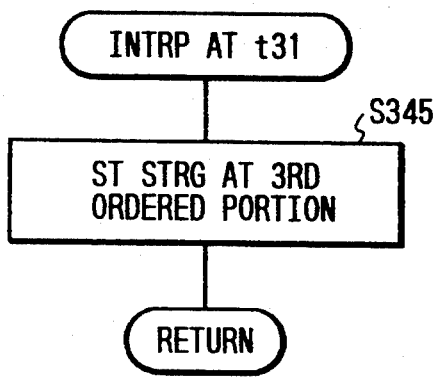
Figure 28G:
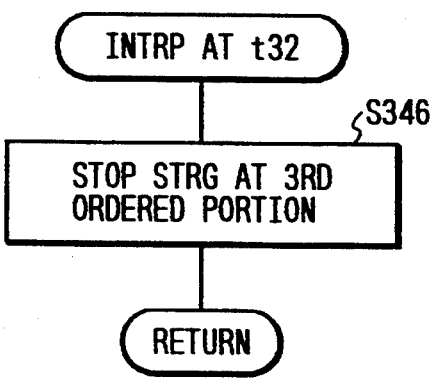
Figure 28H:
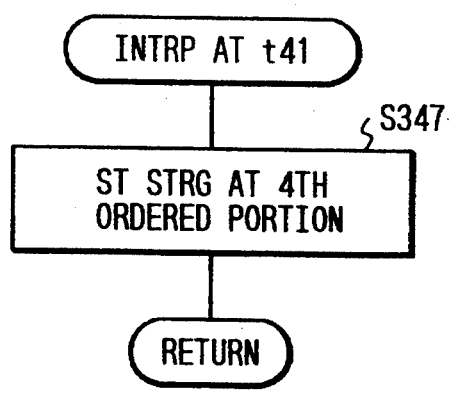
Figure 28I:
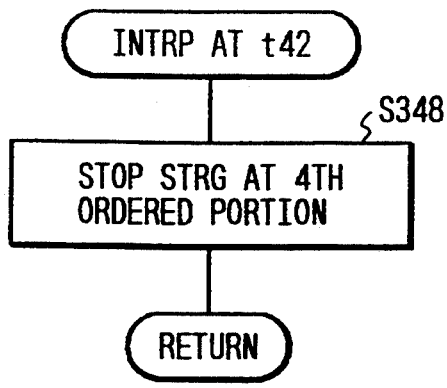

FIG. 28A is a flow chart which illustrates the focal point detection sub-routine in the automatic area selection mode. FIGS. 29 to 32 are time charts for controlling the image sensor SNS. Referring to the drawings, the focal detection operation in the automatic area selection mode will now be described. In order to cause the description to be understood easily, charge storage commencement time t11 for the first transfer order light sensing portion is made to be time reference t11=0.

In step S321, charge storage time TIAB for the light sensing portions PA and PB, charge storage time TICD for the light sensing portions PC and PD, charge storage time TIEF for the light sensing portions PE and PF and charge storage time TIGH for the light sensing portions PG and PH are determined in accordance with previous data for the light sensing portion. Assuming that the previous storage time for the light sensing portions PA and PB is TJAB, the maximum data value is MAXAB, the reference data value is STDAB, estimated next-storage time TIAB is obtained from the following equation:

$$TIAB = TJAB \times MAXAB / STDAB \qquad (1)$$

The estimated storage time for the other light sensing portion is obtained similarly to the above-described Equation (1).

Then, in step S322, in accordance with the estimated time for the next storage for each of the light sensing portions obtained in the above-described step, the transfer order is determined while giving priority the light sensing portion of short storage time. Assuming that the estimated storage time for the light sensing portions is TIGH<TIAB<TIEF<TICD, the light sensing portions PG and PH are given the first transference order, the light sensing portions PA and PB are given the second transference order, the light sensing portions PE and PF are given the third transference order and the light sensing portions PC and PD are given the fourth transference order in accordance with the descending order of the storage time.

In next step S323, the charge storage commencement time and the completion time for the light sensing portions PA to PH are determined as follows where the charge transfer time for each of the pairs of the light sensing portions PA, PB, PC, PD, PE, PF, PG and PH respectively are TTAB, TTCD, TTEF and TTGH.

The first transfer order light sensing portions PG and PH of the shortest storage time are arranged such that: storage commencement time t11=0, storage completion time t12=TIGH, charge transfer completion time t13=TIGH+TTGH.

In a case where charge storage time TIAB for the second transference order light sensing portions PA and PB is longer than storage and transference time for the light sensing portions PG and PH, that is, TIGH+TTGH, storage commencement time for the light sensing portions PA and PB holds a relationship t21=0 and the storage completion time holds a relationship t22=TIAB. Since the stored charge is transferred immediately after the charge has been stored, transference completion time holds a relationship t23=TIAB+TTAB.

In a case where charge storage time TIAB for the second transference order light sensing portions PA and PB is shorter than storage and transference time for the light sensing portions PG and PH, that is, TIGH+TTGH, storage time TIAB is compared with a predetermined time, for example, transference time TTGH for the light sensing portions PG and PH. If storage time TIAB is longer than transference time TTGH, it is determined that the storage commencement time for the light sensing portions PA and PB holds a relationship t21=t13−TIAB and storage completion time is arranged to hold a relationship t22=t13 in order to complete the charge storage in the light sensing portions PA and PB at transference completion time t13 for the light sensing portions PG and PH. Therefore, transference completion time for the light sensing portions PA and PB holds a relationship t23=t13+TTAB. If storage time TIAB is shorter than transference time TTGH, it is determined that the storage commencement time holds a relationship t21=t13 and storage completion time is arranged to hold a relationship t22=t13+TIAB in order to start the charge storage in the light sensing portions PA and PB at transference completion time for the light sensing portions PG and PH. Therefore, the transference completion time holds a relationship t23=t13+TIAB+TTAB.

In a case where storage time TIEF for the third transference order light sensing portions PE and PF is longer than the time from storage commencement time t11 for the light sensing portions PG and PH to transference completion time t23 for the light sensing portions PA and PB, the storage commencement time for the light sensing portions PE and PF holds a relationship t31=0. Therefore, it is determined that the storage completion time for the light sensing portions PE and PF holds a relationship t32=TIEF and the transference completion time for the same holds a relationship t33=TIEF+TTEF.

In a case where charge storage time TIEF for the light sensing portions PE and PF is shorter than the time from storage commencement time t11 for the light sensing portions PG and PH to transference completion time t23 for the light sensing portions PA and PB, storage time TIEF for the light sensing portions PE and PF is compared with a predetermined time, for example, transference time TTAB for the light sensing portions PE and PF. If storage time TIEF is longer than this, it is determined that the storage commencement time holds a relationship t31=t23−TIEF and storage completion time is arranged to hold a relationship t32=t23 in order to complete the charge storage in the light sensing portions PE and PF at transference completion time t23 for the light sensing portions PA and PB. Therefore, transference completion time for the light sensing portions PE and PF holds a relationship t33=t23+TTEF. If storage time TIEF is shorter than transference time TTAB, it is determined that the storage commencement time holds a relationship t31=t23 in order to make storage commencement time t31 to be the transference completion time for the light sensing portions PA and PB. Therefore, the storage completion time holds a relationship t32=t23+TIEF and the transference completion time t33=t23+TIEF+TTEF.

In a case where storage time TICD for the fourth transfer order light sensing portions PC and PD in which the charges are stored over the longest time is longer than the time from storage commencement time t11 for the light sensing portions PG and PH to transference completion time t33 for the light sensing portions PE and PF, storage commencement time for the light sensing portions PC and PD holds a relationship t41=0. Therefore, the storage completion time for the light sensing portions PC and PD holds a relationship t42=TICD and the transference completion time holds a relationship t43=TICD+TTCD.

In a case where storage time TICD for the light sensing portions PC and PD is shorter than the time from storage commencement time t11 for the light sensing portions PG and PH to transference completion time t33 for the light sensing portions PE and PF, storage time TICD is compared with a predetermined time, for example, transference time TTEF for the light sensing portions PE and PF. If storage time TICD is longer than this, it is determined that the storage commencement time holds a relationship t41=t33−TICD and storage completion time is arranged to hold a relationship t42=t33 in order to complete the charge storage in the light sensing portions PC and PD at transference completion time t33 for the light sensing portions PE and PF. Therefore, transference completion time for the light sensing portions PC and PD holds a relationship t43=t33+TTCD. If storage time TICD is shorter than transference time TTEF, it is determined that the storage commencement time holds a relationship t41=t33 in order to make storage commencement time t41 to be the transference completion time for the light sensing portions PE and PF. Therefore, the storage completion time for the light sensing portions PC and PD holds a relationship t42=t33+TICD and the transference completion time holds a relationship t43=t33+TICD+TTCD.

Then, in step S324 shown in FIG. 28A, the process is commenced by setting storage commencement time t11, t21, t31 and t41 and the storage completion time t12, t22, t32 and t42 for the pairs of the light sensing portions PA and PB, PC and PD, PE and PF and PG and PH thus determined.

FIGS. 28B to 28I illustrate the timer TIM interruption routine for performing the commencement and completion of the charge storage in each pair of the light sensing portions PA to PH. The microcomputer 8 transmits command data LCD for instructing the commencement/completion of the storage of the charge in each pair of the light sensing portions PA to PH through the port POT1 to the decoder DCD in response to the interruption at the time set by the timer TIM. Furthermore, the microcomputer 8 transmits the data latch signal LLT. The decoder DCD receives the data latch signal LLT to latch command data LCD to decode it.

If command data LCD is an instruction of the commencement of the storage of the charge in the light sensing portions PA to PH, the decoder DCD, as described above, transmits the control signal LSE to start the charge storage to the control circuit CTR1. The control circuit CTR1 transmits control signals (LAB to LGH) to instruct the commencement of the storage to the light sensing portion which has instructed to commence the charge storage so that the charge storage is commenced. When the charge storage in the light sensing portions PA and PB is commenced, the control signal LAB is transmitted and as well as the control signal LMR to instruct the monitor MNT is transmitted to the monitor MNT so that monitoring of the charge storage state in the light sensing portions PA and PB is commenced.

If command data LCD is an instruction to complete the charge storage in the light sensing portions PA to PH, the control signals LSE and LSX to instruct the completion of the change storage are transmitted to the control circuits CTR1 and CTR2 and the switch SWX. The control circuit CTR1 transmits the control signals (LAB to LGH) to instruct the charge completion to the light sensing portion which has received the charge completion instruction so that the charge storage is completed. The light sensing portions, which have received the charge completion instruction, complete the charge storage and as well as, in parallel, transfer the stored charge to the corresponding shift registers (SRAB to SRH). The switch SWX switches over its output to select the output signal from the light sensing portion, which has completed its charge storage, in response to the charge completion command LSX. The control circuit CTR2 transmits the synchronizing signal LSY to the A/D converter AD in synchronization with the charge completion command LSE so as to A/D convert the subject image signal LSN for the light sensing portion which has completed the charge storage.

In each of the interruption routine shown in FIGS. 28B to 28I, the flow returns to the sub-routine shown in FIG. 28A after the charge storage in the instructed light sensing portion has been commenced/completed.

Figure 28J:
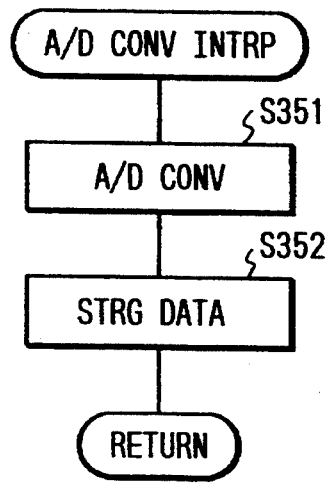
FIG. 28J is a flow chart which illustrates the A/D conversion interruption routine.

FIG. 28J illustrates an A/D conversion interruption routine to be commenced in synchronization with the synchronizing signal LSY. After the charge storage has been completed, the charge transferred to the shift registers corresponding to the light sensing portions are, as described above, transferred, as the subject image signal LSN, to the A/D converter AD via the primary amplifiers AMPAB, AMPC to AMPH, the switches SWCD, SWEF, SEGH, SWX and the secondary amplifier AMPX in response to the clock signals LP0 to LP2 and LSW for the control circuit CTR2. In step S351 shown in FIG. 28J, the subject image signal LSN is A/D-converted. In next step S52, subject image data, which has been A/D converted, is stored in the data memory RAM before the flow returns to the sub-routine shown in FIG. 28A.

Figure 29:
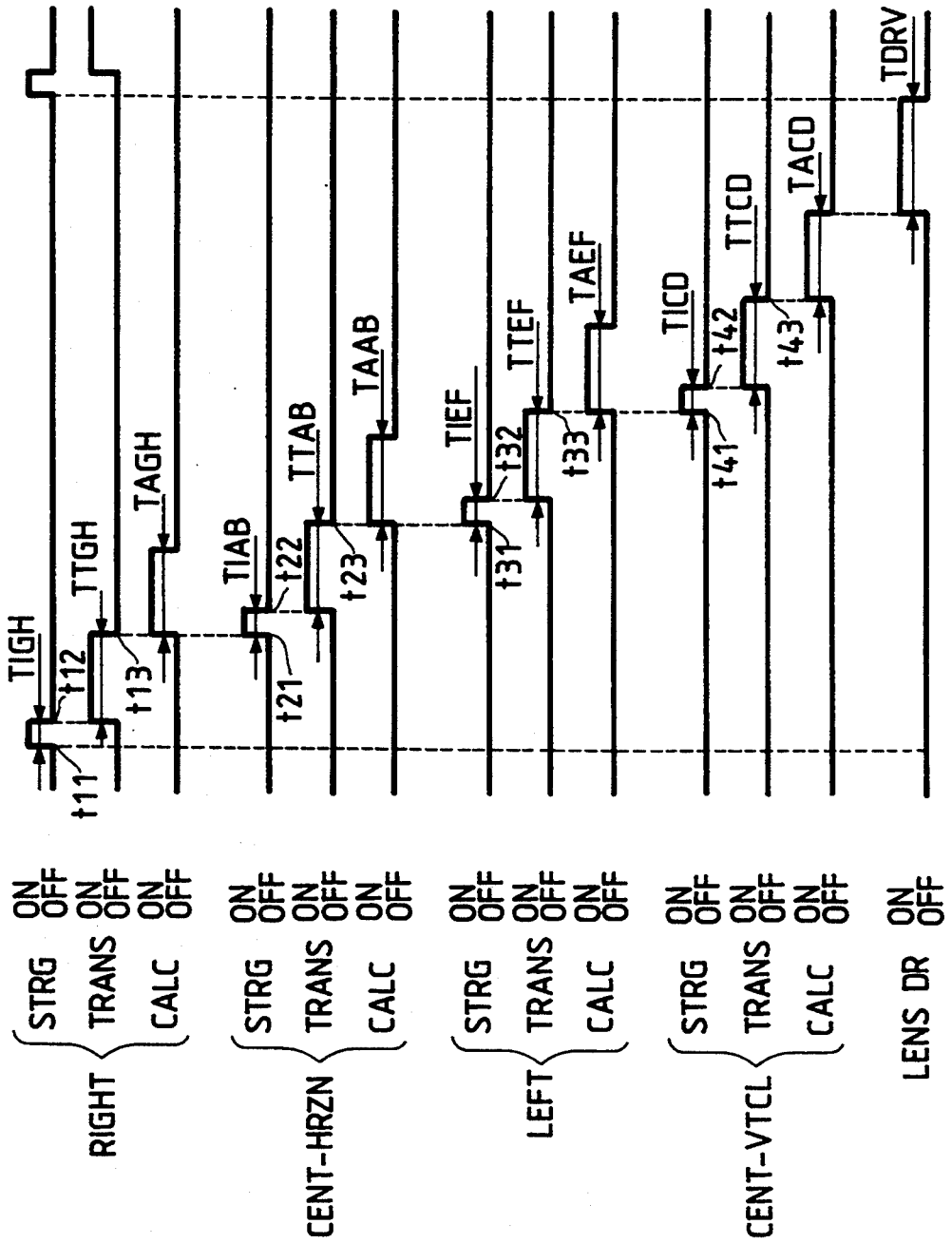
FIG. 29 is a time chart which illustrates the operation of controlling the image sensor in the high brightness mode.

In steps S325 to S332 shown in FIG. 28A, the supply of subject image data to the light sensing portions has been confirmed in the sequential order as the first transfer order right area 24 (the light sensing portions PG and PH), the second transfer order central horizontal area 23a (the light sensing portions PA and PB), the third transfer order left area 22 (the light sensing portions PE and PF) and the fourth transfer order central vertical area 23b (the light sensing portions PC and PD). Then, subject image data is processed in accordance with the correlation calculating algorithm so that the quantity of the subject image deviation formed on each of the pairs of the light sensing portions PA, PB, PC, PD, PE, PF, PG and PH. Furthermore, in accordance with the quantity of the image deviation, the quantity of defocus is detected. As shown in FIG. 29, the focal point detection calculating time for each pair of the light sensing portions PA, PB, PC, PD, PE, PF, PG and PH are made to be TAAB, TACD, TAEF and TAGH.

In next step S333, the optimum quantity of defocus is selected in accordance with a predetermined algorithm from the quantity of defocus detected for each area. The optimum quantity of defocus is the quantity of defocus which shows the approximate value. In step S333, in accordance with the selected quantity of defocus, the operation quantity instruction value and the operation direction of the photographing lens are calculated. Then, the lens operation signal LMT is transmitted to the lens drive device 9 through the port POT2. The lens drive device 9 causes the photographing optical system 2 to perform the focusing operation in response to the drive signal LMT. Furthermore, the pulse signal LEN generated in the pulse generator for monitoring the lens operational quantity is fed back to the counter CNT. When the pulse count made by the counter CNT reaches the instructed value of the lens operational quantity, the internal interruption is generated and the control signal LMT for instructing the operation stop is transmitted through the port POT2 so that the operation of the photographing lens is stopped.

After the above-described process has been completed, the flow returns to the program shown in FIG. 10 so that the ensuing charge storage operation is commenced.

Since the focal point detection operation for the central area 23 is the same as the above-described operation of the focal point detection area automatic selection mode but the focal point detection operation for the left area 22 and the right area 24, its description is omitted here.

FIG. 29 is a time chart for controlling the image sensor SNS in a case of the subject image in the focal point detection area displays high brightness and the charge storage time for each light sensing portion holds a relationship TTGH<TTAB<TTEF<TTCD. Since the charge storage time for each of the light sensing portions PA to PH is short in a case where the subject displays high brightness, the charge storage and the charge transference operation for each light sensing portion is not made overlap but the stored charges are transferred in accordance with the sequential order for the short storage time. Furthermore, the storage and the transference of the charge of the next light sensing portion are performed immediately after the storage and the transference of the charge for the previous light sensing have been completed.

However, the charge storage time for each light sensing portion becomes long when the subject displays low brightness. Therefore, the reliability deteriorates because the focal point detection time becomes long if the charge storage in the light sensing portion is controlled similarly to the above-described high brightness case. Therefore, the charge storage time for each light sensing portion is made overlap in the low brightness case to control the charge storage.

Figure 30:
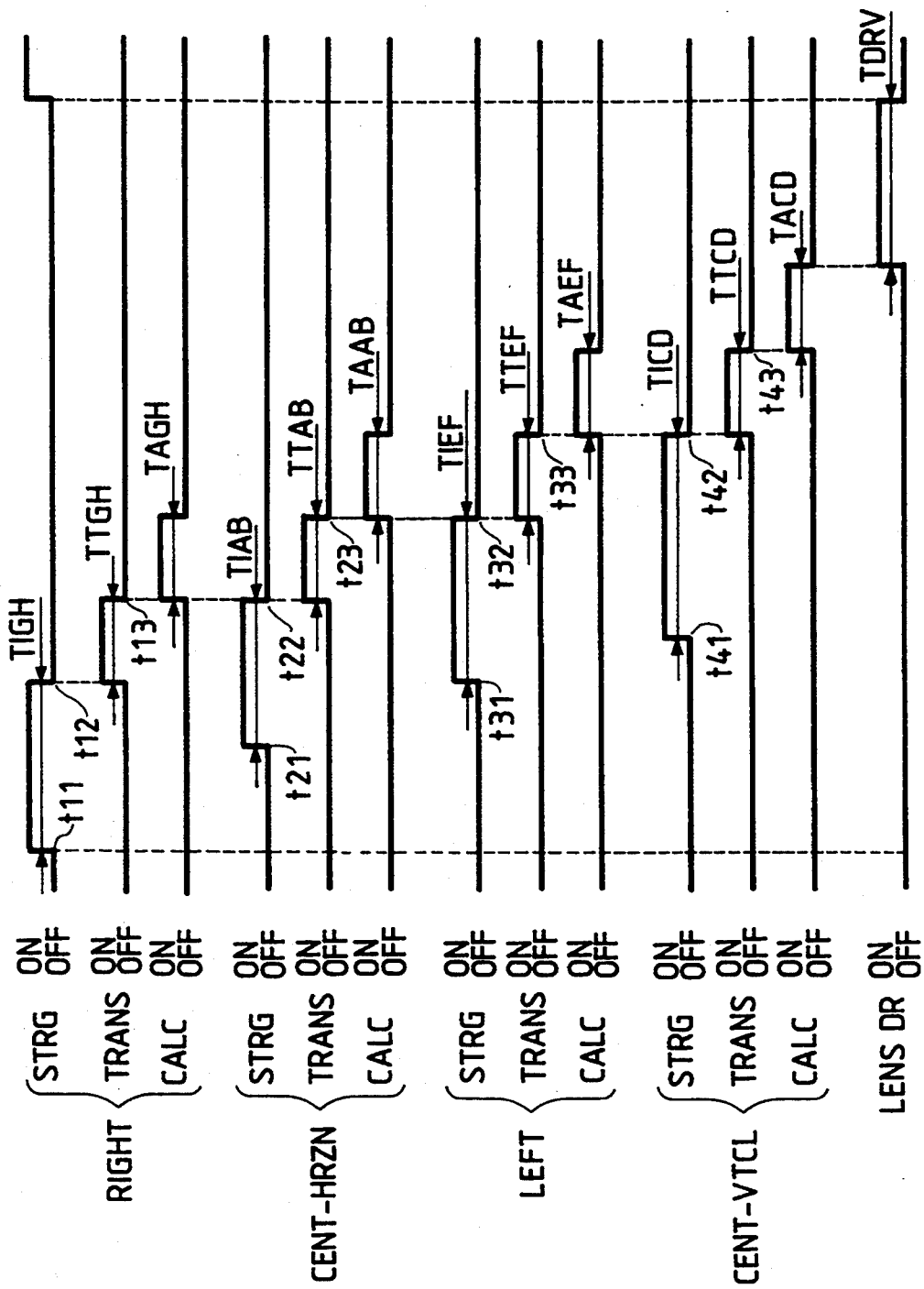
FIG. 30 is a time chart which illustrates the operation of controlling the image sensor in the low brightness mode.
Figure 31:
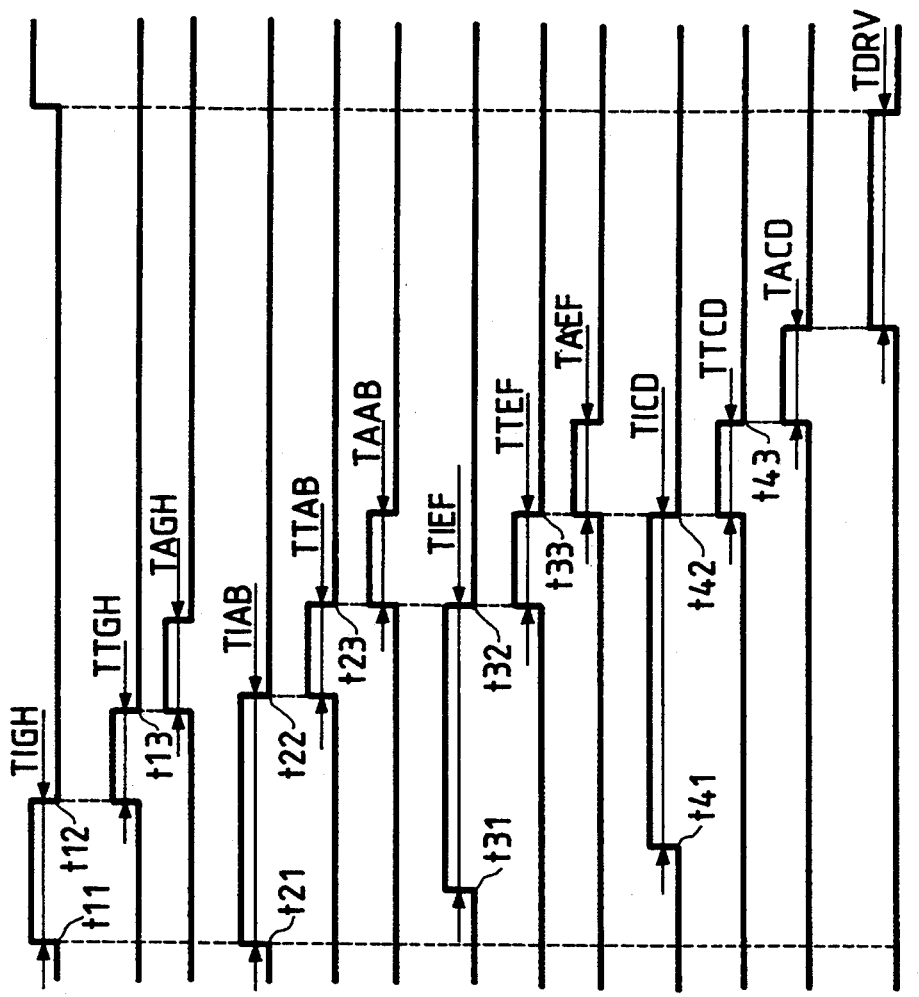
FIG. 31 is a time chart which illustrates another example of the operation of controlling the image sensor in the low brightness mode.

FIGS. 30 and 31 are time charts for controlling the image sensor in a case where the subject image in the focal point detection area displays low brightness and the charge storage time for the light sensing portions holds a relationship TTGH<TTAB<TTEF<TTCD.

Referring to FIG. 30, the charge storage time for each light sensing portion is longer than the transference time for the light sensing portion of the faster transfer order and as well as shorter than the time from charge storage commencement time t11 for the first transfer order light sensing portions PG and PH at the right area 24 to transference completion time (t13, t23 and t33) for the light sensing portion of the faster transference order. In this case, the charge storage time for each light sensing portion is made overlap because the subject displays low brightness. Furthermore, the transference completion time for the light sensing portion of the faster transfer order is made to be the same as the charge completion time for the next light sensing portion.

Referring to FIG. 31, similarly to FIG. 30, the charge storage time for each light sensing portion is longer than the transfer time for the light sensing portion of the faster transfer order and shorter than the time from charge commencement time t11 for the first transfer order light receiving portions PG and PH at the right area 24 to transference completion time (t13, t23 and t33) for the light sensing portion of the faster transfer order. However, only storage time TIAB for the second transfer order light sensing portions PA and PB at the central horizontal area 23a is longer than the time from charge commencement time t11 for the first transfer order light sensing portions PG and PH at the right area to transference completion time t13. In this case, the control is performed similarly to that shown in FIG. 31 except for the arrangement made in such a manner that charge commencement time t21 for the light sensing portion PA and PB at the central horizontal area 23a is made to be the same as charge commencement time t11 for the light sensing portions PG and PG at the right area 24.

Figure 32:
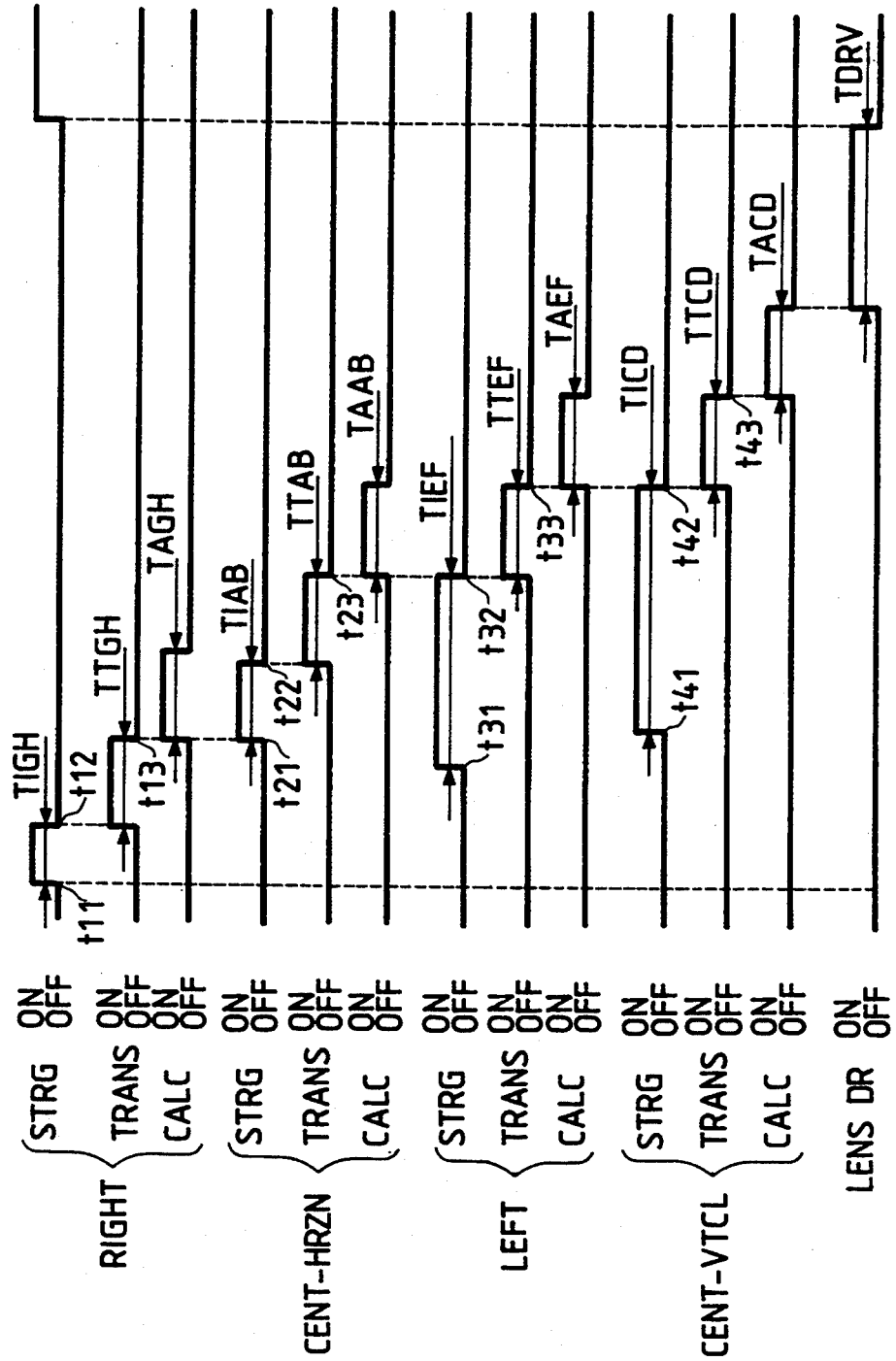
FIG. 32 is a time chart which illustrates an operation of the image sensor in a case where the focal detection areas of the subject image of low brightness and the focal point detection areas of the subject image of high brightness are mixed.

FIG. 32 is a time chart for controlling the image sensor in a case where the focal detection areas for a low brightness subject image and the focal detection areas for a high brightness subject image are present while being mixed and the charge storage time for each light sensing time holds a relationship TTGH<TTAB<TTEF<TTCD.

As shown in the drawing, storage time TIAB for the light sensing portions PA and PB at the central horizontal area 23a is shorter than transfer time TTGH for the faster transfer order light sensing portions PG and PH at the right area. Furthermore, storage times TIEF and TICD for the other light sensing portions are longer than the transfer times TTAB and TTEF for the faster order light sensing portions. In addition, storage times TIEF and TICD are shorter than the time from storage commencement time t11 for the light sensing portions PG and PH at the right area 24 to the transference completion time (t23 and t33) for the faster transfer order light sensing portions. In this case, since the central horizontal area 23a displays high brightness, the charge storage is commenced after the transference of the charge of the faster transfer order right area 24 has been completed. On the other hand, since the other areas display low brightness, the storage is controlled in such a manner that the storage completion time to be made the transference completion time for the faster transfer order light sensing portion.

Figure 33A:
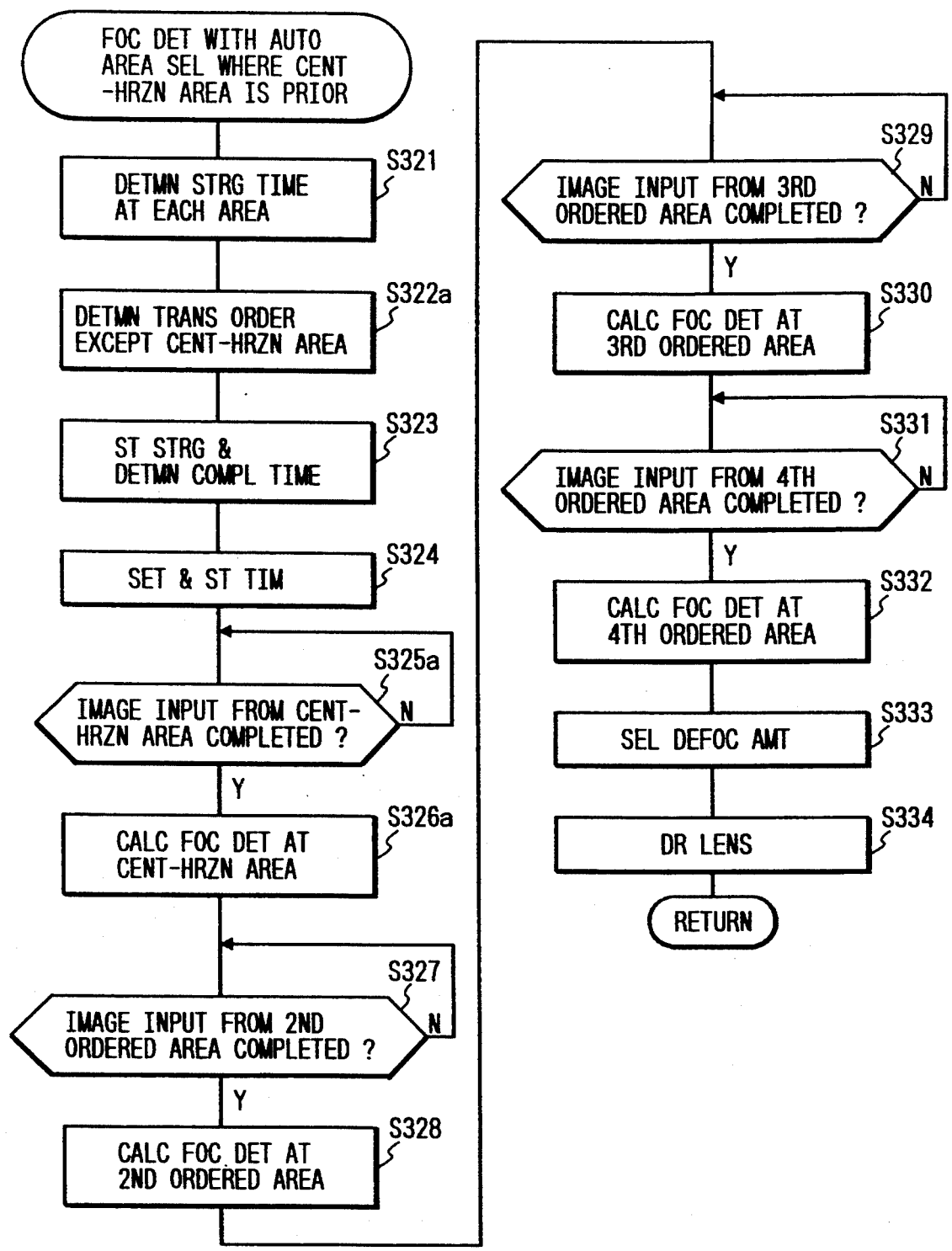
FIG. 33A is a flow chart which illustrates the subroutine for detecting the focal point with the automatic area selection function in a case where the charge storage completion control is performed by the light sensing portion of the monitor.
Figure 34:
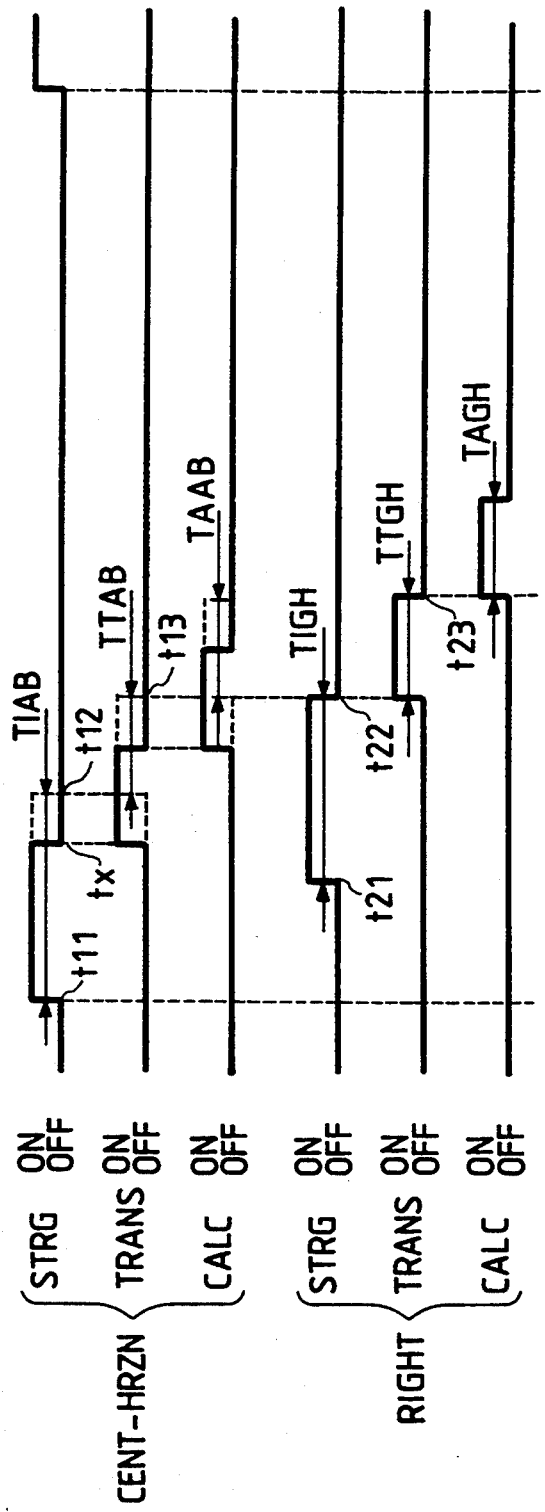
FIG. 34 is a time chart which illustrates the operation of the image sensor at the time of the charge storage monitor interruption operation.

FIG. 33A is a flow chart which illustrates the automatic area selection focal point detection sub-routine in a case where charge storage completion in the light sensing portions PA and PB at the central horizontal area 23a is performed by the monitoring function of the monitor light sensing portion MNT. FIG. 34 is a time chart for controlling the image sensor SNS in the above-described case. An operation for controlling the charge completion in the light sensing portions PA and PB by means of the monitor light sensing portion MNT will now be described. The similar steps to those shown in the flow chart shown in FIG. 28A are given the same step Nos. and the description will be made about only the different portions.

In step S321, the estimated storage time for each area is calculated as described above. For example, the calculated storage time for each light sensing portion holds a relationship TIGH<TIAB<TIEF<TICD starting from the shortest time.

In next step S322a, the transfer order is determined starting from the shortest storage time except for the light sensing portions PA and PB at the central horizontal area 23a. The charge storage in the light sensing portions PA and PB at the central horizontal area 23a is sometimes completed faster than estimated storage time TIAB calculated by the above-described step in response to the monitor signal LMN supplied from the monitor light receiving portion MNT. In this case, there is a risk that the operation of transferring the charge stored in the light sensing portions PA and PB, in terms of time, overlaps the charge transfer operation of the other light sensing portion. In order to prevent a problem of the above-described type, the light sensing portions PA and PB, the charge storage of each which is completed in response to the monitor signal LMN supplied from the monitor light sensing portion MNT, are given the first transfer order. The other light sensing portions are given the transfer order starting from the shortest storage time. Therefore, the transfer order is made to be the light sensing portions PA and PB, PG and PH, PE and PF and PC and PD.

Figure 33B:
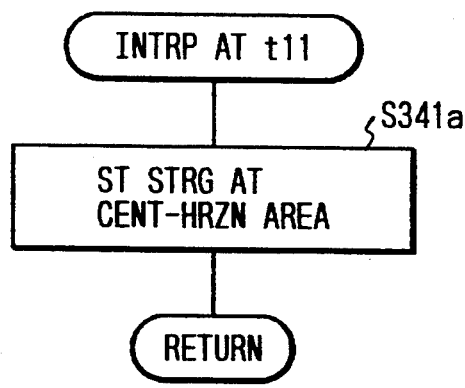
FIGS. 33B and 33C are flow charts which illustrate the timer interruption routine for starting/completing the storage of charge in the central horizontal area of the light sensing portion in which the monitor light sensing portion is disposed.
Figure 33C:
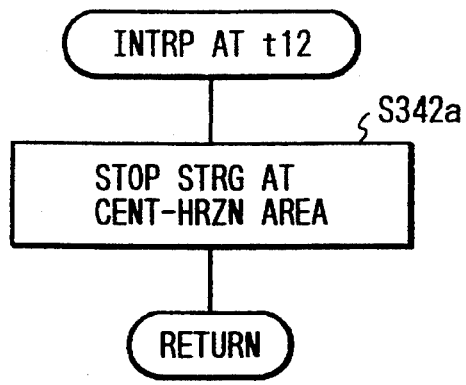

In next step S323 and 324, similar to the above-made descriptions, the commencement and the completion of the charge storage in each light sensing portion are determined so as to start the operation by using the timer TIM. A t11 interruption routine shown in FIG. 33B is executed at time t11 in each of the light sensing portions PA and PB at the central horizontal area 23a so that the charge storage is commenced. A t12 interruption routine shown in FIG. 33C is executed at time t12 so that the storage is completed. The interruption routine for the commencement and the completion of the charge storage in the other light sensing portions are the same as those shown in FIGS. 28D to 28I. Therefore, their descriptions are omitted here.

The comparator CMP raises the comparison signal LIN when the output signal LMN supplied from the monitor light sensing portion MNT becomes lower than the reference voltage signal VRF of the D/A converter DA prior to the operation of the microcomputer 8 in such a manner that it executes the t12 interruption routine to generate a storage completion command for the light sensing portions PA and PB at the central horizontal area 23a. The first transition of the comparison signal LIN is detected by the interruption circuit INT of the microcomputer 8 so that the charge storage interruption routine shown in FIG. 33D is started.

Figure 33D:
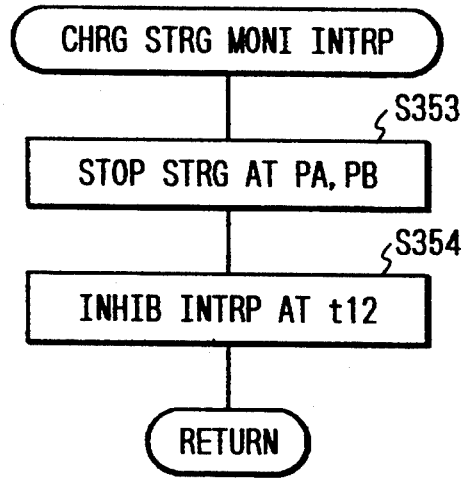
FIG. 33D is a flow chart which illustrates a charge storage monitor interruption routine.

In step S53 shown in FIG. 33D, the charge storage in the light sensing portions PA and PB is completed. As a result, the charge storage in the light sensing portions PA and PB is completed at time tx which is earlier than time t12 which is determined previously by the microcomputer 8. In next step S354, the generation of the t12 storage completion interruption for the light sensing portions PA and PB by the timer TIM is inhibited. Since the transference of the charge stored in the light sensing portions PA and PB is performed prior to the other light sensing portions PC to PH, the transference operation does not overlap the transference operation performed by the other light sensing portion even if the charge storage is completed faster than the predetermined time. Then, the flow returns to the program shown in FIG. 33.

In step S325a after the flow returns as described above, similarly to the above-made description, the input of subject image data of the first transfer order central horizontal area 23a is confirmed. In step S326a, the focal point detection calculation of the central horizontal area 23a is performed in accordance with supplied data. Since the operations in step S327 and ensuing steps are the same as the above-described operations, their descriptions are omitted here.

As described above, the transference of the charge stored in each of the light sensing portions PA to PH corresponding to a plurality of the focal point detection areas 22 to 24 is in accordance with the estimated storage time starting from the shortest time for each light sensing portion calculated in accordance with the storage time in the previous storage operation and the quantity of the stored charge. Furthermore, the commencement and the completion of the charge storage in each of the light sensing portions are controlled for the purpose of continuously transferring the charge stored in the next light sensing portion after the charge stored in the faster transfer order light sensing portion has been transferred. Therefore, the conventional necessity of temporarily storing subject image data in the data memory in order to prevent the overlap of the transfer time for each light sensing portion can be eliminated. Therefore, the stored charge can be transferred in a short time and thereby the focal point detection time can be shortened. Since the focal point detection calculation is performed in response to a high S/N ratio subject image signal, the focal point detection accuracy can be improved. In addition, since the charge storage in the other light sensing portion is commenced after the charge storage in the faster transfer order has been commenced, the time overlap of the charge transfer operations can reliably be prevented.

Furthermore, when the quantity of the stored charge detected by the monitor light sensing portion MNT reaches a predetermined value, the storage in the light sensing portions PA and PB, the quantity of the stored charge of which is monitored, is completed. Therefore, the storage time can be shortened and the focal point detection time can further be shortened. In addition, the stored charge transfer order for the light sensing portions PA and PB, the quantity of the stored charge of which is monitored, is given priority to the transfer order of the charge stored in the light sensing portions determined in accordance with the storage time starting from the shortest time. Therefore, the transference of the stored charge does not, in terms of time, overlap the transference of that in the other light sensing portion even if the charge storage in the light sensing portions PA and PB is completed earlier than predetermined time t12.

Furthermore, the quantity of the stored charge in the light sensing portions PA and PB at the central horizontal area 23a including the center of the image photographing surface is monitored. Therefore, the result of the detection of the focal point at the center of frame in which there is a large possibility of the presence of the main subject image can quickly be obtained. In this state, a structure may be employed in which a fact whether or not the charge storage and the transfer are continued is determined in accordance with the result of the detection of the focal point at the center of the frame. For example, if the quantity of defocus is smaller than a predetermined value as a result of the detection of the focal point at the center of the frame, a discrimination is made that the main subject is positioned at the center of the frame, causing the charge storage/transfer in the other light sensing portion to be stopped. Thus, the focal detection time can be further shortened.

In a case where the subject displays high brightness and the charge storage time in each light sensing portion is shorter than a predetermined time, the charge transfer in the next light sensing portion is commenced after the charge stored in the faster transfer order light sensing portion has been transferred. In a case where the subject displays low brightness and the charge storage time in each light sensing portion is longer than a predetermined time, the charge storage time for each light sensing portion is made to overlap while maintaining the above-described charge transfer method. Therefore, the necessity of performing a complicated timing charge storage control in a short time can be eliminated in a case of high brightness in which the storage time is short and the structure of the control circuit can be simplified. In a case of low brightness in which the charge storage time is long, the focal detection can be completed in a short time.

The present invention is not limited to the above-described embodiments and it can be applied to a variety of focal detection apparatus having a plurality of light sensing portions.

In the structure according to the above-described embodiments, the focal point detection module 6 constitutes the focal point detection optical system 301, the charge storage type light sensing portion 302 and the transfer means 305, the microcomputer 8 and the interface circuit 7 constitute the first and second control means 303 and 307, the microcomputer 8 constitutes the focal point detection calculation means 304 and the monitor light sensing portion MNT constitutes the monitor means 306.

As described above, according to the present invention, the transference of the charge stored in a plurality of the light sensing portions corresponding to a plurality of focal point detection areas on the image photographing surface is performed by controlling the commencement and the completion of the charge storage in each light sensing portion in such a manner that the charge stored in the next light sensing portion is transferred after the charge stored in the faster transfer order light sensing portion has been transferred in accordance with the sequential order of the estimated storage time starting from the shortest storage time calculated in accordance with the charge storage time at the previous charge storage operation in each light sensing portion and the quantity of the stored charge. Therefore, the stored charge can be transferred in a short time and the focal point detection time can be shortened. Furthermore, since the focal point detection calculation can be performed in response to the subject image signal exhibiting a high S/N ratio, the focal point detection accuracy can be improved. In addition, the conventional necessity of using the memory for temporarily storing the charge for the purpose of preventing time overlap at the charge storage operation can be eliminated. Therefore, the structure of the light sensing portion and the transfer means can be simplified and the manufacturing cost can be reduced.

In this case, by continuously transferring the charges in the next transfer order light sensing portions after the charge stored in the faster transfer order light sensing portion has been transferred, the stored charge can be transferred in a further short time.

Furthermore, when the quantity of the charge detected by the monitor means reaches a predetermined value prior to the estimated storage completion time for the light sensing portion the stored charge of which is monitored, the charge storage in the above-described light sensing portion is completed and the charge stored in this light sensing portion is given priority to the transfer order for the light sensing portion determined in accordance with the estimated storage time. Therefore, the transfer operation of the above-described light sensing portion does not, in terms of time, overlap the charge transfer operation of the other light sensing portion.

Furthermore, the storage in the other light sensing portion is commenced after the charge storage in the first transfer order light sensing portions has been commenced. Therefore, the charge transfer operation in terms of time can reliably be prevented.

If the charge storage time for the light sensing portion is shorter than a predetermined time, the charge storage in the next light sensing portion is commenced after the charge stored in the faster transfer order light sensing portion has been transferred. Therefore, the necessity of performing the charge storage and the transfer at complicated timing can be eliminated and the structure of the control circuit can be simplified.

Although the invention has been described in its preferred form with a certain degree of particularly, it will be understood that various changes and modifications can be made without departing from the spirit and the scope of the invention as hereinafter claimed.

What is claimed is:

1. A focal point detection apparatus comprising:
first light receiving means of a charge storage type for receiving light from a first focal point detection area in a photographing image plane;
second light receiving means of a charge storage type for receiving light from a second focal point detection area in the photographing image plane which is different from the first focal point detection area;
first and second transfer means corresponding to said first and second light receiving means, and each transferring the charge stored in the corresponding light receiving means in response to the completion of charge storage;
storage control means for independently controlling charge storage start times of said first and second light receiving means and independently controlling charge storage completion times thereof, so that the charge transfer from said second light receiving means through said second transfer means is made after the charge transfer from said first light receiving means through said first transfer means; and
calculating means for calculating a focusing state in said first and second focal point detection areas on the basis of the charges transferred from said first and second light receiving means.

2. A focal point detection apparatus according to claim 1, wherein said first focal point detection area is an area including a center of the photographing image plane.

3. A focal point detection apparatus according to claim 2, further comprising monitor means for detecting the quantity of charge stored in said first light receiving means, said control means controlling so as to complete the charge storage of said first light receiving means when the quantity of charge detected by said monitor means reaches a predetermined quantity.

4. A focal point detection apparatus according to claim 1, wherein said control means controls said second light receiving means to start charge storage after said first light receiving means starts charge storage.

5. A focal point detection apparatus according to claim 1, wherein said control means controls so as to start charge storage in said second light receiving means after said first transfer means transfers the charge from said first light receiving means, in a case where charge storage periods of said first and second light receiving means are shorter than a predetermined time.

6. A focal point detection apparatus according to claim 1, further comprising:
mode selecting means for selecting a manual mode in which either one of said first and second focal point detection areas is selected and a manual focusing is made, and an automatic mode in which an appropriate focal point detection area is automatically selected, said control means causing only the light receiving means corresponding to the selected focal point detection area to store charge when the manual mode is selected.

7. A focal point detection apparatus comprising:
first light receiving means of a charge storage type having a pair of light receiving portions for receiving light from a first focal point detection area in a photographing image plane, said first light receiving means including a plurality of pixels;
second light receiving means of a charge storage type having a pair of light receiving portions for receiving light from a second focal point detection area in the photographing image plane which is different from the first focal point detection area, said second light receiving means including a plurality of pixels;
first transfer means corresponding to said first light receiving means, and transferring the charge stored in said pair of light receiving portions of said first light receiving means in each pixel;
second transfer means corresponding to one of said light receiving portions of said second light receiving means, and transferring the charge stored in said one light receiving portion of said second light receiving means in each pixel;
third transfer means corresponding to the other of said light receiving portions of said second light receiving means, and transferring the charge stored in said other light receiving portion of said second light receiving means in each pixel;

storage control means for independently controlling charge storage start times of said first and second light receiving means and independently controlling charge storage completion times thereof, so as to prevent two of said transfer means from transferring simultaneously;

transfer control means for controlling said first transfer means to transfer the charge stored in one of said light receiving portions of said first light receiving means after transferring the charge stored in the other light receiving portion of said first light receiving means, and controlling said second and third transfer means to alternately transfer the charge stored in said one light receiving portion and in said other light receiving portion of said second light receiving means; and calculating means for calculating a focusing state in said two said focal point detection areas on the basis of the charge transferred through said first, second and third transfer means.

8. A focal point detection apparatus according to claim 7, wherein said first and second detection areas cross each other, said first transfer means extends between said pair of light receiving portions of said second light receiving means adjacent to said pair of light receiving portions of said first light receiving means, second transfer means is located adjacent to said one light receiving portion of said second light receiving means, and said third transfer means is located adjacent to said other light receiving portion of said second light receiving means.

9. A focal point detection apparatus according to claim 7, further comprising:

mode selecting means for selecting a manual mode in which either one of said first and second focal point detection areas is selected and a manual focusing is made, and an automatic mode in which an appropriate focal point detection area is automatically selected, said control means causing only the light receiving means corresponding to the selected focal point detection area to store charge when the manual mode is selected.

10. A focal point detection apparatus comprising:

first light receiving means of a charge storage type for receiving light from a first focal point detection area in a photographing image plane;

second light receiving means of a charge storage type for receiving light from a second focal point detection area in the photographing image plane which is different from the first focal point detection area;

first transfer means corresponding to said first light receiving means, and transferring the charge stored in said first light receiving means;

second transfer means corresponding to said second light receiving means, and transferring the charge stored in said second light receiving means;

storage control means for predicting the next storage periods of said first and second light receiving means on the basis of the last storage periods and the quantities of charge stored therein, and controlling start and completion of charge storage of said first and second light receiving means;

transfer control means for independently controlling said first and second transfer means to transfer the charges of said first and second light receiving means in order according to the shorter storage period predicted by said storage control means; and calculating means for calculating a focusing state in said first and second focal point detection areas on the basis of the charges transferred through said first and second transfer means.

11. A focal point detection apparatus according to claim 10, wherein said storage control means controls the start and the completion of charge storage in each light receiving means so as to sequentially transfer the charges.

12. A focal point detection apparatus according to claim 10, wherein said storage control means controls so as to start charge storage in said second light receiving means after said first light receiving means starts to store charge.

13. A focal point detection apparatus according to claim 10, wherein said storage control means controls so as to start charge storage in the next light receiving means in order, subsequently to a completion of charge storage of the last light receiving means in order, when the storage period of each light receiving means is shorter than a predetermined period.

14. A focal point detection apparatus according to claim 10, further comprising:

mode selecting means for selecting a manual mode in which either one of said first and second focal point detection areas is selected and a manual focusing is made, and an automatic mode in which an appropriate focal point detection area is automatically selected, said control means causing only the light receiving means corresponding to the selected focal point detection area to store charge when the manual mode is selected.

15. A focal point detection apparatus comprising:

first light receiving means of a charge storage type for receiving light from a first focal point detection area in a photographing image plane;

second light receiving means of a charge storage type for receiving light from a second focal point detection area in the photographing image plane which is different from the first focal point detection area;

third light receiving means of a charge storage type for receiving light from a third focal point detection area in the photographing image plane which is different from the first and second focal point detection areas;

monitor means for monitoring the quantity of charge of said third light receiving means;

first, second and third transfer means respectively corresponding to said first, second and third light receiving means, and each transferring the stored charge of the corresponding light receiving means in response to a completion of charge storage;

storage control means for predicting the next storage periods of said first, second and third light receiving means on the basis of the last storage periods and the quantities of the charges stored therein and, in accordance with the predicted periods, independently controlling charge storage start times of said first, second and third light receiving means and independently controlling charge completion times thereof;

transfer control means for independently controlling said first, second and third transfer means to transfer the charges in order according to the shortest storage period predicted by said storage transfer means, and to operate said third transfer means prior to said first and second transfer means; and calculating means for calculating a focusing state in said first, second and third focal point detection areas on the basis of the charges transferred through said first, second and third transfer means.

16. A focal point detection apparatus according to claim 15, wherein said storage control means completes the charge storage of said third light receiving means when a monitor output from said monitor means reaches a predetermined value before the predicted storage period of said third light receiving means is lapsed.

17. A focal point detection apparatus comprising:

a one-chip image sensor, including first light receiving means for receiving light from a first focal point detection area in a photographing image plane, second light receiving means for receiving light from a second focal point detection area in the photographing image plane which is different from the first focal paint detection area, first and second transfer means corresponding to said first and second light receiving means and independently transferring the charges stored in the corresponding light receiving means in response to compilation of charge storage, and an output terminal common to said first and second transfer means for outputting an electrical signal from each of said first and second transfer means;

control means for independently controlling said first and second transfer means so as to prevent an electrical signal from said first transfer means and an electrical signal from said second transfer means from being simultaneously outputted to said output terminal; and calculating means for calculating a focusing state in said first and second focal point detection areas on the basis of the electrical signals from said first and second transfer means.

18. A focal point detection apparatus comprising:

a photographing lens forming an object image;

first and second focal detection optical systems, each of which includes a condenser lens positioned at the back side of said photographing lens and converging rays passing through said photographing lens, and a re-imaging lens positioned at the back side of said condenser lens and re-imaging a secondary image of said object image;

first light receiving means of a charge storage type for receiving the secondary image re-imaged by said first focal point detection optical system;

second light receiving means of a charge storage type for receiving the secondary image re-imaged by said second focal point detection optical system;

storage control means for independently controlling charge storage start times of said first and second light receiving means and independently controlling charge storage completion times thereof;

first and second transfer means corresponding to said first and second light receiving means, each for transferring the charge stored in the corresponding light receiving means; and calculating means for calculating a focusing state in said first and second focal point detection areas on the basis of the charges transferred through said first and second transfer means.

19. A focal point detection apparatus according to claim 18, wherein said first and second transfer means transfer the charge stored in each of respective pairs of light receiving portions of said first and second light receiving means to said calculating means in response to completion of the charge storage; and said storage control means controls the start and the completion of charge storage of said first and second light receiving means so that the transfer of the charge stored in said pair of light receiving portions of said first light receiving means does not overlap the transfer of the charge stored in said second light receiving means.

20. A focal point detection apparatus according to claim 18, wherein said first and second light receiving means and said first and second transfer means form a one-chip image sensor.

21. A focal point detection apparatus according to claim 18, wherein said image sensor includes an output terminal for outputting the charges transferred through said first and second transfer means as electrical signals, and further comprising transfer control means for controlling said first and second transfer means so as to prevent the electrical signals from being simultaneously outputted to said output terminal.

22. A focal plane detection apparatus according to claim 18, further comprising transfer control means for controlling said first and second transfer means so that transfer of charge stored in a pair of light receiving portions of said first light receiving means does not overlap transfer of charge stored in said second light receiving means.

23. A focal point detection apparatus comprising:

a photographing lens forming an object image;

a condenser lens positioned at the back side of said photographing lens and converging rays passing through said photographing lens;

first and second pairs of re-imaging lenses positioned at the back side of said condenser lens and re-imaging a secondary image of said object image;

first light receiving means of a charge storage type for receiving the secondary image re-imaged by said first pair of re-imaging lenses;

a second light receiving means of a charge storage type for receiving the secondary image re-imaged by said second pair of re-imaging lenses;

storage control means for independently controlling charge storage start times of said first and second light receiving means and independently controlling charge storage completion times thereof;

first and second transfer means corresponding to said light receiving means, each for transferring the charge stored in the corresponding light receiving means; and calculating means for calculating a focusing state in said first and second focal point detection areas on the basis of the charges transferred through said first and second transfer means.

24. A focal point detection apparatus comprising:

first light receiving means of a charge storage type for receiving light from a first focal point detection area, said first focal point detection area being positioned at a center of a photographing image plane;

second light receiving means of a charge storage type for receiving light from a second focal point detection area in the photographing image plane which is different from the first focal point detection area and positioned at a peripheral part of the photographing image plane;

first and second transfer means corresponding to said first and second light receiving means, and each transferring the charge stored in the corresponding light receiving means, said first and second transfer means being independently controllable;

storage control means for independently controlling charge storage start times of said first and second light receiving means and independently controlling charge storage completion times thereof, so that the charge transfer from said second light receiving means through said second transfer means is made after the charge transfer from said first light receiving means through said first transfer means; and calculating means for calculating a focusing state in said first and second focal point detection areas on the basis of the charges transferred through said first and second transfer means.

25. A focal point detection apparatus comprising:

first light receiving means of a charge storage type for receiving light from a first focal point detection area in a photographing image plane;

second light receiving means of a charge storage type for receiving light from a second focal point detection area in the photographing image plane which is different from the first focal point detection area;

storage control means for independently controlling charge storage start times of said first and second light receiving means and independently controlling charge storage completion times thereof;

first and second transfer means corresponding to said first and second light receiving means and each transferring the charge stored in the corresponding light receiving means, said first and second transfer means being independently controllable;

transfer control means for controlling a transfer order of said first or second transfer means in accordance with the charge storage periods of said first and second light receiving means; and calculating means for calculating a focusing state in said first and second focal point detection areas on the basis of the charge transferred through said first and second transfer means.

26. A focal point detection apparatus comprising:

first light receiving means of a charge storage type for receiving light from a first focal point detection area in a photographing image plane;

second light receiving means of a charge storage type for receiving light from a second focal point detection area in the photographing image plane which is different from the first focal point detection area;

storage control means for independently controlling charge storage start times of said first and second light receiving means and independently controlling charge storage completion times thereof;

first and second transfer means corresponding to said first and second light receiving means and each transferring the charge stored in the corresponding light receiving means, said first and second transfer means being independently controllable;

transfer control means for controlling said first and second light receiving means and said first and second transfer means so that the charge storage of the first light receiving means does not overlap the charge storage of the second light receiving means and the charge transfer through said first transfer means does not overlap the charge transfer of said second transfer means on a high luminance, and for controlling said first and second transfer means so that only the charge transfer through said first transfer means does not overlap the charge transfer through said second transfer means on a low luminance; and calculating means for calculating a focusing state in said first and second focal point detection areas on the basis of the charges transferred through said first and second transfer means.

* * * * *